United States Patent [19]
Oder et al.

[11] Patent Number: 5,868,939
[45] Date of Patent: Feb. 9, 1999

[54] METHOD AND APPARATUS FOR BREAKING EMULSIONS OF IMMISCIBLE LIQUIDS BY MAGNETOSTATIC COALESCENCE

[75] Inventors: Robin R. Oder, Export; Russell E. Jamison, Lower Burrell, both of Pa.

[73] Assignee: EXPORTech Company, Inc., New Kensington, Pa.

[21] Appl. No.: 468,038

[22] Filed: Jun. 6, 1995

Related U.S. Application Data

[63] Continuation of Ser. No. 322,953, Oct. 13, 1994, abandoned, which is a continuation of Ser. No. 73,797, Jun. 8, 1993, abandoned.

[51] Int. Cl.⁶ .................................................. B01D 35/06
[52] U.S. Cl. ........................................ 210/695; 210/708
[58] Field of Search .................................. 210/695, 708; 208/187, 188

[56] References Cited

U.S. PATENT DOCUMENTS 3,803,033  4/1974  Sutherland ............................ 210/695

FOREIGN PATENT DOCUMENTS 18523    5/1980  Japan ..................................... 210/695
2044635  10/1980  United Kingdom .................... 210/695

*Primary Examiner*—Matthew O. Savage
*Attorney, Agent, or Firm*—Ansel M. Schwartz

[57] ABSTRACT

A method and apparatus for breaking emulsions using magnetic fields to promote magnetostatic coalescence. The method includes use of a magnetic additive soluble or dispersable in the dispersed phase of the emulsion and a second additive for promoting coalescence of the dispersed phase droplets when acted on by a magnetic field. The apparatus includes a continuously operating high gradient magnetic coalescer having a plurality of magnetic elements therein oriented vertically which are magnetized transverse to their lengths for treating emulsions containing large amounts of internal phase. The magnetized elements serve to attract droplets of the internal phase to their surfaces, where they coalesce under magnetic compression force, and to provide a pathway for drainage of the coalesced droplets from the separator. Additionally the apparatus includes a magnetic field assisted settler for treating emulsions with intermediate water content. The apparatus further includes magnetic filters for removing the final amounts of the internal phase and for recovering the magnetic additives for reuse in the process.

11 Claims, 22 Drawing Sheets

METHOD AND APPARATUS FOR BREAKING EMULSIONS OF IMMISCIBLE LIQUIDS BY MAGNETOSTATIC COALESCENCE

This is a continuation of Ser. No. 08/322,953, filed Oct. 13, 1994 now abandoned, which was a continuation of Ser. No. 08/073,797, filed Jun. 8, 1993 also now abandoned.

GOVERNMENT CONTRACT CLAUSE

THIS INVENTION WAS MADE UNDER GRANT AWARDS BY THE NATIONAL SCIENCE FOUNDATION UNDER GRANTS ISI-8861022 AND ISI-8920980. THE GOVERNMENT HAS CERTAIN RIGHTS IN THIS INVENTION.

FIELD OF THE INVENTION

The present invention relates to a process and apparatus for the separation of immiscible liquids, more particularly to a process and apparatus for breaking emulsions of immiscible liquids using magnetic fields.

BACKGROUND OF THE INVENTION

In the past, electric fields have been used to break certain emulsions. This technology, for example, has been widely used in the oil refining industry where some water and salt is inadvertently added in the production and transportation of petroleum crude. Additional water is intentionally added in an emulsification stage at the refinery input. The water absorbs salt and other impurities from the crude oil, which are then separated with the water in an electrostatic coalescer.

In the electrostatic coalescence process, electric fields are applied in the coalescer, which induce electric dipole moments in the water phase. The induced dipoles create interparticle attraction, thereby accelerating coalescence of the water droplets. The water, with its load of impurities, is then separated by sedimentation.

Although electrostatic coalescence is inexpensive, its utilization is limited by a severe restriction on the strength of the electric field which can be used because of problems associated with electric power consumption in the conducting phase of the emulsion. Further, when the electric field strength reaches the level of a few thousand volts per centimeter, arcing occurs because of electrical breakdown, which presents insurmountable obstacles to the practical application of the technology. In some applications, the use of the electrostatic method is limited because of temperature increases associated with the power consumption. For example, electrostatic methods could not be used in processing of unstable compounds such as fermenter broth in biochemical applications because of the temperature increases to the system.

Additionally, the use of electrostatic fields is limited at both high and low water concentrations. For practical reasons, the electrodes of electrostatic coalescers are immersed in the emulsions. When the water content is in the 5–10% range, chains of coalescing water droplets can extend between the electrodes, thus shorting the device. To prevent this, electrically insulated electrodes are employed. This practice has severely limited the application of state-of-the-art coalescers because the development of insulated electrodes has proven to be difficult, especially when used in corrosive environments and on a large scale. At low water concentrations, e.g., 0.1%, the dispersed water phase droplets are widely separated so that it is impossible to induce sufficient electric moment to coalesce the water phase in practical applications.

Lastly, elevated temperatures are used to lower viscosity and improve the effect of electric fields in desalting crude oils by electrostatic methods. The cost of steam increases with the amount of salt in the crude and can be as much as one-half of the total cost of desalting. As a result of this and other inefficiencies associated with electrostatic coalescence, breaking an emulsion by that method requires long residence time, limiting the applicability of this method.

Several attempts have been made to apply magnetic fields to breaking emulsions. Fundamental differences in magnetic and electric properties of materials should allow many of the practical problems associated with use of electric fields to be overcome. For example, there is no magnetic analog to electric charge. Because of this, no energy dissipating conduction current is involved with the use of magnetic fields as is the case with the use of electric fields, and since only DC fields are employed in the magnetic case, there are no induced eddy currents. Furthermore, magnetic fields can be applied from outside of the emulsion. Because of this, electrodes are not needed. With use of magnetic fields, problems of energy dissipation and of "back" shielding of the emulsion by conduction currents and of use of insulated electrodes are completely removed. Further, since there is no fundamental limit to the level of magnetic field which can be applied, it is possible to develop magnetic energy densities in the emulsions which are much greater than is possible with electric fields. Because of this, the magnetic method does not require the use of elevated temperature which is a major cost factor in the electric method.

In the prior art, three distinguishing problems characterize earlier attempts to apply magnetic fields to demulsification; all these limitations have been overcome by the method of the present invention.

First, means such as Hubby, U.S. Pat. No. 3,412,002, employing Lorentz deflecting forces are impractical, and those, such as Roberts, U.S. Pat. No. 1,978,509, which do not teach the use of practical additives to impart strong magnetism to one phase of the emulsion, cannot be practiced.

Second, while others have proposed use of magnetic additives (Papell, U.S. Pat. No. 3,215,572; Cooper, U.S. Pat. No. 4,108,767; and Kaiser, U.S. Pat. Nos. 3,796,660 and 3,806,449), they appear to be unaware of the physicochemical aspects and consequences of coalescence in a magnetic field. For example, Kaiser writes of "spherical particles", whereas liquid magnetic particles which are most amenable to coalescence actually assume ellipsoidal shapes in a magnetic field. The criteria for preparing and choosing suitable ferrofluids stressed in the Kaiser patents has been found to be irrelevant. Kaiser bases the usefulness of ferrofluids on interfacial tension and spreading coefficients. Kaiser's concern is that the ferrofluid will serve to lower interfacial tension and actually stabilize the emulsion rather than allowing the magnetic field to break it. It has now been discovered in connection with the present invention that the use of surfactants which affect interfacial film stability enhances the effects of magnetic additives on coalescence in a magnetic field. The surfactants also lower interfacial tension but do not stabilize the emulsion. Some surfactants lower interfacial tension, but do not enhance coalescence in a magnetic field. They appear to have neither stabilizing nor destabilizing effects on emulsions. Without the proper interplay between film stability and magnetic field strength, the magnetized particles chain and flocculate and do not coalesce.

While chained and otherwise flocculated droplets will separate from the emulsion because of differences in density, such separation is undesirable because it also leads to a loss of the continuous phase which is carried out in the voidages between the flocculated or chained droplets. Chaining results in a disposal problem, to a loss of the expensive organic liquid component of the emulsion, and to practical limitations in the application of magnetic separators to demulsification.

Third, magnetic means previously indicated for breaking magnetic emulsions are not practical for general application, especially when the water content is high. Batch-operated High Gradient Magnetic Separators (HGMS) are sometimes suggested because of their capabilities in complete separation of fine-sized magnetic materials. While HGMS separators have this capability, it is also a limiting factor in breaking emulsions in which one of the phases is magnetic. The magnetic phase rapidly plugs the stainless steel mesh filter structure used in HGMS, making its use impractical when the content of the magnetic phase of the emulsion is much greater than about 0.5%. Indeed, Example VIII of Kaiser '449 makes clear that a batch process is contemplated. The present invention is not limited in this manner. The continuously operating method of the present invention can treat emulsions with any level of internal phase which is physically possible.

The present invention has overcome problems of chaining by discovering a new role for surfactants in destabilizing the droplet interfacial film in the presence of a magnetic field. This destabilization diminishes the tendency of droplets to flocculate and chain in a magnetic field and promotes coalescence by allowing practical levels of the magnetic field to compress and rupture the interfacial film in short time exposures to the field. Additionally, the invention teaches the use of a new approach to high gradient magnetic separation which is continuous in operation, which is capable of separating internal phase droplets in the micron size range in high throughput operation, which does not plug even when processing high internal phase emulsions which are strongly magnetic, and which achieves high levels of recovery of the continuous phase of the emulsion.

It would therefore be desirable to develop the magnetostatic coalescence method because it does not suffer from the limitations associated with the use of electric fields. Magnetostatic coalescence can be used in processing systems of a high electrical conductivity such as organic-liquid-in-water ("OL/W") emulsions. There are no induced electric currents or electric power consumption in the emulsion and no electrodes are employed. The magnetostatic coalescence method is also safer for use around flammable materials, such as crude oil and gasoline feedstocks. While heat is not developed in the emulsion during breaking, the method can be operated over any temperature range applicable to the emulsion.

SUMMARY OF THE INVENTION

Accordingly, a novel method is provided for breaking a variety of emulsions through use of a magnetic field comprising the steps of: (a) adding to the emulsion a first additive comprising a magnetic material which is soluble or dispersable in the internal phase of the emulsion and adding a second material adapted to promote coalescence of the internal phase in the presence of a magnetic field; (b) agitating the mixture; (c) subjecting the emulsion to a substantially non-uniform magnetic field, thereby attracting the internal phase to the regions of high magnetic field strength, thus concentrating the internal phase; (d) allowing the internal droplets to coalesce in the presence of a high strength magnetic field; and (e) separating the coalesced internal phase from the continuous phase of the emulsion.

Magnetostatic coalescence thus involves the application of magnetic fields to break emulsions. When the components of the emulsion are not magnetic, the approach requires the use of magnetic additives to impart magnetic properties to the internal dispersed phase. In a preferred embodiment of the invention, stable, magnetic emulsions are first prepared comprising two immiscible liquids, a magnetic additive, and a second additive for promoting coalescence. Magnetic additives are chosen which are soluble or dispersable in the internal phase of the emulsion. In the case of W/OL emulsions, water-soluble or dispersable magnetic additives are used. In the case of OL/W emulsions, oil-soluble or dispersable additives are used.

Soluble magnetic additives are liquids which are miscible with the internal phase of the emulsion and which have magnetic elements or compounds incorporated in their chemical structures. An example of a water soluble magnetic additive is iron ligno sulfate. (W. S. Briggs and N. J. Kjargaard, "Lignosulfonate Composition and Process for its Preparation," U.S. Pat. No. 4,019,995, Apr. 26, 1977, incorporated in its entirety by reference herein.) An example of an organic liquid soluble magnetic additive is iron naphthenate which is a metal soap.

Dispersable magnetic additives are colloidal sized magnetic particles which are coated with surfactants to stabilize them in suspension in the internal phase liquid. Properties of magnetic fluids and methods for their preparation have been given by Rosensweig in Chapter 2 of *Ferrohydrodynamics* (Cambridge University Press, 1985) incorporated by its entirety by reference herein. Examples are ferrofluids prepared by Kalafalla and others and reviewed by J-Y Hwang in U.S. Pat. No. 4,934,898, "Reagents for Magnetizing non-Magnetic Materials," May 30, 1989, incorporated in its entirety by reference herein.

Following preparation of the stable emulsion, magnetic fields are then used in a first stage separator consisting of a vertical or horizontal container having a plurality of vertical magnetizable wires, which attract the magnetic dispersed phase, thus increasing their concentration and diminishing the distance between droplets of the dispersed phase. A magnetic field is applied perpendicular to the flow through the vertical separator, and co-directional to the flow through the horizontal separator, to magnetize the dispersed phase and the magnetic wires.

In the region of high magnetic field strength at the surfaces of the magnetized wires, the interparticle magnetic attractions are large enough for the interfacial film separating the particles to be ruptured by magnetic compression. The coalesced internal phase runs along the wires to a pool in the separator. Coalescence of the attracted particles is encouraged by a second additive, typically a surfactant such as an alkyl phosphate ethoxilate or a polyalkene oxide modified polydimethylsiloxane, which lowers interfacial tension and interfacial film stability in the presence of a magnetic field, thus reducing the tendency of the internal phase droplets to coagulate or flocculate in the magnetic field. Even though the method operates predominantly at ambient temperature, coalescence is further enhanced by operation at elevated temperature where viscosity and interfacial tension and stability are diminished. Lowering emulsion viscosity by increasing temperature or by other means such as the addition of solvents improves the ability of the magnetic forces to draw the dispersed phase droplets into the high field regions where they coalesce.

The effects of process parameters including the surfactant, the magnetic additive, magnetic field strength, magnetic field gradient, flow velocity, emulsion viscosity, and droplet sizes on coalescence of droplets of the magnetic dispersed phase in a magnetic field has been established by measurements of coalescer performance and by microscopic observation. In the apparatus of the invention, the droplets of the dispersed phase enlarge and coalesce on the vertically oriented magnetized wires without chaining. The internal phase separates by flowing along the wires, thus leading to a first stage separator which operates continuously without loss of the external phase of the emulsion.

In another embodiment of the invention the magnetizable wires in the above described first stage coalescer can be replaced by rods which are permanently magnetized transverse to their lengths. In this case, an applied magnetic field other than that produced by the magnetized rods can be used to magnetize the droplets of internal phase of the emulsion and it may not be necessary when the droplets are strongly magnetic. The magnetized rods provide horizontally directed fringing fields which attract the magnetic dispersed phase droplets to the surfaces of the rods where the droplets coalesce. The coalesced droplets are separated from the emulsion by flowing along the magnetic rods to a pool in the separator.

The present method differs from the prior art in that vertically oriented magnetic wires or rods are employed to produce a non-uniform magnetic field in the emulsion for the purpose of attracting fine-sized and low concentration droplets to the wire surfaces and to provide a flow path for separation of coalesced internal phase from the process flow. The coalescer is designed so that the magnetic force of attraction is greater than the viscous drag force. Additionally, the use of vertically oriented wires magnetized transverse to their lengths results in a magnetic force of attraction to the wires with substantially no vertical component except at the ends. Because of this, the magnetic force in the separation zone cannot support the weight of the coalesced droplets and they drain along the surface of the magnetic element to a pool in the bottom of the separator where a "magnetic" plug is formed. The plug serves as a valve regulating the withdrawal of the coalesced phase from the separator and also serves to prevent inadvertent loss of the continuous phase of the emulsion through the coalesced phase exit port.

In another embodiment of the invention, a second stage separator comprising a magnetic field-assisted gravitational separator is used to separate dispersed phase droplets remaining in the outflow from the first stage of separation. Such particles tend to be smaller and more dispersed than those coalesced and separated in the first stage separator. The time required for sedimentation in the second stage can be reduced significantly by the application of a non-uniform and non-symmetric magnetic field during coalescence. Application of a non-uniform or gradient magnetic field creates a net accelerating force upon the magnetic dispersed phase in the direction of greatest field strength, resulting in a greater concentration of the magnetic phase in that region. With use of a non-symmetric field, this accelerating force can be aligned substantially co-directionally with the net migrational direction of the dispersed phase which results from density differences between the dispersed and continuous phases and the direction of inertial or gravitational acceleration. Use of a non-uniform magnetic field is especially desirable when the density difference between the dispersed phase and the continuous phase is slight. The second stage separator also operates continuously.

In another embodiment of the invention, a third stage separator comprising a high gradient magnetic separator is used to separate dispersed phase droplets remaining in the outflow from the second stage field assisted settler. The HGMS unit comprises a magnet surrounding a filter bed made of ferritic stainless steel wool or other very fine filamentary magnetic material. The emulsion is pumped through the voidages of the HGMS filter bed with the magnet energized. Magnetic fields emerging from and returning to a multitude of sites on the surface of the magnetic filter elements create very intense and high gradient fringing fields extending into the voidages of the filter bed. These fields create forces which attract the internal phase droplets to the filter surface and hold them there against the counter forces of flow. The continuous phase of the emulsion passes through the filter bed and emerges from the magnet virtually free of internal phase droplets. After processing for some period of time, the filter surface becomes loaded with captured material. At that time, the process flow is stopped, the magnet is deenergized, and the captured droplets are flushed from the filter bed. After this sequence, the process is begun again.

HGMS is very effective in this application where the droplets are below 1% in concentration and below 1–5 microns in size. Because of the very high intensity of the magnetic forces developed in the HGMS device, the method separates droplets of internal phase which are too small to be separated in other mechanical separators such as centrifuges or cyclones. Further, since the concentration is low, batch operated HGMS is practical because the operating time is long compared to the time required to flush the separator. Further, if necessary, multiple HGMS units can be employed to assure continuous operation.

In still another embodiment, the magnetic additive can be recovered after magnetic separation by passing the dispersed coalesced phase through a magnetic filtering means. The recovered additive can then be recycled to the process.

In still another embodiment, the effects of the magnetic additive and of the film destabilizing surfactant can be observed using a novel apparatus incorporating a microscope mounted between the poles of a magnet. In the microscopic method, a drop of the emulsion containing magnetic additive and surfactant is placed on a glass slide mounted on the stage of a microscope adapted for observation and photography using transmitted light. The microscope is mounted between the poles of a magnet. In this method one observes the effects of time and magnetic field strength on coalescence of magnetized droplets which have been treated with film destabilizing surfactants. Additionally, the method can be used to make quantitative measurements of the size and shapes of the droplets coalescing in a magnetic field. This information can be interpreted to yield the interfacial tension. The microscope provides a quick, simple, and inexpensive method for making survey measurements.

Magnetostatic coalescence has the potential for many novel applications; it may be used to replace or augment electrostatic coalescence now used in petroleum refining; it may be used in the recovery of the oil phase of OL/W emulsions produced in enhanced recovery operations in oil fields; it is especially useful in processing high water and salt content crudes; and it may be developed as a new approach to emulsion contactors for use in several innovative applications. Noteworthy among these applications is caustic washing to desulfurize and remove organic acids from gasoline feedstocks; alkylation in petroleum refining; removal of impurities from the products of chemical reactions; and selective protein recovery from fermenter broth in bioprocessing applications.

The method of the invention is applicable to breaking emulsions of high solids content and may handle thermally unstable and complex organic materials which now pose problems for solvent extraction in the biotechnology area. The magnetostatic coalescence method may also allow the use of more stable emulsions in liquid membrane technology.

Other details, objects and advantages of the present invention will become more readily apparent from the following description of the presently preferred embodiments and presently preferred methods of practicing the invention.

BRIEF DESCRIPTION OF THE DRAWINGS

In the accompanying drawings, a preferred embodiment of the present invention is illustrated, by way of example only, wherein:

FIG. 3a illustrates a preferred column packing for use in the column of FIG. 2a.

DETAILED DESCRIPTION OF THE INVENTION

Figure 1:
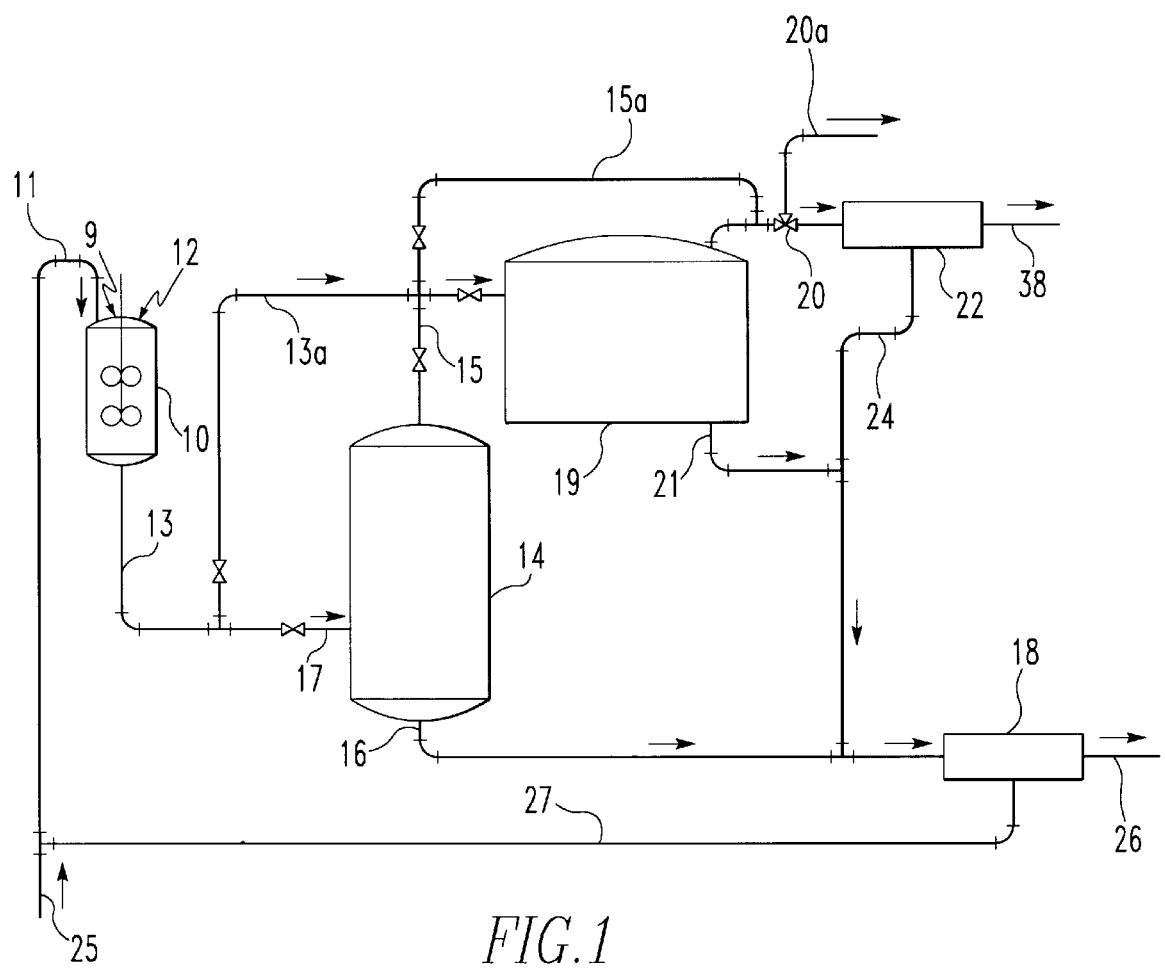
FIG. 1 is a process flow sheet for a preferred method of practicing the present invention.

Referring now to FIG. 1, there is shown a process flow sheet for use in practicing the present invention. Although the present invention may be used for breaking both W/OL emulsions and OL/W emulsions, for convenience in the present discussion, it will be assumed that a W/OL emulsion is being treated, although the present discussion is equally applicable to OL/W emulsions, as will become readily apparent to those skilled in the art.

A raw feed stream 9, such as crude oil containing a dispersed water phase, e.g., salt water, is introduced into a mixing tank 10, into which is added a first additive 11 comprising a magnetic additive which is soluble or dispersable in the dispersed phase of the emulsion. In this case, the magnetic additive 11 is soluble or dispersable in water. Also added at this stage is a second additive 12, which promotes coalescence of the dispersed phase, particularly when the dispersed phase is acted upon by a magnetic field. The resulting mixture is blended in the mixing tank 10 in order to contact the magnetic additive 11 with the raw feed dispersed phase. The emulsion 13 is then introduced into a first stage magnetic coalescer 14.

The emulsion 13 is passed continuously through the first stage coalescer 14 and, as illustrated, results in the separation of the continuous or external (organic) phase 15 from the dispersed or internal (aqueous) phase 16. Preferably, a residence time in the coalescer 14 of at least 1 minute is provided. Such a residence time compares favorably with the several hours often required for prior art electrostatic separators.

As illustrated, the first stage coalescer is preferably oriented vertically and receives the emulsion 13 at a point 17 that is below the top of the coalescer 14 and above the bottom of the coalescer 14. The details of this first stage magnetic coalescer will be described subsequently.

The coalesced phase 16 is withdrawn from the coalescer 14 as illustrated and preferably sent to a magnetic filter 18 for the recovery of magnetic additive 11. The lighter organic phase 15 is withdrawn from the top of the coalescer 14 and preferably sent to a second stage coalescer 19 comprising a magnetic field-assisted gravity separator. The second stage coalescer 19 comprises a settling tank having one or more magnets positioned beneath the bottom or above and below the tank to assist in the settling of the magnetic dispersed phase still contained within the organic phase.

As illustrated, the organic phase 15 enters the second stage coalescer 19 at a point below the top and above the bottom thereof, and the residence time in the tank 19 is sufficiently long to allow the settling and coalescence of water contained in the continuous phase. A refined continuous phase 20, in this case an organic phase, is drawn off the top of the second stage coalescer 19. A coalesced phase 21 is drawn off the bottom of the second stage coalescer 19 and combined with the aqueous phase 16 drawn off the bottom of the first stage coalescer 14 for recovery of magnetic additive.

Typically, the emulsion 13 entering the first stage 14 comprises 5–30% water while the organic phase 15 leaving the first stage 14 and entering the second stage 19 comprises less than 1% water with dispersed phase water droplets in the 5 to 10 micron size range. The refined continuous phase 20 leaving the second stage coalescer 19 generally has a water content of about 0.1% with internal phase water droplets less than 2 microns in diameter.

The refined continuous phase 20 preferably enters a third stage separator 22 comprising a HGMS polishing filter, such as described in U.S. Pat. Nos. 3,567,026, H. H. Kolm, "Magnetic Device," Mar. 2, 1971; and No. 3,627,678, P. G. Marston, et al., "Magnetic Separator and Magnetic Separation Method," both of which are incorporated in their entirety by reference herein. Although such filters are batch in operation, they can be arranged either in tandem, with one operating and the other being regenerated, such as the reciprocating separator described by Stekly (Coal Preparation Using Magnetic Separation, Vol. 2, CS-1517, Volume 2, Research Project 980-2, Z. J. J. Stekly, July, 1980, incorporated in its entirety by reference herein); or in a circular array of filters that rotate continuously through an energizing magnetic field region (as described in U.S. Pat. No. 3,920,543, "Moving Matrix Magnetic Separator," P. G. Marston and J. J. Nolan, Nov. 18, 1975, incorporated in its entirety by reference herein), providing a fresh filter while the used filters are being regenerated.

Conventional batch operated HGMS separators can be obtained from Pacific Electric Motor Company, 1009 66th Avenue, Oakland, Calif. 94621, and superconducting magnetic separators can be obtained from Advanced Cryomagnetics, Inc., 7390 Trade Street, San Diego, Calif. 92121 and Eriez Magnetics, Asbury Road at Airport, Erie, Pa. 16514-0608. Conventional HGMS and carousel separators can be obtained from Allis/Sala International A-B, S-733 25, Sala, Sweden. Eriez Magnetics supplies a carousel High Gradient Magnetic Separator using permanent magnets. A superconducting HGMS device with a reciprocating canister design can be obtained from Carpco, Inc., 4120 Haines Street, Jacksonville, Fla. 32206.

The final product, continuous phase 38, leaves the third stage separator 22 at very low concentrations of dispersed phase, generally less than 100 parts per million. When the continuous phase comprises organic liquid, this dispersed phase concentration represents virtually complete dehydration of the organic liquid. The internal phase water droplets are too small to be observed in an optical microscope.

Alternatively, a feed stream 13a from the mixing tank 10 may be bypassed from the separator 14 and fed directly to the field-assisted gravitational separator 19. In this embodiment, a refined continuous phase 20 may be passed through the HGMS polisher 22 to yield highly refined continuous phase 38. Alternatively, a refined continuous phase 20a may be drawn directly from the field-assisted gravitational separator for use.

Alternatively, the feed stream 13 from the mixing tank 10 may be fed to the coalescer 14 and the refined continuous phase from the coalescer 14 fed through streams 15 and 15a to the HGMS polisher 22 to produce a refined product 38.

Alternatively, the feed steam 13 from the mixing tank 10 may be fed via streams 13a, 15a, and 20 to the HGMS polisher to produce refined product 38.

The situations described above where the mixing tank product 13 is processed through stages 14 and 19, or 14 alone or 19 alone, before being processed through the HGMS polisher 22 are useful in the context of desalting crude oil at the refinery.

Alternatively, the emulsion 13 can be fed directly to coalescer 14, and the refined continuous phase from coalescer 14 fed to field-assisted settler 19. The refined product of the field-assisted settler may be bypassed from the HGMS polisher to provide a continuous phase 20a. Alternatively, the feed stream 13 from the mixing tank 10 may be fed to the coalescer 14 and the refined continuous phase from the coalescer 14 may bypass the settler 19 and the HGMS polisher 22 through streams 15 and 15a to provide a refined product 22a. These combinations of process operations are useful in the context of a field operation located at the well head which prepares pipeline quality crude oil.

The third stage separator 22 creates a magnetic additive-containing phase 24 which is miscible with the coalesced dispersed phases 16 and 21 and is combined therewith prior to being passed through the magnetic filter 18 for recycle of the magnetic additive 11 via stream 27. Water and hydrophilic refuse is removed from the process flow in the reject stream 26 of magnetic filter 18. Preferably, fresh water and magnetic additive make-ups 25 are supplied to the magnetic additive stream 11.

Referring now to FIGS. 2a, 2b, 3a, 3b, 3c, 3d, 4a, and 4b, the first stage magnetostatic coalescer 14 is shown in greater detail. The container and top and bottom seals for the coalescer 14 are made from non-magnetic materials and have wall thicknesses just sufficient to withstand the operating pressure and temperature used. In one embodiment, the coalescer canister is made from 1 mm thick brass and the end caps are sealed with O-rings.

Figure 3A:
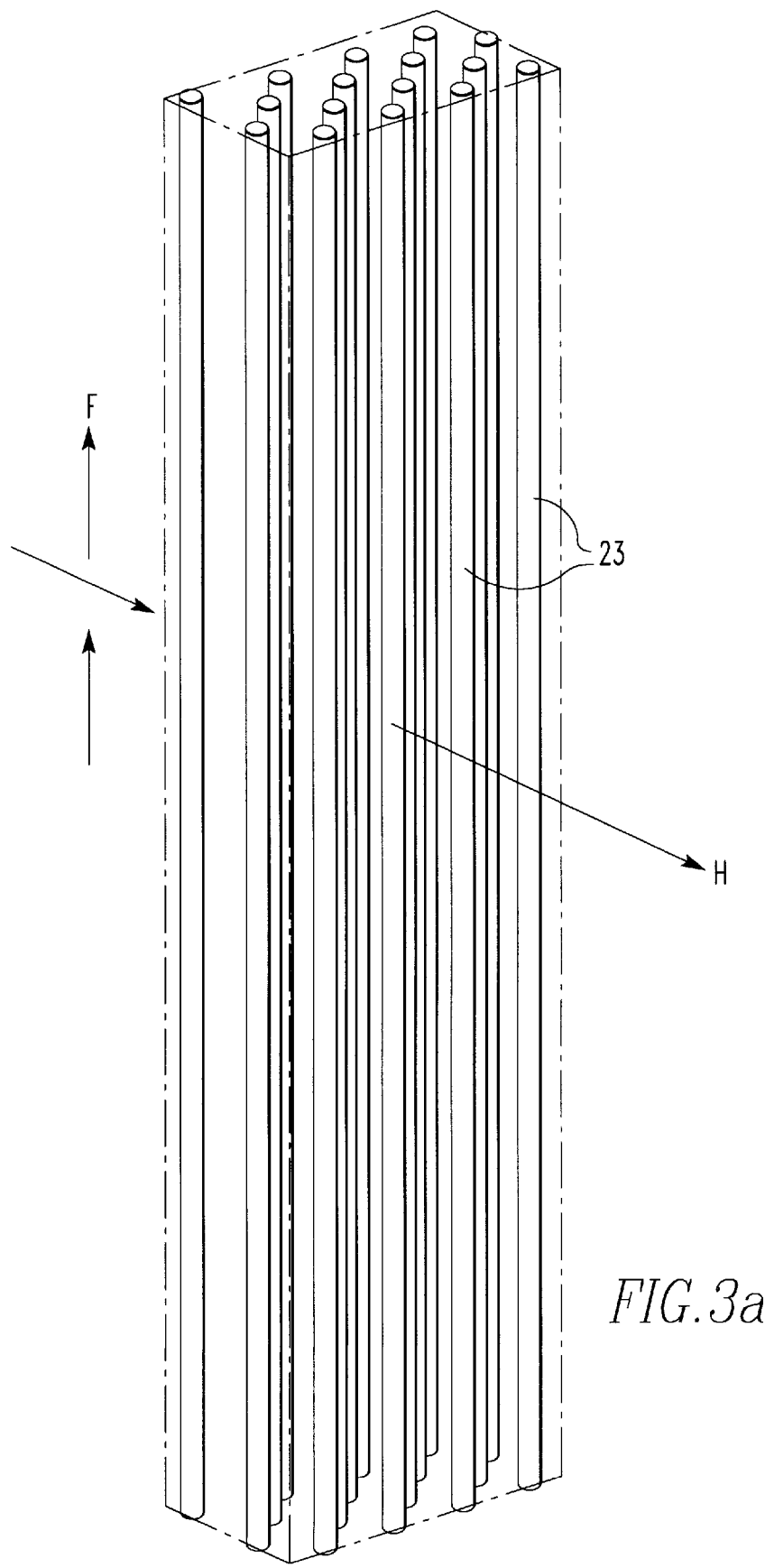

As previously discussed, the feed inlet 17 is positioned below the top and above the bottom of the first stage coalescer 14. The emulsion 13 is passed into the inlet and into the internal chambers of the coalescer 14. As illustrated in FIG. 3a, the inside of the coalescer 14 includes a plurality of spaced, vertical coalescing means such as wires or rods 23 oriented parallel to the direction of flow F in the coalescer 14. These wires 23 become magnetic through the application of the magnetic field, H, and, through fringing fields shown in FIG. 3b attract the dispersed magnetic phase to regions of high field intensity on the surface of the wires as the emulsion 13 flows through the column 14.

Figure 3B:
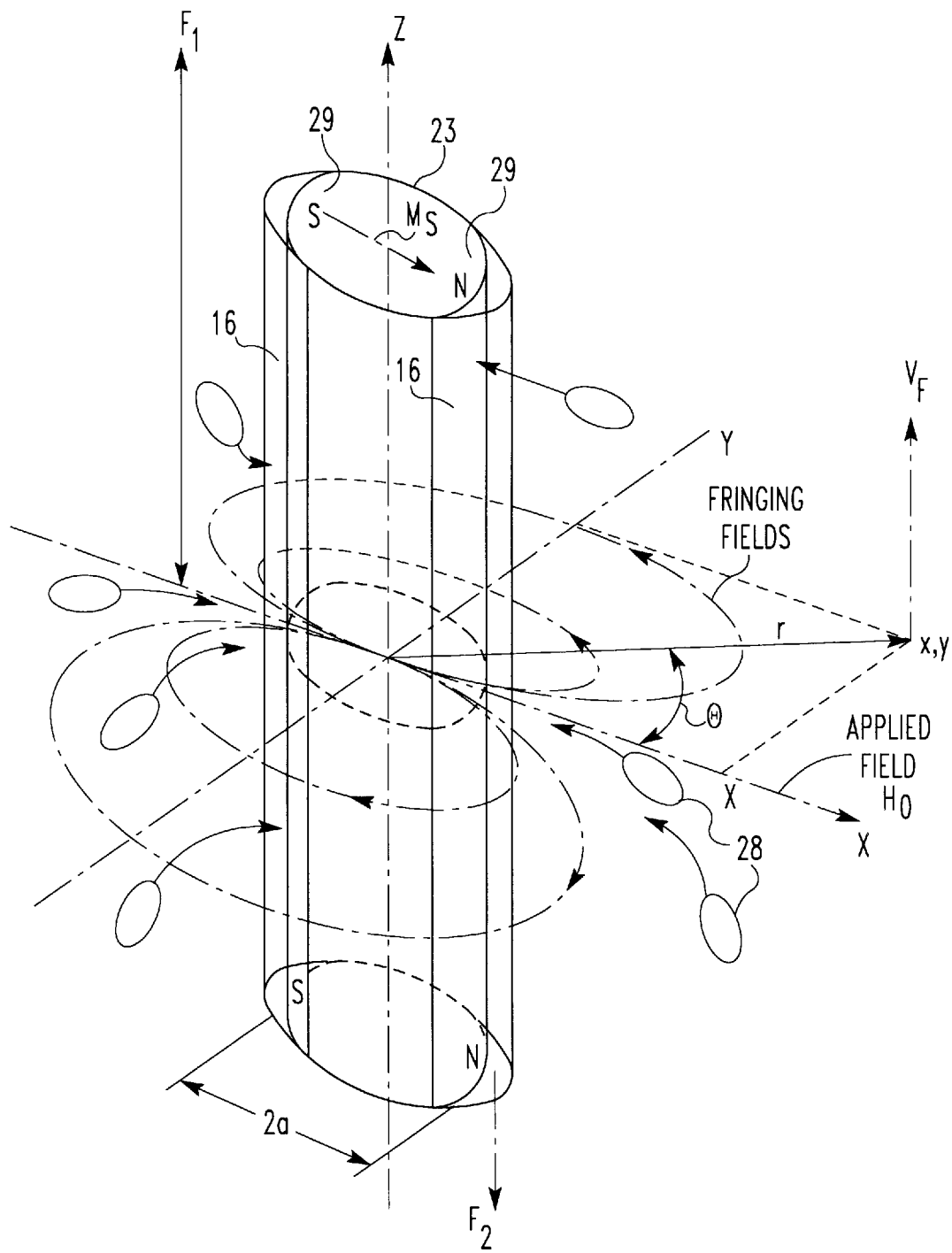
FIG. 3b is a schematic illustration of the attraction of the dispersed (aqueous) phase droplets to the polar regions of a magnetic wire in an external magnetic field.

When a uniform magnetic field ($H_o$) transverse to the lengths of the wires is used to magnetize the wires as illustrated in FIG. 3a, the resulting magnetization of the wires existing inside the wires and directed from south to north induced pole will be co-directional with the applied field as shown in FIG. 3b. As a result, the north and south poles induced along the length of the magnetic wires produce a high gradient magnetic dipolar fringing field superimposed on the inducing field, $H_o$, in the coalescer 14 in the horizontal x-y plane perpendicular to the direction of flow $F_1$ which is along the z axis. The resulting gradient magnetic field attracts the magnetized droplets in the dispersed (aqueous) phase 28, thereby bringing them to the north and south magnetic polar regions 29 on the surface of the magnetized wire where the magnetic force of attraction between magnetized droplets of the dispersed phase and between droplets and the wire is greatest. This enhanced attractive force permits compression and rupturing of the interfacial film separating the particles, thus leading to rapid coalescence.

As used herein the term "High Gradient Magnetic Field" refers to magnetic fields having field gradients typically greater than $10^4$ Gauss/cm. Gradient Magnetic Fields are employed when it is necessary to separate "magnetic" particles from process flow streams. High Gradient Magnetic Fields ("HGMF") allow separation of micron-sized particles with relatively weak magnetism.

Once the dispersed phase 28 begins to coalesce in the regions 29 on the surface of the wires 23, it is acted upon by gravity, which causes settling of the heavier phase, in this case an aqueous phase 16 and the floating of the lighter phase, in this case the organic phase 15. This settling of the aqueous phase along the negative z axis in FIGS. 3b, 3c, and 3d is not impeded by the magnetic field in the separation zone between the top and the bottom of the canister 14 of FIG. 2a. This is because the horizontal orientation of the field in the separation zone produces substantially no vertical component of the magnetic force in that region. Under action of the horizontal magnetic force which compresses the coalesced material against the wire, the coalesced internal phase forms a film extending along the length of the magnetized wire until all suitable surface area is covered. However, magnetic retaining forces are created at the ends of the wires or rods or in the region of space where the top and the bottom of the coalescer 14 passes out of the magnetic field produced by the magnet 30 of FIG. 2b. This retention force tends to keep the magnetic portion of the emulsion inside the coalescer. As additional droplets coalesce and deposit on the surface of the wire, an equal volume of coalesced material flows down the wire and deposits inside the bottom of the coalescer where the magnetic retention force is large. There the coalesced magnetic material can bridge the space between the wires 23 thus forming a plug in the inside bottom of the coalescer which prevents the light oil phase from exiting at the bottom of the coalescer. As this process proceeds to the point where the magnetic force of retention at the bottom of the coalescer can no longer support the weight of the coalesced magnetic fraction above, coalesced oil-free internal phase 16 breaks through the plug and exits the bottom of the coalescer as flow $F_2$ of FIG. 2a. Use of the added surfactant assures that the internal phase droplets will coalesce rapidly inside the separation zone of the coalescer to form large droplets which are easily attracted to the magnetic wires or rods and that the coalesced internal phase will not chain or flocculate in the magnetic field, thus assuring a "magnetic" plug of small thickness and an oil-free discharge 16 at the bottom of the coalescer 14. It is now apparent that the first stage coalescer input 17 should be located above the top of the "magnetic" plug.

The wires or rods 23 may themselves be fabricated of a permanent magnet material to be described subsequently. In this case the wires 23 provide their own magnetic field H, as each wire is a permanent magnet; thus no external magnet, e.g. 30 in FIG. 2b, is required. In this embodiment, the magnetic wires 23 should be designed such that the magnetic field H produced is transverse to the length of the wires 23.

Consider now a droplet of magnetic internal phase at the coordinate (x,y) which has radius vector r and azimuthal angle θ shown in FIG. 3b. The droplet has a vertical component of velocity, $V_f$(cm/sec), directed along the z-axis which carries it through the system. The droplet, moving in the magnetic field produced by the magnetic rod 29 and the applied magnetic field $H_o$, is attracted to the wire by a magnetic force $F_m$ (dynes). It will collide with the wire and be collected if the time required for deflection to the surface of the wire is less than or equal to the residence time, T(sec), for flow through the device. T is given by, $T=L/V_f$ where L(cm) is the length of the separator. The conditions under which this can be achieved are determined by a balance between the magnetic and viscous force $F_v$ (dynes) operating in the system.

The magnetic force on the particle is given by the product of its magnetic moment mσ, where m (gm) is the particle mass and σ (emu/gm) is the specific magnetic moment, and the component of the magnetic field gradient directed along the magnetic moment, $$F_m = m(\sigma \cdot \nabla)H.$$

For motion of micron sized droplets moving toward the wire, the relative velocities are small, the viscosities of the emulsions of interest are relatively large, and the Reynolds number is very low. Under these conditions, it is assumed that the viscous drag is approximated by Stokes law, $$F_v = 6\pi\eta RV$$

where η is the liquid viscosity measured in poise (gm/cm/sec), and V(cm/sec) is the velocity of movement toward the magnetized wire. In this approximation, the internal phase droplets are assumed to be spheres of radius R (cm). This leads to an overestimate of the viscous drag since the magnetized droplets are prolate ellipsoids stretched along the magnetic field lines. With transverse areas smaller than the equivalent sphere of equal volume, ellipsoids exhibit smaller drag resistance.

Under the conditions described above, the velocity of motion toward the wire is determined from the balance of the magnetic and the viscous forces, assuming that inertial forces may be neglected, $$mdv/dt = F_m - F_v \equiv 0.$$

$$F_m = m(\sigma \cdot \nabla)H = 6\pi\eta Rv = F_v \text{ and,}$$

$v=m/(6\pi\eta R)(\sigma\cdot\nabla)H.$

Using a vector relationship, one can rewrite the expression for $(\sigma\cdot\nabla)H$, using $(\sigma\cdot\nabla)H=\nabla(\sigma\cdot H)-(H\cdot\nabla)\sigma-\sigma\times(\nabla\times H)-H\times(\nabla\times\sigma).$ In the region of space surrounding the wire, there are no sources of electric current, so the term $(\nabla\times H)=0$.

Similarly, for the case where the magnetic moment of the internal phase is induced by the magnetic field H, the term $(\nabla\times\sigma)$ is also zero. For this case, $v=(\frac{1}{2})*m/(6\pi\eta R)\nabla(\sigma\cdot H)$ The magnetic field in the region of space surrounding the wire consists of an applied magnetic field, $H_{app}=H_o*\{\cos(\theta)\epsilon_r-\sin(\theta)\epsilon_\theta\}$ which is constant in magnitude and direction and a field generated by the magnetized wire, $H_w=[4\pi M-(\mu-1)H_o]/(\mu+1)*(a/r)^2\{\cos(\theta)\epsilon_r+\sin(\theta)\epsilon_\theta\}$ $\epsilon_r$ and $\epsilon_\theta$ are unit vectors in the r and $\theta$ directions (See *Electromagnetism* by John C. Slater, p. 72, McGraw-Hill, New York, 1947.). M is the magnetization, magnetic moment per unit volume, of the magnetized wire of radius a and $\mu$ is the magnetic permeability of the surrounding emulsion. For non-magnetic material $\mu=1$.

In the special case where the magnetic moment of the internal phase droplets is "paramagnetic" in behavior, $\sigma=\chi_g H,$ the expression for the velocity can be given as, $v=(\frac{1}{2})*(2/9\rho R^2\chi_g/\eta)*\nabla[H_o^2+K^2/r^4+2(H_oK/r^2)*\cos(2\theta)]$ where $K=a^2\{4\pi M-(\mu-1)H_o\}/(\mu+1)$
and $\chi_g$ is the specific magnetic susceptibility of the internal phase droplet containing the magnetic additive. The assumption of paramagnetism is justified for the case of water in oil emulsions where the magnetic additive is Georgia Pacific's iron ligno-sulfonate. Our measurements have shown that the Georgia Pacific dry iron ligno-sulfonate magnetic additive is superparamagnetic. It has a saturation magnetic moment of 16 emu/gm in a magnetic field greater than 1000 gauss. The non-hysteritic paramagnetic susceptibility in a field less than 1000 gauss is nominally $16,000*10^{-6}$ cm$^3$/gm.

The velocity components are now determined by the following equations: radial component of the velocity:

$dr/dt=-2V_m(a/r)^3[k/r^2H_o+\cos(2\theta)],$ azimuthal component of the velocity:

$rd(\theta)/dt=-2V_m(a/r)^3\sin(2\theta),$ where $V_m=(2/9)\rho R^2\chi_g H_o\{4\pi M-(\mu-1)H_o\}/a(\mu+1)\eta$.

For the case of emulsions containing ferrofluid inclusions, the value of $\mu$, determined from the relationship, $\mu=1+4\pi\rho\sigma_e/H$ is approximately equal to 1. $\sigma_e$ is the specific magnetic moment of the emulsion consisting of organic liquid, water, and magnetic additive. $\rho$ is the density (gm/cm$^3$). It is a number of the order of 1.

The magnetic moment of the emulsion is approximated by, $\sigma=\chi_e*H.$

The static specific magnetic susceptibility, $\chi_e$, is determined from the concentrations and susceptibilities of the components using the relationship, $\chi_e=W_o*\chi_o+W_w*\chi_w+W_a*\chi_a,$ where $\chi_o=-0.8*10^{-6}$ cm$^3$/gm is a typical specific magnetic susceptibility of hydrocarbon liquids such as crude oil, $\chi_w=-0.72*10^{-6}$ cm$^3$/gm is the static specific magnetic susceptibility of water and $\chi_a$ is the specific magnetic susceptibility of the magnetic additive. For emulsions containing up to 75% water, the weight fraction of the additive used, $W_a$, is less than 0.03 to 0.06. Using the above values, $\chi_e \approx W_a*\chi_a \approx 300*10^{-6}$ cm$^3$/gm and the expression $4\pi\rho\sigma_e/H$ appearing in the equation for $\mu$ above is indeed much less than 1. For the emulsions of interest, $\mu\approx 1$.

Many combinations of magnetic fields, magnetic field gradient producing means, and emulsion flow directions are possible. One can use vertically oriented permanent magnets or magnetizable wires in externally applied fields or combinations of the two. Further, one can flow the emulsion along the lengths of the magnetized wires or transverse to them. These possibilities are described in the following discussion of the mechanism.

Consider the case of a permanent magnet of magnetization M and radius a which produces the fringing magnetic field as shown in FIG. 3c. In this case there is no external field $H_o$ and the equations of motion are:

$dr/dt=-2V_m'(a/r)^5$—radial velocity $rd\theta/dt=0$—azimuthal velocity $V_m'=(2/9)\rho R^2\chi_g(4\pi M/2)*(4\pi M/2a\eta)$ The magnetic and viscous forces are equal for a particle of radius R and density $\rho$ moving with velocity $V_m'$ relative to a liquid of viscosity $\eta$ in the magnetic field produced at the surface of the permanent magnet, $H=4\pi M/2$ (gauss), and magnetic field gradient equals $4\pi M/2a$ (gauss/cm).

The radial velocity is not dependent on the angle and the azimuthal velocity is identically zero. Internal phase droplets flowing upward along the length of the magnet will be drawn to the surface of the permanent magnet equally from all directions. Consequently, coalesced material will coat the permanent magnet rod over its whole surface.

The above equations of motion are solved by $V_f=-[2/I(\alpha)]*V_m'*L/a=12A_a^3/(A_c^3-A_a^3)*V_m'*L/a.$ where $I(\alpha)=\int_\alpha^1 p^5dp = 1/6*(1-\alpha^6) = -1/6*(A_c^3-A_a^3)/A_a^3.$ $A_c$ is an area of radius equal to $\alpha*a$ around the wire from which the particles will be collected when flowing through the system with velocity $V_f$, $A_a$ is the cross-sectional area of the rod or wire, $A_a=\pi a^2$.

The equation for $V_f$ offers a simple and intuitive way to visualize the separation mechanism and to scale the system throughput. The flow velocity, $V_f$(cm/sec) defines the device throughput, GPM/Ft$^2$. One desires to have this as large as possible. It is determined by $V_m'$, the flow velocity for which the Stokes Law viscous drag force is equal to the magnetic force at the surface of the wire, by the ratio of coalescer length L to wire radius a, and by the cross-sectional area in the flow around the magnetic wire from which internal phase droplets are to be separated by the magnetic force. The larger the area for separation, the slower is the flow through the coalescer.

A multiplicity of permanent magnets can be used to increase the cross-section from which particles will be separated, and hence to increase the throughput. The spacing of the magnets, $R_c$, can be adjusted so that the cross-sectional areas for collection, $A_c$, overlap—thus assuring the separation of internal phase droplets. The radius of capture, $r_c$, is given by $$r_c/a=[1+12(V_m'/V_F)(L/a)]^{1/6}=[1+12(V_m'/a)T]^{1/6}$$

where T(sec) is the retention time in the coalescer.

The directions of the magnetic moments of the individual permanent magnet rods can be arranged at will, which is not the case when an external magnetic field is used to magnetize fringe field producing magnetic wires. Because of this, it is possible to arrange the moments to be co-linear but not co-directional. This results in an arrangement of like poles opposing which produces greater magnetic field gradients in the region between the rods than when opposite poles are adjacent. This increases the magnetic force and hence the system throughput.

Consider now the case where a constant external magnetic field $H_o$ directed along the +x-axis is employed as is shown in FIG. 3b. The wires of radius a are assumed to have magnetization M. As given above for the case where $\mu$ is approximately equal to 1, the velocity components are determined by the following equations where p=r/a: radial component of the velocity:

$$dp/dt=-2*(V_m/a)*(1/p^5)*[K+p^2\cos(2\theta)]$$

azimuthal component of the velocity:

$$pd\theta/dt=-2*(V_m/a)*(1/p^3)*\sin(2\theta),$$

where $V_m=2/9\rho R^2\chi_g H_o 4\pi M/2a\eta$ and $K=4\pi M/2H_o$.

The force of attraction drawing the internal phase droplets to the magnetic surface can be greater than for the permanent magnet alone because of the presence of the applied field and is dependent on the (x-y) coordinates of the magnetic droplet. The droplets are not drawn to the surface equally from all directions and they may not cover the entire surface of the magnetic element. Within +/−45 deg of the + or the − x-axes the radial force is attractive. Droplets moving upward along the z-axis within this sector will be drawn to the surface of the wire. Within +/−45 deg of the + or the − y-axes, the force is less attractive and can be repulsive if the applied magnetic field $H_o$ is greater than the field from the wire or rod, $(4\pi M/2)(a/r)^2$ at the field site. The field lines which emerge from the north pole of the magnetized wire or permanent magnet become oppositely directed from the applied field within this sector. The azimuthal motion will be directed toward the = x-axis for particles in quadrant I and IV, the motion will be directed toward the − x-axis for particles in quadrants II and III. Accordingly, the coalesced droplets will deposit on the north and south polar regions of the magnetic surface as shown in FIG. 3b. If $H_o$ is greater than $4\pi M/2$, no material will deposit on the surfaces generally at right angles to the poles.

A multiplicity of wires and permanent magnets can be used to increase the cross-section for capture of particles from flow. Closely spaced magnetic elements arranged so that the capture zone of one overlaps the repulsive zone of the other will be most effective in sweeping the stream of droplets. For magnetizable wires, the magnetic moments will align with the applied magnetic field. For permanent magnet rods, the moments can be aligned independently to achieve best separation as described above. The spacing between magnetic elements will be a few, and preferentially two to four, wire diameters. Additionally, flow diverters can be introduced along the length of flow path inside the coalescer to promote mixing. The purpose of the mixing is to prevent channeling up through the region, between the wires at 90 degrees to the induced poles where particle separation is weakest.

The coalescer can operate with the process flow transverse to the length of the vertically oriented magnetic elements. Consider the case of a droplet with coordinate (x,y) moving along the −x direction with flow velocity $V_f$ as shown in FIG. 3d. A magnetic field constant in magnitude and direction is applied along the + x direction. For this case one determines a distance along the +/− y axes, $R_c$, such that all droplets impinging on the rod with initial velocity $V_f$ directed along the −x axis will be captured if their y coordinates lie within a range $R_c$ of the wire, $|y/a|\leq R_c$. The capture radius for this case has been related to $V_m$ and $V_f$ by Watson (J. H. P. Watson, J. Appl. Phys. 44, No. 9, 4209–4213, September, 1973). Treatments of capture from flow by electric forces has been given by Zebel (G. Zebel, J. Colloid Sci. 20, 522 (1965) and the case of viscous flow has been treated by Davies (C. N. Davies, Proc. Phys. Soc. Lond. A63, 288 (1950). These are incorporated in their entirety by reference herein.

Magnetizable wires and permanent magnet rods can be used in combination. A feature of this combination in the transverse flow arrangement is the fact that the magnetic moments can be oriented so that the regions of greatest magnetic capture force, at the north and south poles of the magnetic elements, occur over the regions of stagnation in the flow pattern around the wires. These occur on the leading and trailing faces of the wire as shown in FIG. 3d. With this arrangement, there is little tendency for the flowing emulsion to drag the coalesced liquid off of the wire so that drainage is not impeded. Use of permanent magnets in addition to wires has the effect of increasing the capture radius, $R_c$, since the permanent magnets capture over a larger portion of the surface in an external field than do wires.

As described above, many magnetic elements may be placed in the flow path so that the probability of capture is high in the transverse flow case. Magnetic filter performance under these conditions has been given by Bean (C. P. Bean, Bull, Am. Phys. Soc. 16, 350 (1971), Watson (see above) and Oder (R. R. Oder, IEEE Transactions on Magnetics MAG-12, No. 5, 428–435, September, 1976), incorporated in their entirety by reference herein.

It is apparent that strongly magnetic droplets are preferred, and that the system throughput increases with magnetic velocity, $V_m$, and with the ratio of separation flow path length, L, to magnetic element radius a.

It is desirable but not necessary that the wires 23 be wetted by the phase they attract. It has been discovered that the magnetic force of attraction compressing internal phase droplets containing ferrofluids against the magnetized surfaces can be much larger that surface tension effects. Because of this, droplets which would not spread over the magnetized surface in zero applied magnetic field will coat the polar regions of the wire in low level magnetic fields of the order of a few hundred gauss. In the case of an aqueous dispersed phase, metallic wires which are magnetic, such as those composed principally of combinations of iron, cobalt or nickel can be used. Wires made from permanent magnetic materials, such as compounds of aluminum, cobalt, and nickel (ALNICO), samarium cobalt, strontium-based materials, or neodymium-iron-boron compounds, are also acceptable. When oil comprises the dispersed phase, the magnetic wires 23 may be bare or coated with an oleophilic material such as plastics, polymers, or other material that is susceptible to wetting by organic liquid. The coating should obtain the desired wettability but not so thick as to significantly diminish the magnetic field strength on the outside surface of the film next to the liquid phase. A thickness of about 2–10 microns is acceptable for most applications.

As illustrated, the magnetic field, H, is generated in the first phase coalescer 14 in a direction perpendicular to the flow $F_1$ and $F_2$ of the phases 15 and 16 through the separator 14. Preferably, a magnetic field H of at least 500 Gauss and more preferably 1600 Gauss is applied to the magnetic separator 14.

Referring now to FIG. 2b, the magnet 30 used for inducing the magnetic field H in the first stage coalescer 14 is preferably an electromagnet with the pole arrangement as illustrated. The magnet poles 31a and 31b shown in FIG. 2b are designed to produce a substantially uniform magnetic field H throughout the volume of the coalescence chamber 14.

The electromagnet shown in FIG. 2b is a conventional "C" shaped iron return frame which is energized by magnet windings 32 made from copper or other good electrical conductors. Enough ampere-turns must be provided to produce a magnetic field of 1600 Gauss and, for exploratory work, preferably up to 20,000 Gauss in the magnet pole gap 33 containing the first stage coalescer 14. For bench scale magnets, with air gaps of 1 to 2 cm, air cooling of the magnet windings is sufficient. For large scale applications where the gap may be substantially greater than 2 cm, water cooled copper windings may be used. The magnet pole width, $W_m$, is substantially equal to the width, $W_c$, of the coalescer canister 14. The gap, G, between the poles 31a, 31b and the depth, $D_c$, of the canister 14 are designed for a loose fit since it is desirable to minimize the air gap separating the walls of the coalescence chamber 14 and the magnet poles while maintaining ease of assembly.

The length, $L_m$, of the flat vertical portions of the magnet poles 31a, 31b is less than the length, $L_c$, of the coalescence chamber. The steep slope of the pole edges at the top of the poles provides a strong downwardly directed magnetic force at the top of the coalescer 14 which holds the dispersed phase in the coalescer while allowing the non-magnetic continuous phase to exit the coalescer. Similarly, the relatively low slope of the pole edges at the bottom of the coalescer 14 determines the upwardly directed magnetic force which tends to keep the coalesced disperse phase inside the coalescer volume. By controlling this slope, the depth of the "magnetic" plug formed by the coalesced internal phase in the bottom of the coalescer can be controlled. Plug depths which exceed the weight bearing capacity of the "magnetic" plug at the bottom of the coalescer are not stable. Coalesced material penetrates such a plug and exits the bottom of the coalescer under action of its weight. It is desirable that the plug depth be as small as possible so as to maximize the coalescer volume available for separation of the emulsion internal phase.

The electromagnet 30 is designed so that different poles can be put in place around the coalescence canister 14. The poles are secured in place by bolts extending through bolt holes 34 in the iron return frame. In this manner, poles designed to produce differing distributions of the magnetic field throughout the volume of the coalescer can be employed. These distributions can include fields which are substantially uniform throughout the working volume of the coalescer or gradient fields which are non-symmetric and directed toward one pole or the other.

Electromagnets for use with the coalescer can be obtained from a variety of suppliers such as Walker Scientific Inc., Rockdale Street, Worcester, Mass. 01606. It will now be apparent to one skilled in the art of magnet design that a variety of magnet configurations and pole pieces could be employed which produce the desired magnetic field distribution throughout the volume of the coalescer 14. The electromagnet 30 is preferred in cases where it may be necessary to change the magnetic field strength H.

In another preferred embodiment of the invention, the magnet 30 used in the first stage coalescer 14 could be a permanent magnet or a superconducting magnet. Permanent magnets may be used to magnetize small volumes, the electromagnet can be used for intermediate size volumes; and superconducting magnets are used for magnetizing very large volumes or in special cases where field strength greater than 2 Tesla would be needed.

When the electromagnet illustrated in FIG. 2b is replaced by a permanent magnet, the iron return frame can be retained, but no energizing coils are required. In another preferred embodiment the wires 23 can be replaced by permanent magnet rods magnetized transverse to their lengths. In this case no electromagnet is required to magnetize the rods. The magnet poles or the magnetized rods are made of permanent magnet materials such as: samarium cobalt rare earths, neodymium-iron-boron materials, ALNICO magnets, or strontium-based ceramic materials. Permanent magnets can be obtained directly from companies such as Tridus International of 500 Carson Place Drive, Suite No. 113, Carson, Calif. 90746 or from suppliers such as Bunting Magnetics Co., 500 South Spencer Avenue, Newton, Kans. 67114-2020.

When the rods are permanently magnetized transverse to their lengths as described above, the directions of their individual magnetization in the horizontal plane can be arranged at will. For example, the rods can be oriented so that the direction of their magnetization are all parallel with the north pole of one rod adjacent to the south pole of the next. This is similar to the orientation of the magnetization induced in the magnetic wires 23 when a uniform applied magnetic field is used.

In another example,the rods can be oriented with their poles opposing. In this case the magnetic field lines emerging from like poles repel one another and the magnetic field gradients produced are large. It is apparent that when permanent magnets are used, the direction of the individual magnetization can be oriented so as to enhance coalescence and separation forces.

A superconducting magnet may be used in place of the electromagnet. In this case, the iron return frame is retained but the energizing coils are made of superconducting material such as niobium-titanium, niobium-tin or high temperature superconductors such as yttrium-barium-copper-oxide, bismuth-strontium-calcium-copper-oxide, and thallium-based copper oxides, as described by I. Amato, "New Superconductors: A Slow Dawn," Science 259, pp. 306–308, Jan. 15, 1993 (incorporated in its entirety by reference herein). The coils are contained inside a cryostat for cooling. Liquid helium is used for the niobium based superconductors. Helium, nitrogen, or other suitable refrigerant may be used for the other superconductors. Superconducting magnets may be obtained from a number of suppliers such as Advanced Cryomagnetics, Inc., 7390 Trade Street, San Diego, Calif. 92121.

In a highly preferred embodiment of the invention, the magnetic elements 23 are distributed non-uniformly in the coalescer 14 to assist in the complete resolution of high internal phase content emulsions. Two alternative arrangements are shown schematically in FIGS. 4a and 4b, which demonstrate the elements 23 arranged in a non-uniform sequence of sections 23a, 23b, and 23c which progress from a section having a lower concentration of thick elements, 23a to a section having a higher concentration of thin elements 23c. This arrangement allows for the separation of smaller internal phase droplets from the top 23c which run down the elements and are joined with other droplets, becoming larger and larger. The wider spacing in the lower regions 23a of the elements allows for these larger droplets to drain more freely without plugging the coalescer 14. Droplets coalesced on the rods 23c in the upper portion of the coalescer will flow to the bottom of the rods 23a because magnetic forces will cause the draining material to connect between the vertical rods at the interfaces between regions 23c and 23b and between 23b and 23a.

The present method is different from prior art in that vertically oriented magnetic wires or rods are employed to produce a non-uniform magnetic field in the emulsion for the purpose of attracting fine sized and low concentration droplets to the wire surfaces and to provide a flow path for separation of coalesced internal phase from the process flow. The coalescer is designed so that the magnetic force of attraction is greater than the viscous drag force. Additionally, the use of vertically oriented wires magnetized transverse to their lengths results in a magnetic force of attraction to the wires with substantially no vertical component except at the ends. Because of this, the magnetic force in the separation zone cannot support the weight of the coalesced droplets and they drain along the surface of the magnetic element to a pool in the bottom of the separator where a "magnetic" plug is formed. The plug serves as a valve regulating the withdrawal of the coalesced phase from the separator and also serves to prevent inadvertent loss of the continuous phase of the emulsion through the coalesced phase exit port.

Use of the added surfactant is an adjunct to the separator technology. The surfactant promotes rapid coalescence throughout the working volume of the coalescer, thus enhancing magnetic capture of the enlarged droplets by the fringing fields. Further, use of the surfactant diminishes the tendency of the coalescing droplets to chain or flocculate. This reduces the volume occupied by the "magnetic" plug at the bottom of the coalescer and reduces the amount of the continuous phase of the emulsion which is lost in the stream separated at the bottom.

Figure 5:
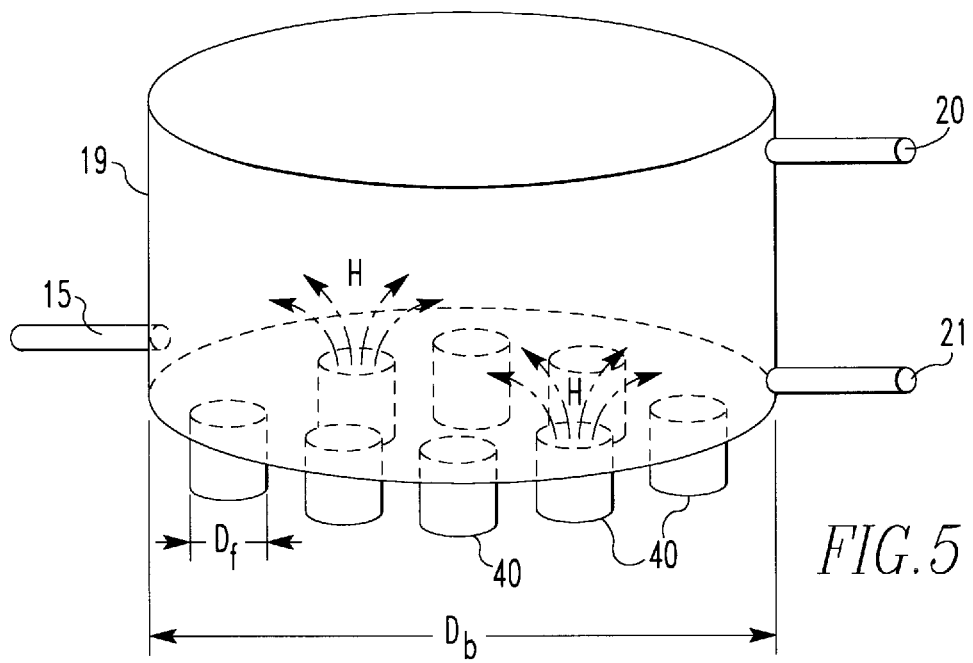
FIG. 5 schematically illustrates a magnetic field-assisted-settler with permanent magnets according to the present invention.

Referring now to FIG. 5, a schematic illustration of a magnetic field-assisted settler 19 of the invention is shown. The settler is designed for separation of a magnetic water phase from a non-magnetic and less dense immiscible liquid phase. The magnetic field H in the magnetic-field-assisted-settler 19 is strongest on the bottom of the vessel 19 so as to encourage coalescence and to enhance settlement of the magnetic dispersed phase particles in the direction of gravity. The gradient of the magnetic field strength is chosen so that the field extends substantially throughout the volume of the vessel 19, being strong in the volume below the inlet and being strongest at the bottom.

In a preferred embodiment the field is produced by permanent magnets 40 arranged underneath the bottom of the coalescer vessel 19 as shown in FIG. 5. The walls and the top and bottom of the vessel 19 are made from non-magnetic material. A multiplicity of permanent magnets 40 of face diameter $D_f$ small compared to the bottom diameter $D_b$ of the vessel 19 are employed.

The permanent magnets 40 preferably produce a magnetic field measured on the inside bottom face of the container 19 of at least 800 Gauss and can be placed in contact or can be spaced substantially apart from one another over the bottom face of the container 19.

The magnets 40 can be arranged with all north poles upward, all south poles upward, or with alternating arrangements of north and south poles for neighboring magnets. The objective of the arrangement is to have magnetic field lines diverging or converging at the bottom of the vessel 19 with field gradients of 1000 Gauss/cm or greater in order to produce a magnetic force codirectional with gravity to assist in settling of the magnetic dispersed phase of the emulsion. The magnetic field gradient is determined approximately by H/D where H is the magnetic field (Gauss) at the face of the magnet of diameter D (cm).

The regions of intense magnetic field can be arranged to be applied at the bottom or the top of the magnetic field assisted coalescer 19 depending upon whether the dispersed phase is heavier or lighter than the continuous phase of the emulsion. The objective of the gradient magnetic field is to bring the magnetic internal phase droplets together so they can coalesce. The objective of the non-symmetric gradient magnetic field is to assist buoyancy forces to speed separation of the coalesced droplets. For example, when the magnetic dispersed phase is water and the continuous phase is an immiscible liquid of density less than that of water such as light mineral oil or crude oil, then the magnets would be arranged in or under the bottom the coalescer 19. If the magnetic dispersed phase is water and the immiscible continuous phase is a heavier liquid such as a fluorochlorocarbon, e.g., perchloroethylene, then the dispersed phase will rise and the magnets would be arranged at the top of the coalescer 19 to assist buoyancy. When the continuous phase is water and the magnetic dispersed phase is a light organic liquid such as mineral oil or heptane, then the magnets would be arranged at the top of the coalescer 19. Lastly, when the magnetic internal phase is a dense liquid such as a flurochlorocarbon, and the continuous phase is less dense, such as water, then the magnets would be arranged on the bottom of the coalescer 19.

The separator of the present invention can also be used in the absence of gravitational forces assisting in the breaking and/or separation of the phases comprising the emulsion. This would primarily occur in zero gravity or near-zero gravity environments, such as outer space, where only the magnetic forces [or possibly, as in the embodiment of FIG. 9(a), centrifugal forces] acting upon the emulsion would cause the migration of the dispersed phase for separation from the continuous phase.

Another situation in which gravity would be of little, if any, help in assisting in the emulsion breaking and/or separation is in the case of immiscible liquids having substantially the same density, i.e., a mixture comprising water and an organic liquid of specific gravity—1.0.

In both these situations, the magnetic field and magnetic field gradient must be sufficient to achieve the desired separation without reliance on gravitational forces.

Figure 6:
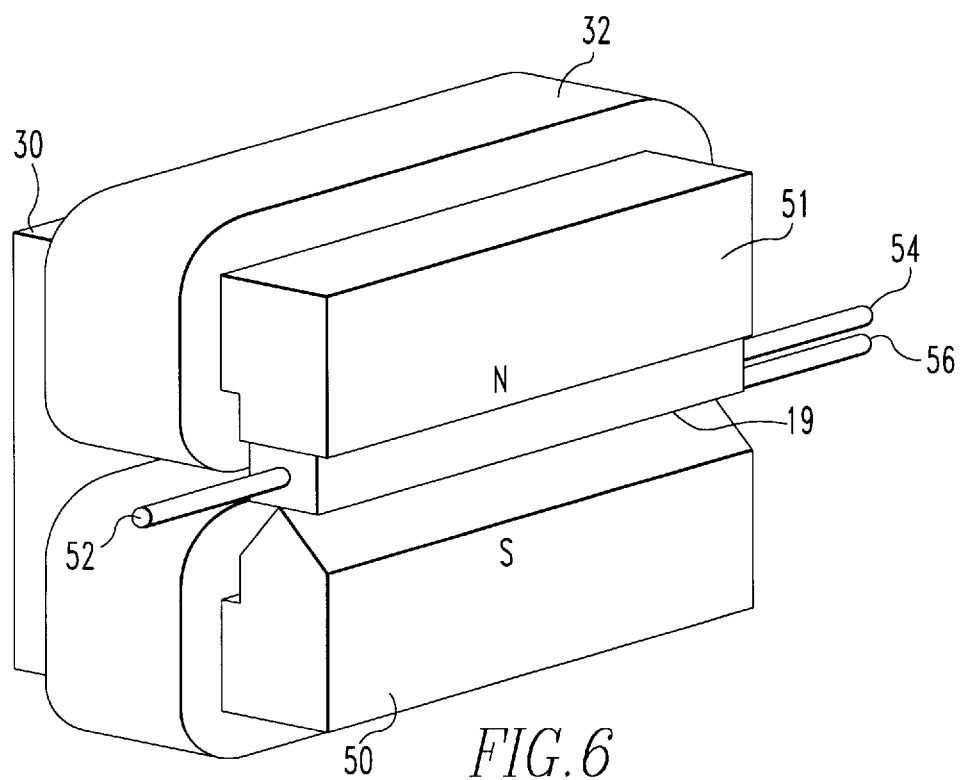
FIG. 6 schematically illustrates a magnetic-field-assisted-settler with an electromagnet according to the present invention.

An alternative preferred embodiment of the magneticfield-assisted-settler 19 is shown in FIG. 6 where an electromagnet or a superconducting magnet 30 is used to produce the gradient magnetic field. In the figure, the north and south poles of the magnet are arranged horizontally as contrasted to the vertical arrangement of FIG. 2. In FIG. 6, the emulsion inlet 52 is above the bottom and below the top of the cell 19. The bottom pole S 50 of the electromagnet is "V"-shaped with the tip upward so that field lines from the substantially flat top pole N 51 converge on the bottom of the cell 19. The dehydrated organic phase of the emulsion is drawn out through the outlet 54 at the top of the cell. The coalesced internal phase is drawn out through an outlet 56 connected so as to drain the bottom of the cell.

It will now be apparent to one skilled in the art of magnet design that a variety of choices of permanent magnets and of their arrangements over the bottom of the coalescer cell 19 can be chosen and that a variety of electromagnet designs and of pole tip configurations are available for producing the desired codirectionality of settling and magnetic forces so as to speed the coalescence and separation processes in the second stage coalescer 19.

As stated previously, referring again to FIG. 1, the refined continuous phase 20 from the settling tank 19 is preferably passed through a HGMS polishing filter 22 for additional dispersed phase removal and additive concentration. The HGMS polishing filter is batch, reciprocating or carousel design as previously described. The magnetic filter material is preferably fine grade carbon steel or ferritic stainless steel wool packed to nominally 6–10% packing density. Magnetic fields of at least 500 Gauss are employed with retention times in the field of at least one minute, preferably four minutes or more. The refined continuous phase 20 is pumped through the magnetized filter bed until breakthrough of the magnetized internal phase is detected in the outflow. At that time, the unit is de-energized and the captured water and its load of magnetic additive and connate hydrophilic impurities (24) is flushed using water, compressed air, or other means. The operation of HGMS filters is reviewed by R. R. Oder in "High Gradient Magnetic Separation: Theory and Applications," IEEE Transactions on Magnetics, Vol. MAG-12, No. 5, pp. 428–435 (September, 1976), incorporated in its entirety by reference herein.

The coalesced internal phases, 16, 21, and 24, extracted from the first 14, second 19, and third 22 coalescence stages, respectively, are processed through an HGMS filter 18 for separation of excess water and connate solids and hydrophilic impurities 26. Make-up water 25 is added to the high solids additive stream 27 recovered from the filter 18 and issued (11) to the mixing tank 10. The magnetic filter 18 is of the batch, reciprocating, or carousel designs previously described.

The magnetic capture element of the magnetic filter 18 is preferably fine grade carbon steel with strand diameters of 20–30 microns or fine grade ferritic stainless steel wool with strand diameters of approximately 60 microns. The steel wool is to be packed to a density of 6% to 12%. Alternatively, magnetic filter beds packed with steel wool chards, fine magnetic particles substantially finer than 44 microns, or ultra-fine magnetite with particles substantially finer than 10 microns can be used. Magnetic fields of 20,000 Gauss and retention times greater than one minute are preferred. Alternative methods of recovering the magnetic additive for reuse include evaporation and ultra-filtration. Ultra-filtration equipment for use in this application can be obtained from Niro Hudson, Inc., 1600 County Road F, Hudson, Wis. 54016.

Depending on the nature of the dispersed phase, the magnetic additive may be selected from the group consisting of water-soluble ferromagnetic compounds, oil-soluble ferromagnetic compounds, and water or oil dispersable stabilized ferromagnetic fluids. Water-soluble ferromagnetic compounds are used in the case of water-in-oil emulsions, whereas oil-soluble ferromagnetic compounds are used in the case of oil-in-water emulsions. Ferromagnetic fluids may be used in both situations.

In the case of water-soluble magnetic additives, preferred examples include iron lignosulfonate, iron sulfonated tannins, iron sulfonated phenols, and hydrophilic stabilized suspensions of magnetic particles such as iron or magnetite.

Another preferred magnetic additive for use in water-in-oil emulsions consists of $\gamma$-$Fe_2O_3$/polymer nanocomposites prepared from ion exchange resins (as described in Ronald F. Ziolo, et al., in Science 257, pp. 219–223, 10 Jul., 1992, incorporated in its entirety by reference herein).

In the case of oil-soluble additives, preferred examples include iron naphthenate and oil-dispersable ferromagnetic fluids prepared by Kalafalla and others and reviewed by J-Y Hwang in U.S. Pat. No. 4,834,898, "Reagents for Magnetizing Nonmagnetic Materials," May 30, 1989, incorporated in its entirety by reference herein.

The second additive, typically a surfactant, is chosen as one which promotes coalescence of droplets comprising the dispersed phase, particularly when those droplets are acted upon by a magnetic field. Examples of compounds which work as the second additive include alkyl phosphate ethoxylate (MERPOL® A, manufactured by DuPont) and polyalkene oxide modified polydimethylsiloxane (SILWET® L7602, manufactured by Union Carbide). Other additives, such as wetting agents, could also be used.

Another preferred embodiment of the invention includes a microcell means employing a microscope mounted between the poles of a magnet for investigating the effects of surfactants on coalescence in a magnetic field and for measuring interfacial surface tension of a multiphase liquid system comprising a dispersed phase and a continuous phase. Prior to this invention, measurement of the interfacial tension in a magnetic field has never been made before.

In this method a mixture comprising a stable emulsion is prepared by adding to the emulsion a magnetic additive which is soluble in the dispersed phase of the emulsion and adding to the emulsion a second additive to effect coalescence in a magnetic field as previously described. The mixture is then agitated and placed on an observation medium, such as a microscope slide. The sample is then subjected to a magnetic field so as to create a force of attraction between the droplets comprising the dispersed phase. By comparing the results of magnetostatic coalescence using the preferred method of this invention with observations of coalescence using the microscopic method, we have found that the droplets which have deformed to ellipsoids in a magnetic field are more prone to coalescence than to flocculation and chaining. We have also found that measurements of the ratio of the major axis to the minor axis of the ellipsoid droplets so formed can be correlated to interfacial surface tension.

Figure 7A:
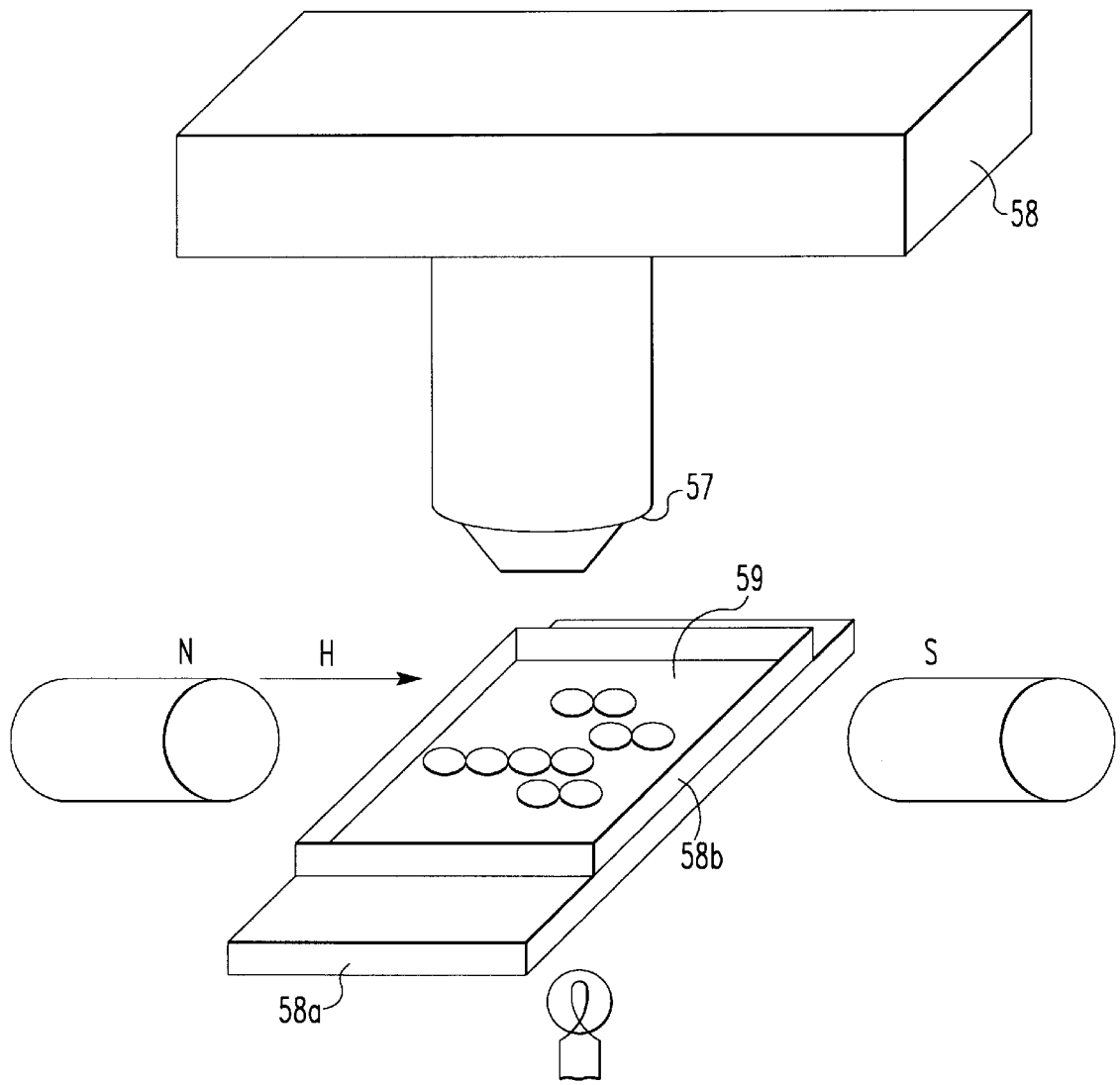
FIG. 7a shows a schematic illustration of a device for viewing coalescence using a microscope mounted between the poles of an electromagnet.
Figure 7B:
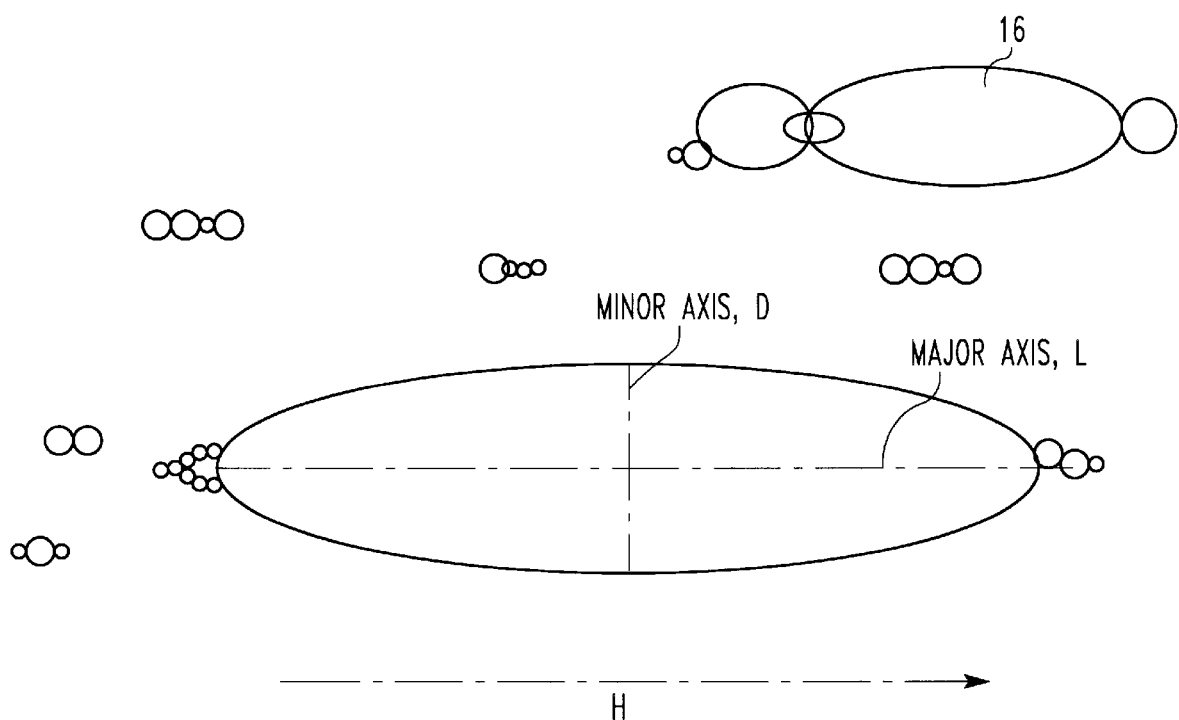
FIG. 7b shows a schematic illustration of a magnetized emulsion containing 80.3% light mineral oil, 16.3% water, 3.0% LIGNOSITE® FML, and 0.24% MERPOL® A as observed approximately 10 minutes after it had been placed in a magnetic field of 2200 Gauss.

Preferably, a trinocular microscope 57 adapted for observation and photography using transmitted light is used to assist in making the observations and in measuring the size and shape of ellipsoid droplets. A schematic illustration of such an arrangement is shown in FIG. 7a. The magnetic field H is preferably produced by an electromagnet capable of generating a field strength of up to 20,000 Gauss and having two poles N,S, mounted on the microscope on either side of the microscope transparent slide 58a. The components of the microscope and light source which are contained in the magnetic field region are made of non-magnetic materials. A droplet of emulsion 59 containing a magnetic additive and a surfactant is placed directly on the transparent slide 58a or in a transparent container 58b mounted on the slide 58a. When the emulsion so mounted is brought into the region of space permeated by the magnetic field and is in the field of view in the microscope, the time evolution of coalescence can be observed. It is convenient to prepare an illustration of the coalescing ellipsoidal droplets for use in measuring the ratio of the major and minor axis of the ellipsoids as illustrated in FIG. 7b which shows a magnetized emulsion containing 80.3% light mineral oil, 16.3% water, 3.0% LIGNOSITE® FML, and 0.24% MERPOL® A as observed approximately 10 minutes after it had been placed in a magnetic field of 2200 Gauss. Before coalescing in the field, the internal phase droplets were less than 2 microns in diameter. After 10 minutes of exposure to the magnetic field, the droplets coalescence into the large droplets shown in FIG. 7b. The minor axis of the magnetic prolate ellipsoidal droplet is 147 microns; the major axis is 563.6 microns. The unmagnetized droplet was found to be a sphere of diameter 234 microns.

Other preferred embodiments of the invention are now briefly described illustrating different flow and field configurations and different magnet structures for producing the fields.

Figure 8:
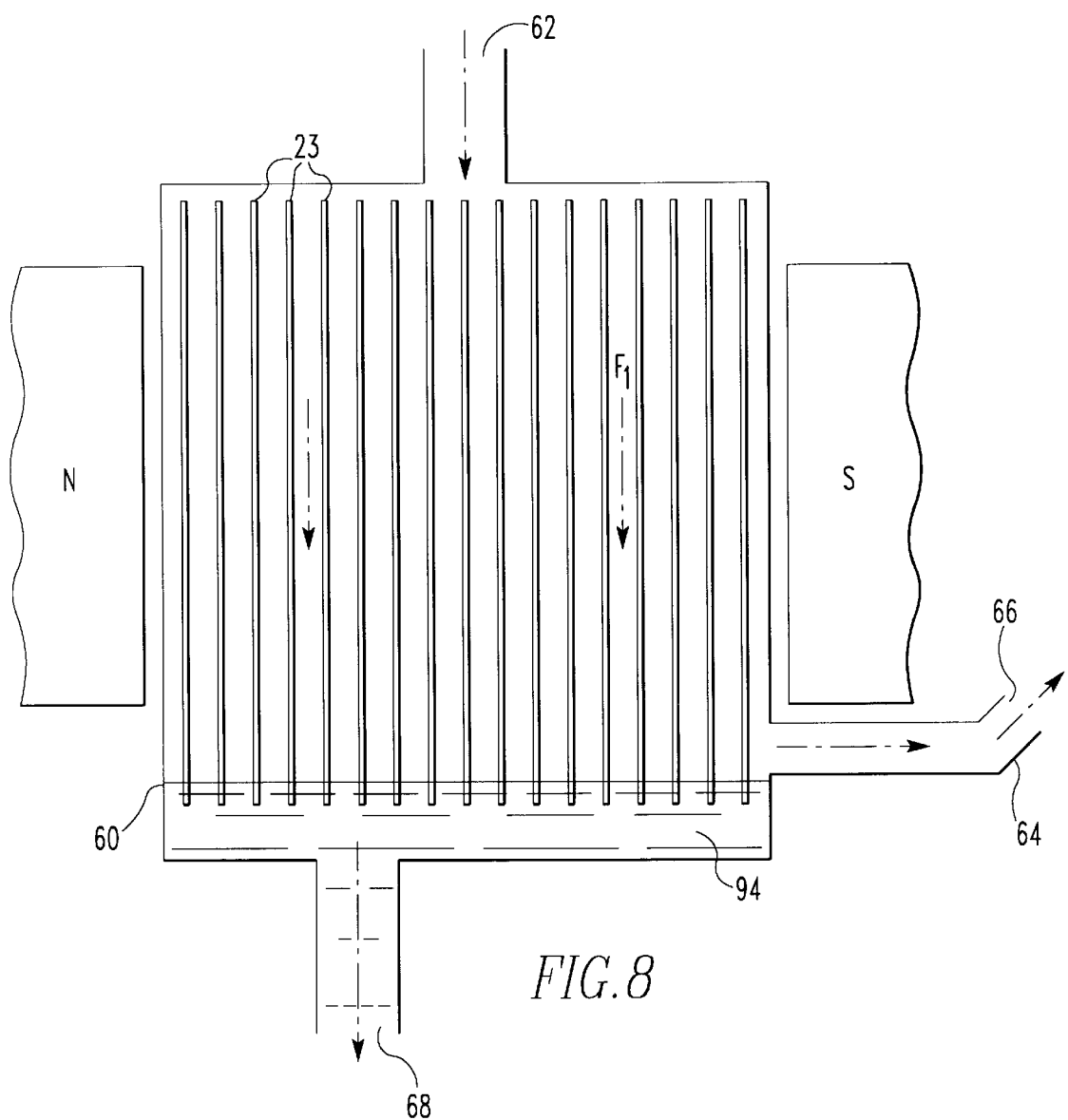
FIG. 8 schematically illustrates an alternative preferred embodiment of the invention wherein the emulsion, the dense phase, and the light phase flow co-currently through a magnetic field which is oriented transverse to the flow.

In another preferred embodiment for treating emulsions in which the magnetic internal phase is denser than the continuous phase, shown in FIG. 8, the cell 60 and magnetic rods 23 are arranged between the poles of a magnet N, S, as described above except that the entrance port 62 is at the top of the cell. In this case, the light continuous phase and the dense magnetic internal phase move downward together under pumping action and gravity. The light phase reverses flow at the bottom of the cell and then flows upward through the exit channel 64 and is removed at an elevation 66 above the top of the "magnetic" plug 94 in the bottom of the cell while the dense phase exits the bottom of the cell 68. In this approach, which employs a co-current flow through the body of the coalescer 60, there is a diminished tendency to entrain internal phase droplets in the light phase flow as it exits the coalescer as compared to the preferred embodiment first described above wherein the dense and light liquid phases flow countercurrent through the coalescer.

Figure 9A:
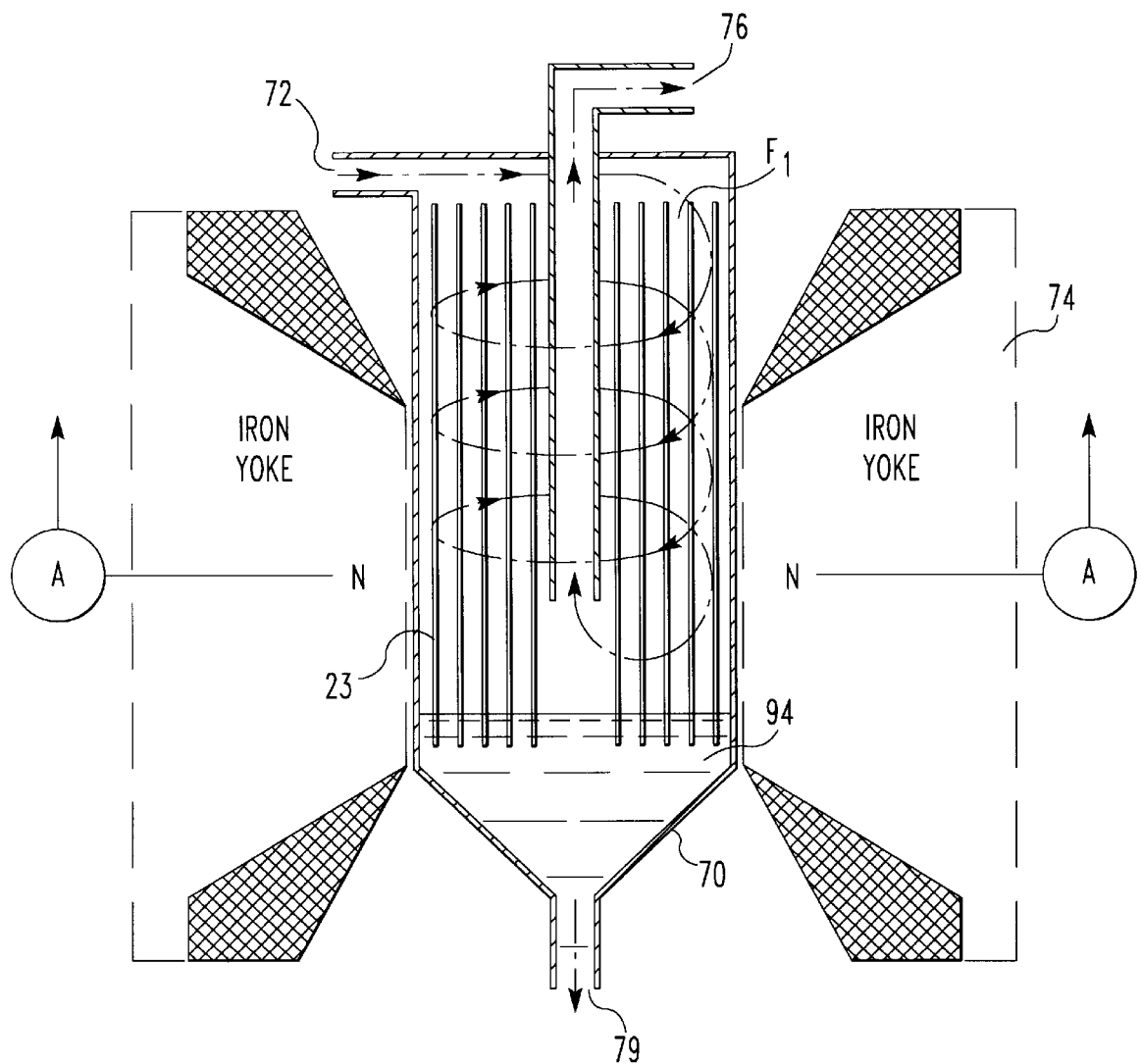
FIG. 9a schematically illustrates an alternative preferred embodiment of the invention wherein the feed emulsion is introduced tangentially in a centrifugal coalescer wherein the magnetic field lines are transverse to the field gradient producing rods.

In yet another preferred embodiment of the invention, a cyclonal flow is employed and illustrated in the vertical section of FIG. 9a. In this configuration, the emulsion enters the coalescer chamber 70, a cyclone, above the top of the magnet through a tangential port 72 thus setting up a centrifugal flow. The gradient producing rods 23 are suspended vertically. A multi-pole magnet 74 such as a quadrupole or higher order magnet [similar to that described in U.S. Pat. No. 3,608,718, "Magnetic Separation Methods and Apparatus," W. M. Aubrey, et al. (1971) and R. R. Oder, "Beneficiation of Lunar Soils: Case Studies in Magnetics," Minerals & Metallurgical Processing, pp. 119–130 (August, 1992), both incorporated in their entirety by reference herein] is arranged around the outside of the cyclone separator.

Figure 9B:
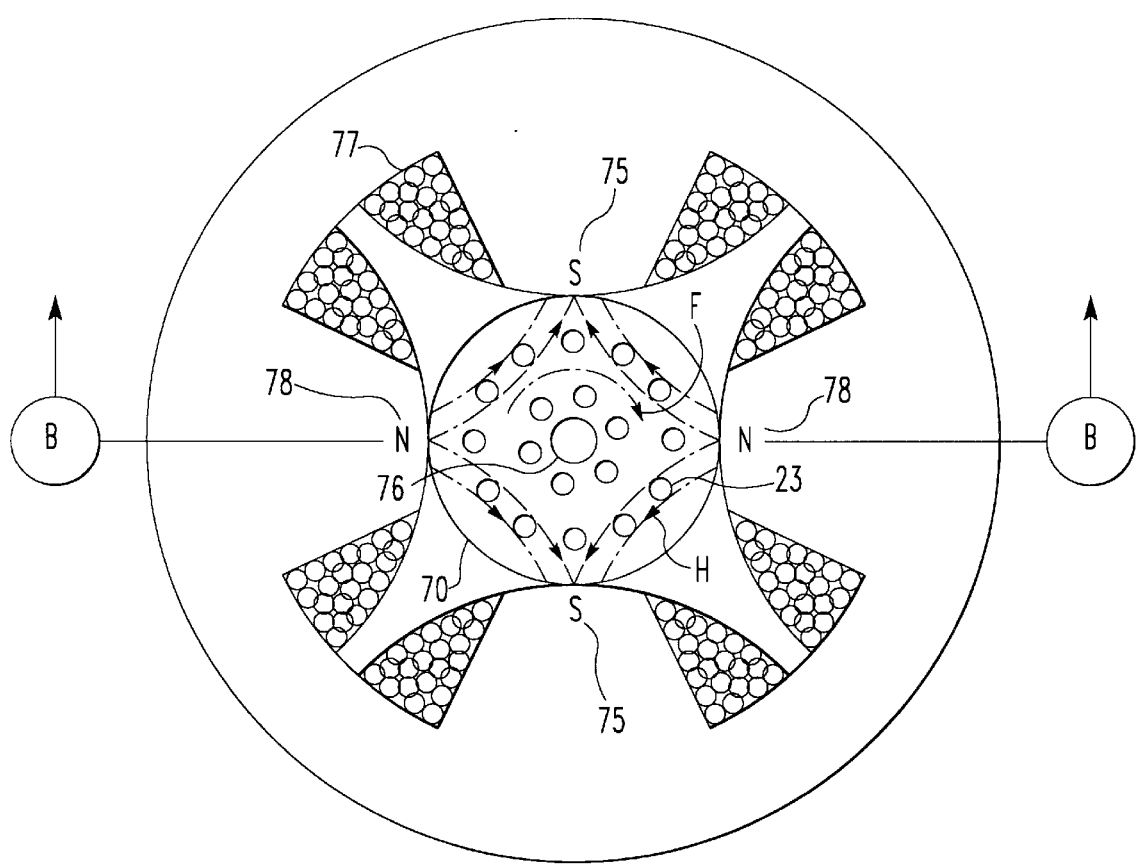
FIG. 9b, which shows a horizontal section through the mid-plane of the centrifugal coalescer shown in FIG. 9a, illustrates the effect of the lines of the magnetic field on the magnetization of the rods.

The multi-pole magnet 74 produces a non-uniform magnetic field which is directed from north 78 to south 75 poles as shown in FIG. 9b which is a horizontal section through the center of the separator shown in FIG. 9a. Magnetic moments are induced in the wires 23 transverse to their length and which are generally co-directional with the magnetic field lines. The induced poles reverse direction every 90 degrees around a concentric flow path, F, inside the cyclone. In this coalescer, the rotating flow passes downward through the volume containing the magnetized wires in the regions of high field strength where the internal phase coalesces. The dense internal phase flows down the wires and exits at the bottom of the separator 79. The light diamagnetic phase released in the breaking of the emulsion spirals inward under the combined action of the flow and the magnetic force and exits through the port 76 at the top of the cell along the symmetry axis of the coalescer. The port 76 opens above the top of the "magnetic" plug 94 as shown in FIG. 9e. In this configuration, the centrifugal acceleration and the magnetic field combine to enhance separation of the phases released in coalescence. The direction of flow F can be either clockwise or counter-clockwise in FIG. 9b.

Figure 9C:
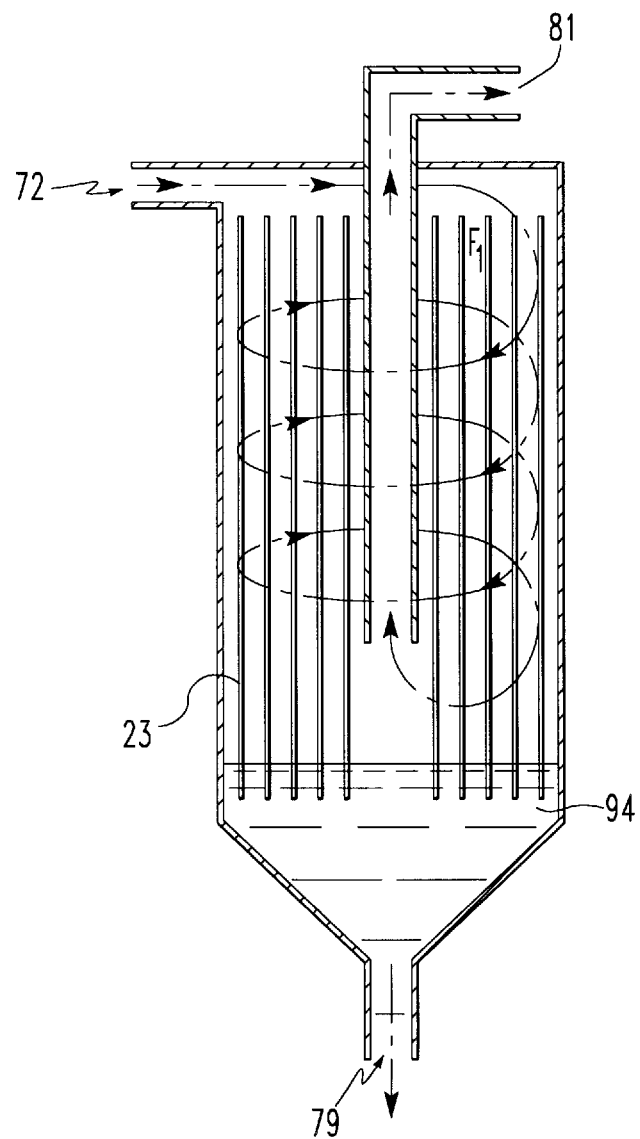
FIG. 9c schematically illustrates an alternative preferred embodiment of the invention wherein the feed emulsion is introduced tangentially in a centrifugal coalescer wherein the magnetic field producing elements are rods permanently magnetized transverse to their length.
Figure 9D:
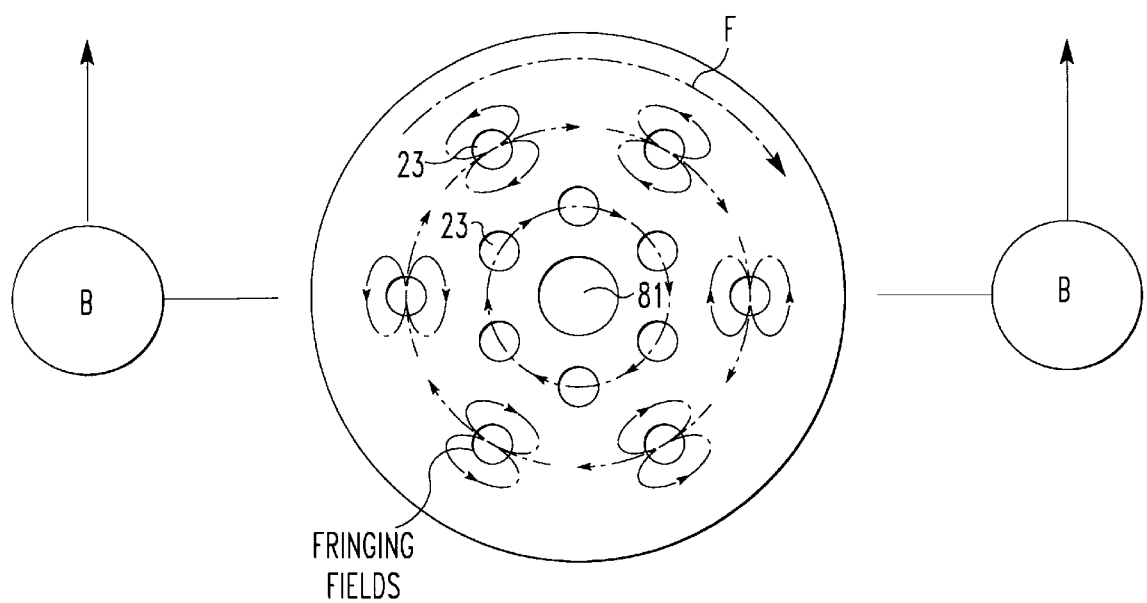
FIG. 9d, which shows a horizontal section through the midplane of the centrifugal coalescer shown in FIG. 9c, illustrates the fringing fields produced by the permanent magnets whose magnetizations are arranged to be co-directional with the horizontal component of flow.
Figure 9E:
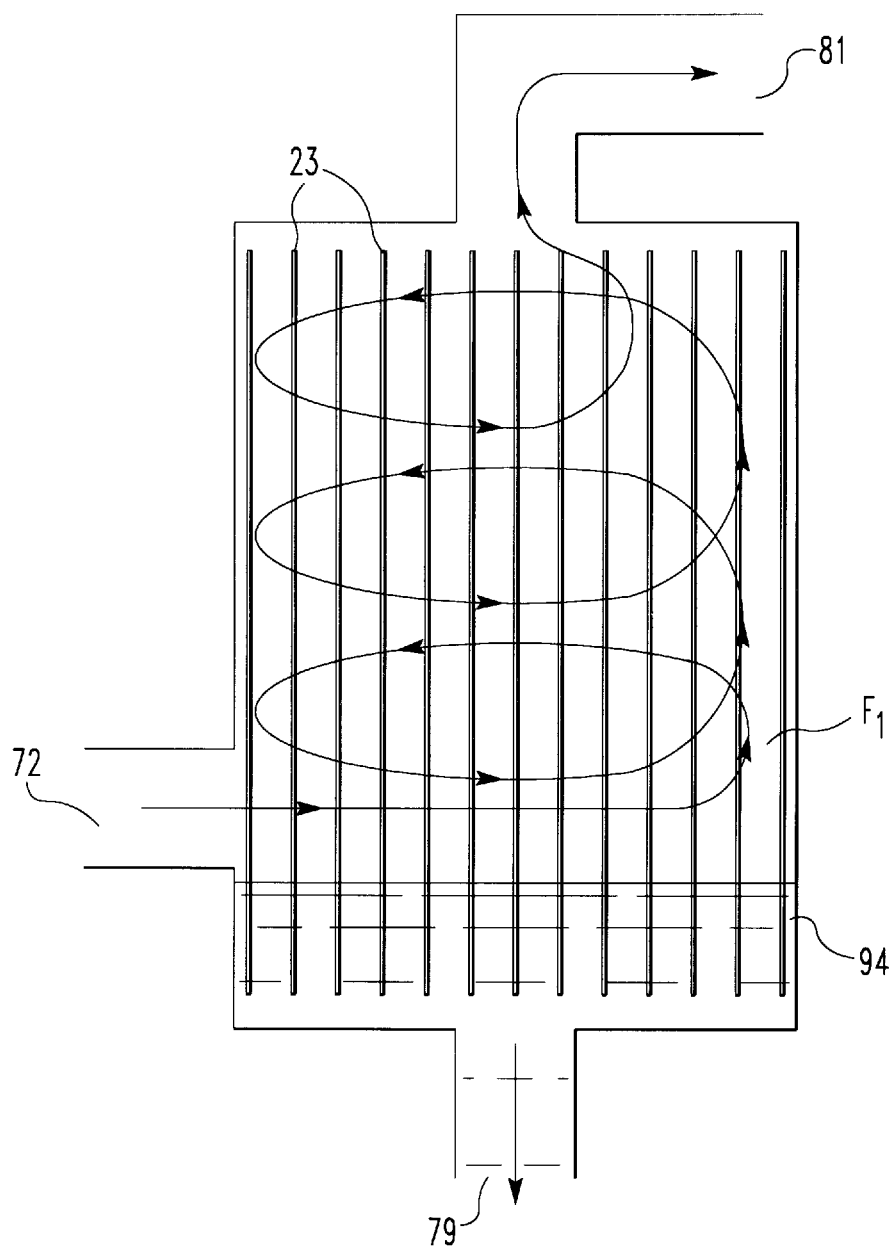
FIG. 9e schematically illustrates an alternative preferred embodiment of the invention wherein the feed emulsion is introduced tangentially above the "magnetic plug" near the bottom of a centrifugal coalescer wherein the magnetic field producing elements are rods permanently magnetized transverse to their length.

FIG. 9c is a vertical cross-section through another preferred embodiment of the invention in which permanent magnet rods 23 are employed with a cyclonal flow. This example is similar to the previous one except that no external magnet is employed. As described earlier, the magnetization of the rods can be oriented at will to enhance the forces of coalescence. One such arrangement is shown in FIG. 9d, where the direction of magnetization of the magnet rods transverse to their length is arranged to be substantially codirectional with the flow F in the cyclone.

FIG. 9e is a vertical cross-section through another preferred embodiment of the invention in which permanent magnet rods 23 are employed with a cyclonal flow introduced to promote mixing. As described in the previous example, the magnetization of the rods can be oriented at will to enhance coalescence. The tangential inlet port 72 in FIG. 9e is preferentially located between the top of the coalescer and above the top of the "magnetic" plug in the bottom of the coalescer.

Figure 10:
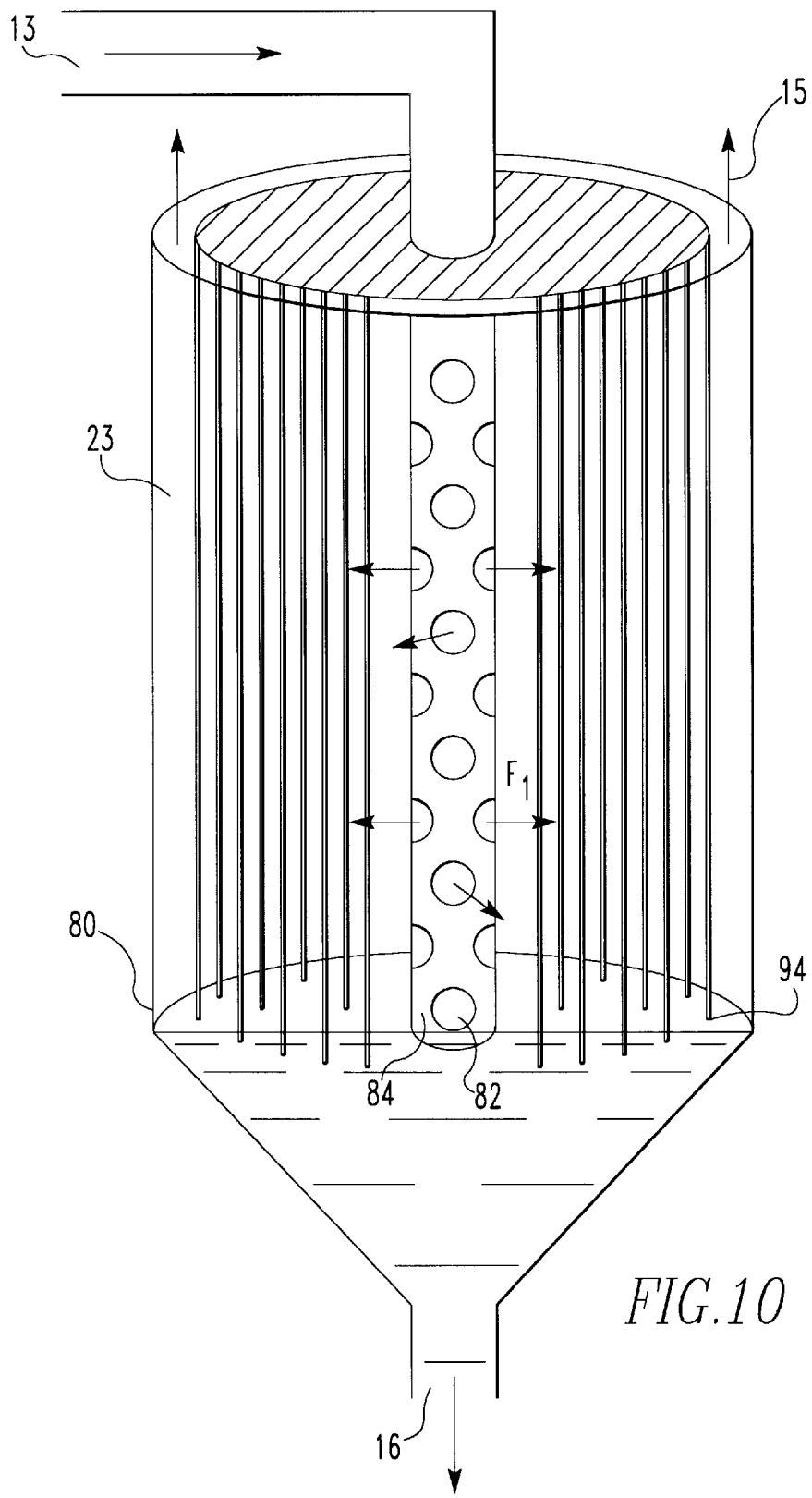
FIG. 10 schematically illustrates an alternative preferred embodiment of the invention wherein the feed emulsion is introduced to the coalescer in radial flow.

In FIG. 10 another preferred embodiment of the invention is illustrated which incorporates radial flow. The emulsion 13 is introduced in downward flow through a pipe 84 on the vertical symmetry axis of the column 80. The bottom of the pipe 84 terminates above the top of the "magnetic" plug at the bottom of the coalescer. The emulsion then passes through the holes 82 and then moves radially outward and flows horizontally through the volume of the coalescer 80 where magnetized rods 23 are suspended vertically, and exits around the inside circumference at the top of the cylindrically-shaped coalescer. The rods 23 are oriented so that their magnetizations are substantially co-directional with the horizontal component of the flow which is directed radially outward. The rods can be arranged so that neighboring rods in the radial direction have similar or dissimilar poles. In this case, the emulsion coalesces on the surfaces of the wires 23, the dense phase flows down the wires and exits at the bottom, and the light phase 15 flows radially outward and exits around the inside circumference at the top of the coalescer 80. This configuration has variable flow velocity throughout the coalescer volume. The flow velocity is least near the exit port enhancing chances of coalescence and separation of fine sized droplets. In the axial flow arrangement illustrated in FIG. 10, it is apparent that the emulsion 13 can be introduced in upward flow through a pipe 84 which is concentric with the exit pipe 16.

In the axial flow arrangement illustrated in FIG. 10 it is apparent that the permanent magnet rods 23 can be replaced by magnetizable wires and a multi-pole magnet of the type illustrated in FIGS. 9a and 9b employed to magnetize the wires.

Figure 11:
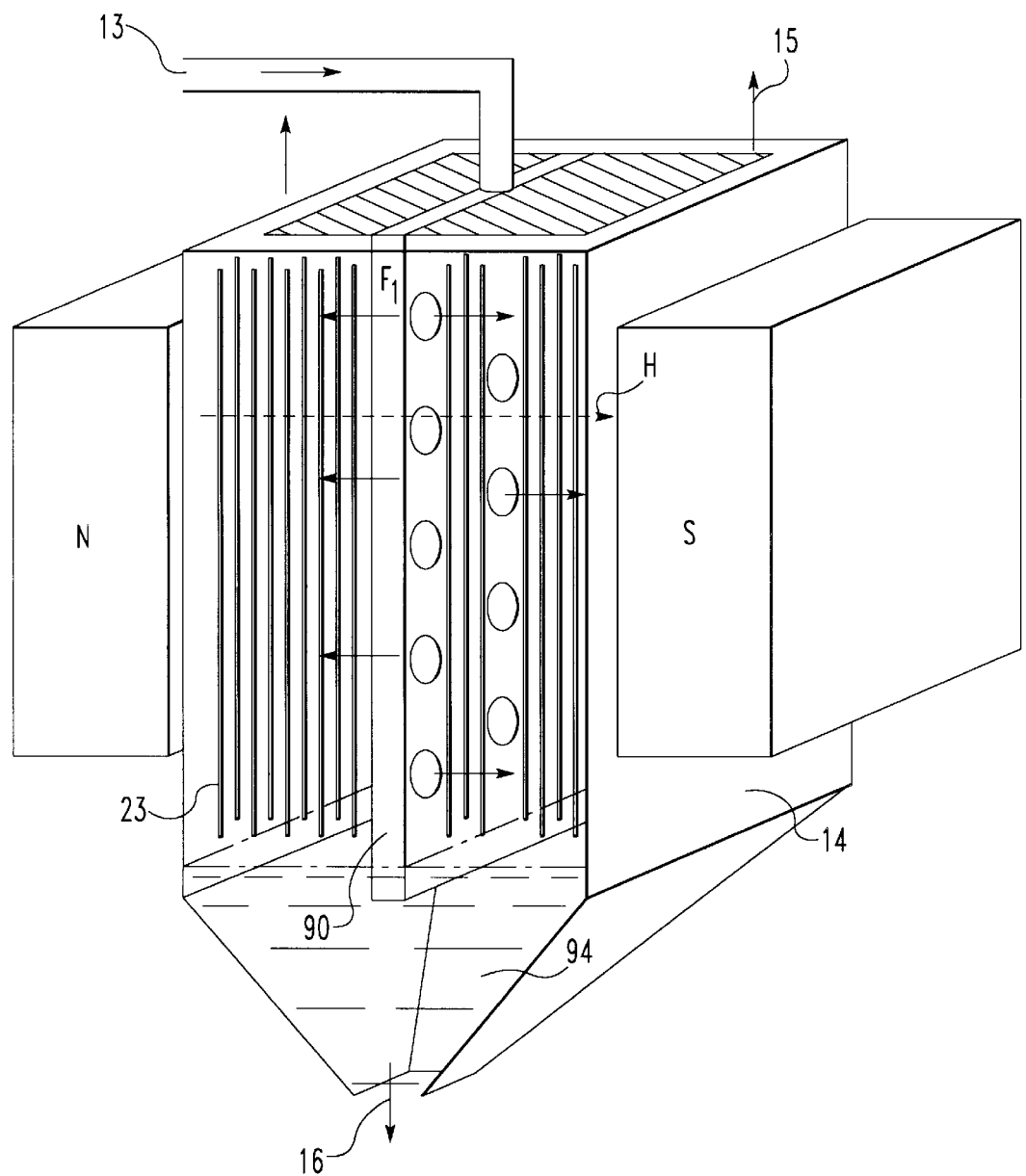
FIG. 11 schematically illustrates an alternative preferred embodiment of the invention wherein the feed emulsion is introduced into the coalescer in co linear flow with the magnetic field.

FIG. 11 illustrates yet another preferred embodiment of the invention in which a magnet arrangement similar to the first embodiment is used. In this case, however, the emulsion 13 is introduced in the center plane between the magnet poles through a hole-containing disperser 90. The bottom of the disperser 90 terminates above the top of the "magnetic" plug in the bottom of the coalescer. As the emulsion moves outward in a horizontal plane, the internal phase 16 coalesces and flows down the rods 23 out of the cell. The light phase 15 migrates to the region near the magnet poles and exits upward out of the coalescer 14. In this configuration, the emulsion flow is co-linear with the externally applied magnetic field lines. This embodiment has the advantage that the internal phase droplets impinge on the rods preferentially on a region along the length of the rods where the induced magnetic field lines emerge. This is the region of greatest magnetic field gradient and also a stagnation region in the flow. It is in this region that the tendency to capture droplets of the magnetic internal phase is greatest.

Figure 12:
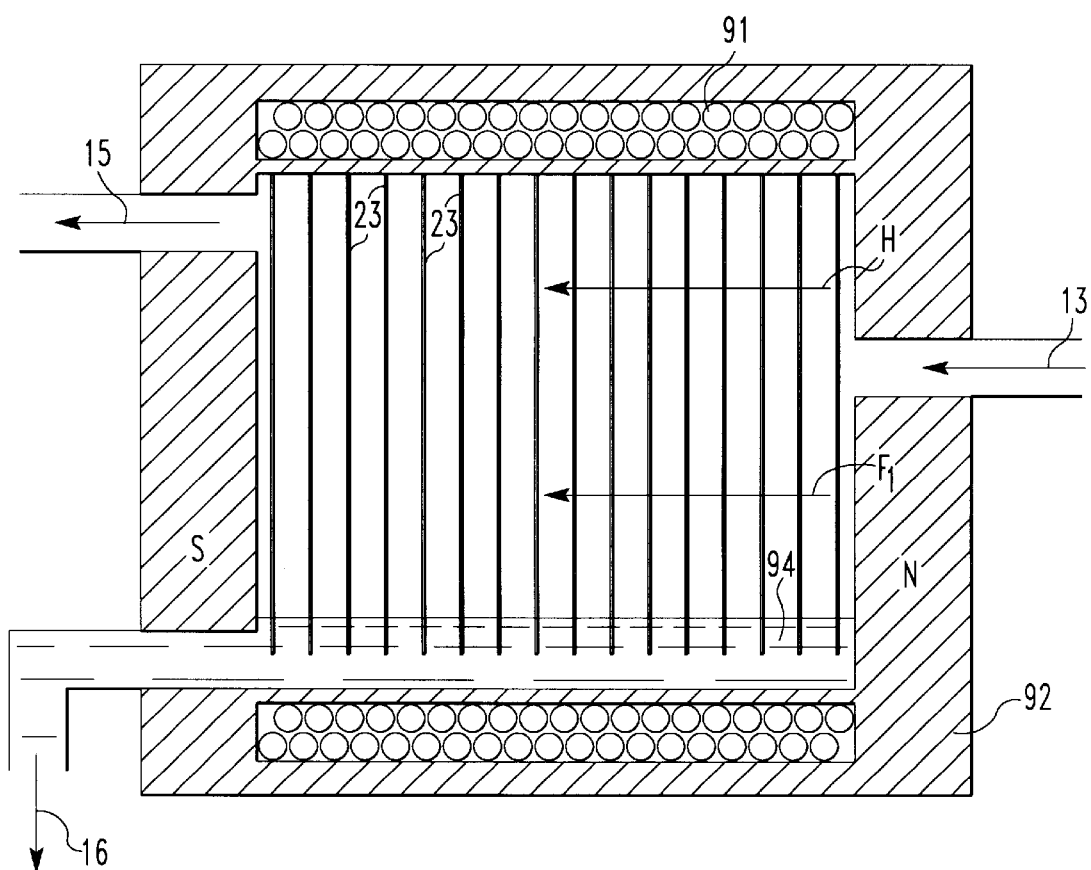
FIG. 12 schematically illustrates an alternative preferred embodiment of the invention wherein the feed emulsion is introduced into the coalescer in co-directional flow with the magnetic field and the energizing magnet completely surrounds the coalescing chamber.
Figure 13:
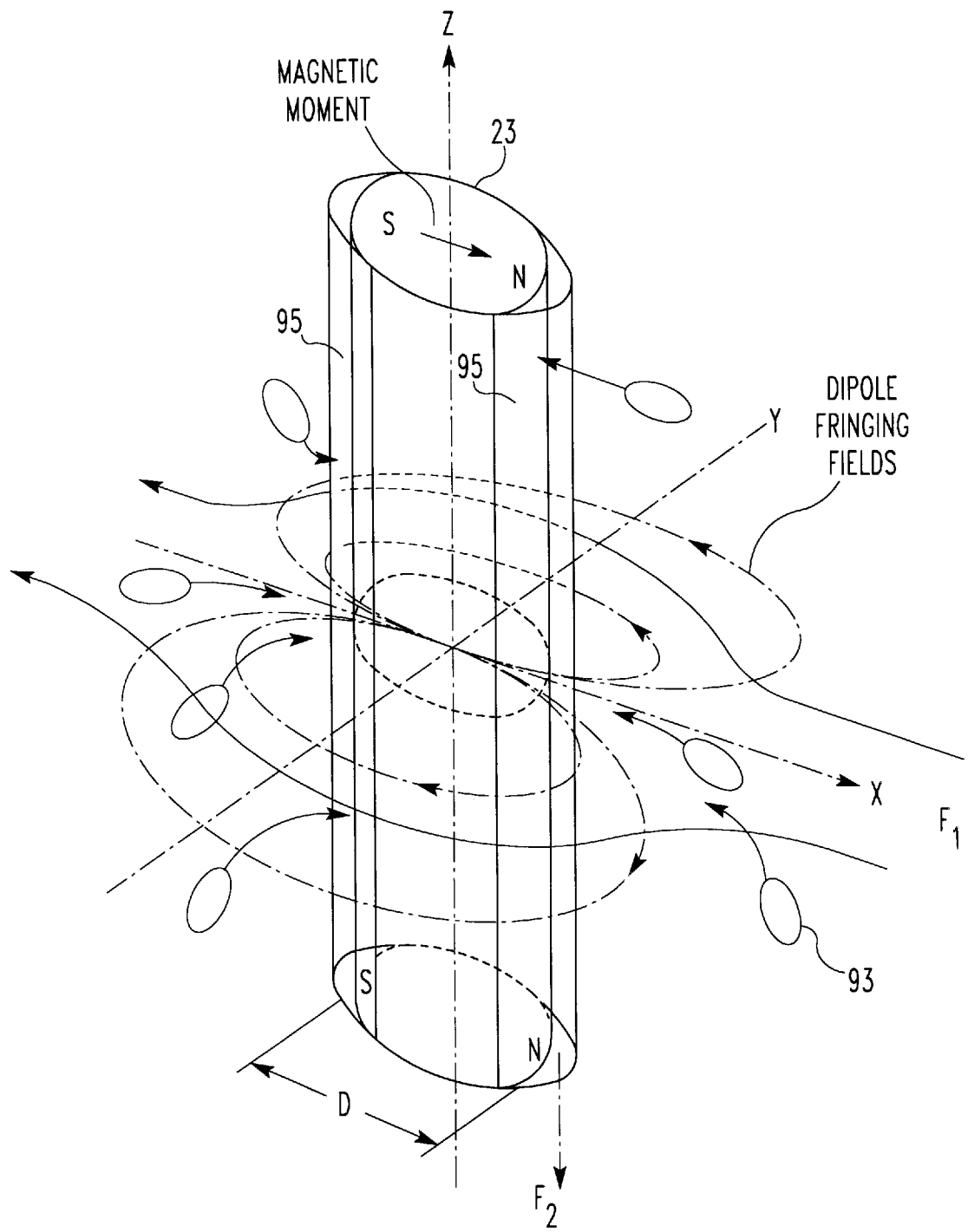
FIG. 13 is a schematic illustration of the attraction of the dispersed phase droplets to the polar regions of a magnetic wire in the embodiment shown in FIG. 12.

Another preferred embodiment of the invention is shown in FIG. 12, wherein the lines of flow F and the lines of externally applied magnetic field H are codirectional (see FIG. 13). The gradient producing wires 23 are arranged to hang vertically. This arrangement has the advantage of the previous example in that stagnation areas and regions of maximum magnetic capture force are common but has the practical advantage of allowing the use of an efficient magnet of the Bitter solenoid design now commonly employed in processing kaolin clay. (See U.S. Pat. No. 3,627,678, P. G. Marston, et al., "Magnetic Separator and Magnetic Separation Method", incorporated in its entirety by reference herein). In this case, the coalescer volume can be cylindrical or rectangular in shape. It is enclosed along its length by the magnet windings, 91, and closed at its ends by the North (N) and South (S) poles of the magnet. The coalescer volume and magnet windings are contained inside an iron return frame 92. The magnet windings can be either normal conductors or superconducting. The emulsion 13 enters the coalescer at an elevation above the level of the "magnetic" plug in the bottom of the coalescer and below the top. This design provides an efficient and practical means for energizing the coalescer volume.

Lastly, another preferred embodiment of the invention is described which is identical to that illustrated in FIG. 12 except that the vertically hanging coalescing means 23 of FIG. 12 are permanent magnets and no surrounding magnet is employed. The emulsion 13 enters the coalescer at an elevation above the level of the "magnetic" plug in the bottom of the coalescer and below the top. In this embodiment, the flow F is horizontal and the vertically handing coalescing means are rods which are permanently magnetized transverse to their length. Additionally the magnetization of the rods is co-linear with the flow. The magnetizations of nearest neighbor rods can be co-directional or opposed. This arrangement has the advantage that permanent magnets capture over their entire surfaces, thus enhancing the radius of capture. It is only necessary that the magnetizations be co-linear with the flow. It is not necessary that they be co-directional.

EXAMPLES

The versatility of the magnetostatic coalescence method has been demonstrated by breaking two exemplary types of emulsions, water-in-organic-liquid ("W/OL") emulsions and organic-liquid-in-water ("OL/W") emulsions. Many ways to make emulsions are available, any of which are suitable. In this case stable emulsions containing various amounts of connate water were prepared using high shear mixing. The organic liquids used in the emulsions were light paraffin mineral oil or heptane. Water was the second phase. Water content in the emulsion was determined using Karl Fischer titration. Emulsifiers were employed to impart stability to the emulsions. Emulsifier K was used in making emulsions of water in organic liquid. Emulsifier K (HLB=5.4) is a 50%/25%/25% combination of three commercial emulsifiers: Hypermer™ B246, T-DET® N1.5, and T-DET® N4, respectively. In preparing the OL/W emulsions, different combinations of three commercial emulsifiers were used. These emulsifiers were Tween® 85 (HLB=11), T-DET® N40 (HLB=14.2), and SPAN® 80 (HLB=4.3). The emulsifiers have been obtained from the following commercial suppliers:

Emulsifiers:
  ICI Americas, Wilmington, Del. 19897:
    Hypermer™ B246
    Tween® 85
    SPAN® 80
  Thompson-Hayward, Kansas City, Kans. 66110:
    T-DET® N.15
    T-DET® N4
    T-DET® N40

A. Magnetic Emulsions

When water is in the dispersed phase, hydrophilic ferromagnetic additive LIGNOSITE® FML was used. It is an iron lignosulfonate compound supplied by Georgia-Pacific Corporation, Tacoma, Wash., and disclosed in U.S. Pat. No. 4,019,995. LIGNOSITE® FML is approximately 71–73% water. When an organic liquid is in the dispersed phase, oleophilic paramagnetic additive NUODEX®, naphthenate iron 6%, supplied by Nuodex, Inc., Turner Place, P.O. Box 365, Piscataway, N.J. 08854 was used.

B. Demulsifiers

Various demulsifiers, shown below, were investigated for their effects on magnetostatic coalescence.

Demulsifiers:

Dupont, Wilmington, DE 19898
| | | |
|---|---|---|
| MERPOL® A: | ALKYL PHOSPHATE ETHOXYLATE (1,4 DIOXANE) | Nonionic |
| ZONYL® FSD: | FLUOROSURFACTANTS | |
| FSJ: | | Anionic |
| FSA: | $R_fCH_2CH_2SCH_2CH_2CO_2Li$ | Anionic |
| FSP: | $(R_fCH_2CH_2O)P(O)(ONH_4)_2$ | Anionic |

BASF, Parsippany, NJ 07054
| | | |
|---|---|---|
| ICONOL TDA-3: | TRIDECYL ALCOHOL, $C_{12}H_{25}CH_2OH$ | Nonionic |
| ICONOL TDA-6: | ALKOXYLATED ALCOHOL | Nonionic |
| PLURONIC® L61: | BLOCK COPOLYMERS OF PROPYLENE | Nonionic |
| PLURONIC® L62: | OXIDE & ETHYLENE OXIDE $H_2C\!-\!\!-\!\!CH\!-\!CH_3,\ CH_2\!-\!\!-\!\!CH_2$ \\/ \\/ O    O | Nonionic |

Union Carbide, Danbury, CT 06817
| | | |
|---|---|---|
| SILWET® L7602: | POLYALKYLENE OXIDE-MODIFIED DIMETHYL-POLYSILOXANES | Nonionic |

3M, St. Paul, MN 55144
FLUORAD ™ Fluorochemical Surfactants
| | | |
|---|---|---|
| FC 129: | POTASSIUM FLUORINATED ALKYL CARBOXYLATES | Anionic |
| FC 740: | FLUORINATED ALKYLESTERS | Nonionic |
| FC 430: | FLUORINATED ALKYLESTERS | Nonionic |
| FC 431: | FLUORINATED ALKYLESTERS | Nonionic |

Rhone Poulenc, Cranberry, NJ 08512
| | | |
|---|---|---|
| ALCODET ™ HSC-1000: | DODECYLTHIOETHOXYLATE | Nonionic |

ICI Americas, Wilmington, Delaware 19897:
| | | |
|---|---|---|
| TWEEN® 80: | POLYOXYETHYLENE SORBITAN MONOOLEATE | Nonionic |

Proctor & Gamble, Cincinnati, Ohio 45202:
Tide® Detergent

C. Magnetic Susceptibility

Magnetic susceptibility, $\chi$, is a convenient measure of the concentration of the magnetic additives in the emulsion. The concentration of magnetic additive, $W_{FP}$, (Wt. %) was determined by the relationship, $$W_{FP} = \frac{\chi_P - \chi_o + (\chi_o - \chi_W)W_{WP} + (\chi_o - \chi_S)W_{SP}}{\chi_F - \chi_o}$$

where $\chi_P$ is the measured magnetic susceptibility of the dehydrated product. $W_o$ and $\chi_o$ are the weight fraction and the magnetic susceptibility of the oil phase, $W_W$ and $\chi_W$ correspond to the total water phase, $W_S$ and $\chi_S$ correspond to the surfactants employed, and $\chi_F$ is magnetic susceptibility of the additive. Measured values of the susceptibility of liquids, surfactants, and additives used in this work are given in Table I.

When the additive is strongly magnetic, its concentration can be obtained approximately using the relationship, $W_{FP} \approx (\chi_P - \chi_o)/\chi_F$,
when $(\chi_o - \chi_W)W_{WP} << \chi_P - \chi_o$
and $(\chi_o - \chi_S)WS_{SP} << \chi_P - \chi_o$
and $\chi_F >> \chi_o$.

A Johnson & Matthey, Inc., Model MSB-1 magnetic susceptibility balance was employed to measure the magnetic susceptibility of magnetic emulsions. Strictly speaking, the Johnson & Matthey balance, which employs the Guoy method, is not applicable to quantitative measurements on ferromagnetic materials, such as magnetic additive FML, because magnetic saturation of the entire sample cannot be achieved. For this reason, the magnetic measurements of the additive concentration are of a qualitative nature. They are useful in making a quick assessment of the amount of additive remaining after coalescence.

D. Test Results

A series of tests were carried out to demonstrate the effects of the major process parameters on magnetostatic coalescence. These tests employed a first stage continuous coalescer of the type shown in FIGS. 2a and 2b with a packing of the type shown in FIG. 3a, a field assisted coalescer, and an HGMS separator to break emulsions of the water in organic liquid (W/OL) type. The first stage coalescer had a rectangular cross-section 1.9 cm×3.4 cm. It was 22.4 cm long. The rods used in the packing were carbon steel and had diameter of 0.044 inches. The rod packing of the first stage coalescer was replaced with stainless steel wool for HGMS processing.

For some of the examples, stable emulsions of the water-in-organic liquid ("W/OL") type were prepared by first mixing mineral oil, water (connate water), and emulsifier K. Next the magnetic additive, LIGNOSITE® FML, water, and destabilizing surfactants were added to the stable emulsion. These materials were used as feed to the magnetostatic coalescer. For one example, a raw crude oil was used which contained emulsified water. The magnetic additive, LIGNOSITE® FML and a destabilizing surfactant only were added to this stable emulsion.

(i) Effect of Surfactant on Continuous Operation

Tests were carried out to demonstrate that use of the destabilizing surfactant allows the first stage containing vertical rods to be operated as a continuous coalescer with high levels of continuous phase recovery and to demonstrate the overall effect of treating the product of the first stage continuous coalescer with field assisted settling.

a. Demulsification with Surfactant

Tests were carried out using the destabilizing surfactant MERPOL® A. For these tests a magnetic emulsion containing 80.08% mineral oil, 16.43% water, 3% dry FML, 0.16% emulsifier K and 0.33% MERPOL® A was used. The magnetic susceptibility of the emulsion was $285.9*10^{-6}$ cm$^3$/gm.

Emulsion was pumped through the first stage coalescer with a flow rate of 30 cm$^3$/min for a period of three hours. A total of seventy (70) 0.044 inch diameter vertical steel rods were employed in the coalescer for the tests. The output of the first stage coalescer was sampled every 15 minutes and analyzed for magnetic susceptibility and water content. The results are shown in Table II. The feed, which contained 16.43% water on average, had water content ranging from 0.43 to 1.14% after treatment in the first stage.

Every thirty minutes, a 25 cc sampling of the first stage coalescer output was taken for treatment by gravity assisted settling. The sample was placed in a beaker standing over a permanent magnet which produces a field of 1500 Gauss and a magnetic field gradient of 1000 Gauss/cm, both measured at the face of the magnet. The contents of the beaker were left in place resting on the top of the magnet for a period of three (3) hours. After that time, the contents were decanted and measured for magnetic susceptibility and water content. The results of those measurements are shown in the right two columns of Table II.

It is apparent that the combined process of continuous magnetic demulsification in the first stage coalescer treatment followed by field assisted settling is capable of producing a consistent product with water and FML reductions greater than 99%.

There was no mineral oil visible in the first stage coalescer underflow indicating no significant oil loss by the method.

b. Demulsification Without Surfactant

Tests were next carried out using the first stage coalescer and field assisted settling as described in Section a, Demulsification with Surfactant, but without the destabilizing surfactant. For these tests a stable emulsion was prepared which contained 80.41% mineral oil, 16.42% water, 3.01% dry FML, 0.16% emulsifier K, and no MERPOL® A. The magnetic susceptibility was $283.4*10^{-6}$ cm$^3$/gm. The results of these tests are shown in Table III.

It is apparent from the data that the first stage coalescer does not operate well without the destabilizing surfactant. Indeed, the test was terminated after one hour because of backup of the coalesced material in the first stage coalescer. With no MERPOL® A the first stage fills with partially coalesced emulsion because internal phase droplets which chain in the magnetic field bridge the gap between magnetic rod inserts. The chains of low specific gravity are held in place between the magnetic rods and do not drain out of the cell as is the case with droplets of higher specific gravity which have completely coalesced. This results in loss of active volume in the coalescer which results in poor dewatering and in backup which requires intermittent cleaning. This requires the first stage to be operated as a batch coalescer which is contrary to the objectives of this invention. Further, significant amounts of mineral oil were observed in the first stage underflow, indicating oil loss.

The field assisted settler achieved good dewatering in the case shown in Table III. However, floccs of unresolved emulsions were found in the bottom of the settler when no MERPOL® A was used. This defeats the objective of obtaining high recoveries of the organic liquid. It is apparent that the use of a destabilizing surfactant is beneficial to the process.

(ii) HGMS Polishing

A series of experiments were carried out to illustrate the use of conventional batch operated HGMS as a polishing operation in magnetic dehydration of organic liquids. Conventional batch operated HGMS is not practical as a general means for magnetostatic coalescence because the filter plugs rapidly when the feed water content is generally above 0.5%.

In the examples presented here, the batch operated HGMS unit was used to achieve final dewatering of the low water content product of two stage processing. Magnetic emulsions were prepared for these tests which were typical of the output of the magnetic assisted settler. The feed emulsion contained 99.7% mineral oil, 0.12% water, 0.01% dry FML, 0.16% emulsifier K, 0.002% MERPOL® A, and had a magnetic susceptibility of $0.25*10^{-6}$ cm$^3$/gm. The results of processing in which the field strength, the flow rate, and the processing time are varied are shown in Table IV.

In processing for 60 minutes, approximately 75% reduction in emulsified water content was achieved in flow through the magnetic matrix at 4.5 minutes retention time even when the magnetic field was zero. This mechanical capture is associated with coalescence on the hydrophilic surface of the ferritic stainless steel wool. Much greater water reduction was achieved, however, when a magnetic field was applied.

A magnetic field of 800 Gauss and a retention time of 4.5 minutes is sufficient to achieve more than 93% removal of water from the emulsion. Water contents in the 80 ppm range are achieved. This is less than the water that was contained in the mineral oil used to make the emulsion, which was typically 270 ppm. The diamagnetic susceptibilities of the dehydrated products are near those of the oil and oleophilic additives used for the study, indicating near complete removal of FML.

As can be seen in Table IV, use of field strength higher than 800 Gauss and retention time longer than 4.5 minutes does not lead to significant increase in water reduction. It is further important to note that for operating periods up to one hour, no break-through of the batch HGMS matrix is indicated when operating at 800 Gauss and 4.5 minutes retention time. With the levels of field strength and retention time the same as used in the first stage continuous coalescer, the method is practical for polishing applications in the magnetostatic coalescence process.

(iii) FML Recovery for Recycle

In a test of magnetic recovery of FML, 1.459 grams of dry FML was mixed with 92.573 grams water to make a mixture of 1.55 Wt. % FML and 98.45 Wt. % water simulating a dilute underflow from the coalescers from which FML is to be recovered. The magnetic susceptibility of the dry FML was $9463*10^{-6}$ cm$^3$/gm.

This mixture was pumped through a matrix of fine grade ferritic stainless steel wool magnetized at 20,000 Gauss. The flow rate through the matrix was 6 cm$^3$/min. The "non-magnetic" product contained 0.755 grams dry FML and 85.045 grams water. The magnetic susceptibility of the "non-magnetic" product was $1217*10^{-6}$ cm$^3$/gm. This represented 50.64 Wt. % of the dry FML in the feed and 91.85% of the water in the feed. Thus 49.36% of the dry FML in the feed remained in the "magnetic" fraction contained in the separation matrix. This fraction contained 8.15% of the water in the feed. The magnetic susceptibility of the dry FML in the "magnetic fraction" was $17380*10^{-6}$ cm$^3$/gm.

This experiment shows that FML consists of a distribution of molecular moieties with differing magnetic susceptibilities and that HGMS can be used to separate strongly magnetic FML from large amounts of water.

Indeed, the "non-magnetic" fractions can be further chemically reacted according to U.S. Pat. No. 4,019,995 (W. S. Briggs and N. J. Kjargaard, "Lignosulfonate Composition and Process for Its Preparation," Apr. 26, 1977) to incorporate more iron, thereby converting these components to strongly magnetic fractions which can be recovered for reuse in the process using the HGMS filter.

Various methods are available for removal of the FML from the unmagnetized HGMS filter bed which do not add water to the recycle FML. These include rinsing with gases such as compressed air or with an organic liquid.

(iv) Field Gradient Production Elements

Experiments were carried out to demonstrate the effects of differing types of field gradient producing elements including permanently magnetized rods. While gradient producing inserts such as ferritic steel wool assist in dewatering, they can also hinder oil recovery when processing emulsions with water contents in the nominal 5 to 15% range. Capture elements made of steel wool plug too easily and capture FML leading to a necessity for frequent flushing. Separators using these elements cannot be operated in a continuous mode and their batch operating times will be too short for practical applications when handling anything other than very low water content emulsions. The straight rod inserts employed herein produce the requisite field gradients but do not retain the magnetic additive and water as do prior art elements such as mesh wire or stainless steel wool.

a. Effects of Magnetizable Inserts

A set of three experiments was carried out to illustrate the above described points and to exemplify the preferred embodiment of the first stage coalescer when using magnetizable inserts such as wire. A magnetic emulsion was prepared which contained 80.11% mineral oil, 16.40% water, 3.0% dry FML, 0.16% emulsifier K, and 0.33% MERPOL® A. The emulsion had a magnetic susceptibility of $281.9*10^{-6}$ cm$^3$/gm.

This emulsion was processed through the first stage coalescer in which 13 grams of mesh wire were placed at the bottom of the cell and 1½ grams fine grade ferritic steel wool was placed inside the top of the canister at the exit. In a second experiment, the mesh wire and steel wool were replaced with 70 straight magnetic rods hanging vertically in the cell. The diameter of each rod was 0.044 inch and the total weight was 138 grams. The magnetic field strength was 800 Gauss and the retention time was 4.5 minutes. Test results are compared in Table V.

FML was not retained inside the separator and no oil was observed in the FML/water discharge when straight rods were used. Use of the ferritic steel wood pad at the coalescer exit resulted in substantially the same water reduction but for this case there was oil in the FML/water discharge which is associated with use of the open mesh wire screen for field gradient production. The wire mesh has horizontal elements which capture FML leading to an undesirable buildup in the coalescer. The straight wires, however, do not retain FML in the coalescer since there is substantially no vertical component of the magnetic force to hold the material against the force of gravity.

Lastly, an experiment was carried out to confirm that magnetic material collects on the north and south induced poles in an external applied field and that magnetic material is free to move up or down the face of the magnetic wire.

A single steel wire of 0.044 inch diameter was suspended in a clear glass tube containing clear mineral oil. The tube was inserted in the opening of an electromagnet of the type shown in FIG. 2b. A magnetic field of 850 Gauss was applied in the pole gap and drops of FML were fed into the glass container from the top. As the droplets sank through the mineral oil, they were attracted to the north and south polar regions of the magnetic wire. No FML was deposited on the wire surface at right angles to the poles as depicted in FIG. 3b.

As FML was added to the system, it eventually coated the entire lengths of the polar faces. Once a certain thickness was achieved, newly added FML ran down the wire and found a pool at the bottom of the wire. Eventually the weight of the pool was too great to be sustained by the magnetic buoyant forces so that additional FML capture resulted in ejection of FML at the bottom of the wire. This FML then settled out of the field regions free of the separator.

b. Permanent Magnet Inserts

A series of experiment were carried out to illustrate the use of permanent magnet rods in the first stage coalescer. A magnetic emulsion was prepared which contained 80.13% mineral oil, 16.16% water, 3.23% dry FML, 0.155% emulsifier K, and 0.328% demulsifier MERPOL® A. The magnetic susceptibility was $329.3*10^{-6}$ cm$^3$/gm.

Sixteen ALNICO permanent magnet rods, each of which was 4 inches long and 0.14 inches diameter, were housed in a cylindrical canister. The canister was 126 mm high and had a 58 mm inside diameter. The radial inlet was 35 mm from the bottom. An outlet on the bottom was used to drain coalesced water and FML. An outlet on the top was used for outflow of dehydrated oil. The rods occupied 5.6% of the coalescer volume. The rods were magnetized transverse to their lengths. Four of the rods were equally spaced about the symmetry axis in a circle of 0.4 inches diameter. The remaining 12 rods were equally spaced around a concentric circle of 1.12 inch diameter. In the first experiment the rods were allowed to orient themselves under action of their self fields. The direction of magnetization on the outer circle was counterclockwise. The direction was clockwise for the inner circle. The maximum field strength on the rod surfaces varied from 852 to 881 Gauss and their maximum magnetic field measured 2 mm from the surface of an isolated rod varied from 202 to 251 Gauss.

The emulsion was pumped through the coalescer at a rate of 20 ml/min, corresponding to a retention time of 14.5 minutes, until 150 ml dehydrated product and 25 ml underflow was produced. The dehydrated product had a magnetic susceptibility of $4.99*10^{-6}$ cm$^3$/gm and contained 1.59% Wt. % water. The simple separation produced a result comparable to that obtained using magnetic wires and an applied field of 800 Gauss described in Section (i) a. Demulsification with Surfactant (See Table II). 98% of the FML and 90% of the water was separated in the coalescer using this permanent magnet arrangement.

Next the permanent magnets were oriented with their poles opposing and the same experiment as described above was repeated. An emulsion containing 80.27% oil, 16.06% water, 3.19% FML, 0.16% emulsifier K and 0.33% MERPOL® A having a magnetic susceptibility of $347.7*10^{-6}$ cm$^3$/gm was employed.

In this case the product had a magnetic susceptibility of $4.6*10^{-6}$ cm$^3$/gm and contained 1.03% water. Greater than 98% of the FML and greater than 93% of the water were separated.

In another experiment fifty-four (54) magnetic wires of 0.044 inch diameter were added to the space around the rods. The wires were magnetized by the fringing fields produced by the permanent magnets. An emulsion containing 80.09% oil, 16.24% water, 3.19% FML, 0.16% emulsifier K, and 0.33% MERPOL® A was treated as described above. In this case the product was found to have a magnetic susceptibility of $2.5*10^{-6}$ cm$^3$/gm and contained 0.68% water. More than 99% of the FML and 95% of the water was separated in this case.

In another experiment the canister was modified for a tangential inlet 35 mm from the bottom. This arrangement accomplishes better mixing around the wire inserts. An emulsion containing 80.09% oil, 16.18% water, 3.23% FML, 0.16% emulsifier K, and 0.33% MERPOL® A was processed as described above. The product had a magnetic susceptibility of $2.58*10^{-6}$ cm$^3$/gm and contained 0.48% water. Greater than 99% of the FML and 97% of the water was separated in this case.

In a separate experiment, designed to illustrate the attraction of FML to a permanent magnet, a single permanent magnet rod was immersed in clear mineral oil and placed between the poles of an electromagnet of the type shown in FIG. 2b. FML was applied to the surface of the permanent magnet. It was determined that the rod coated uniformly around its circumference and along its length when the applied field was zero. When sufficient FML was added, additional FML was observed to fall free at the bottom of the rod. When the electromagnet was energized and the applied magnetic field was co-directional with the permanent magnet moment, the FML was pushed off the rod faces at right angles to the poles when the strength of the applied field was greater than 850 Gauss which was the face field strength of the permanent magnet. When the electromagnet was de-energized, the FML once again coated the entire surface of the rod.

Next a series of experiments were carried out to illustrate the effects of canister length, flow velocity, and packing density for the permanent magnet rods on water reduction.

A series of emulsions containing nominally 80.15% oil, 16.17% water, 3.19% FML, 0.16% emulsifier K and 0.33% MERPOL® A were used. They had magnetic susceptibility of nominally $338.2*10^{-6}$ cm$^3$/gm.

Three canisters of differing length were employed. Each had the same diameter and radial input as described above. The lengths were nominally 4, 8, and 12 inches respectively to accommodate 16, 32, and 48 permanent magnet rods. The packing density was 5.6% for each of these cases.

The effect of flow rate, canister length, and number of magnets employed is shown in Table Va where is can be observed that processing through a 12 inch canister containing 48 magnets at 80 cm$^3$/min yields the same results as processing through a 4 inch long canister containing 16 magnets at a flow rate of 16 cm$^3$/min. Thus a three-fold increase in length yields a five-fold increase in throughput at the same level of performance.

Next a series of experiments were carried out to illustrate the effects of magnet element packing density on water reduction.

A four (4") inch long canister was packed with 32 magnets. The reference emulsion was pumped through the canister at a rate of 13 cm$^3$/min. The water content was reduced from 16.17% to 0.28%. Doubling the packing of magnets reduced the water content from 0.54% to 0.28%.

Next an eight (8") inch long canister was packed with 16 magnets in the bottom four (4") inches and 32 magnets in the top four (4") inches. The canister contained 48 magnets. The reference emulsion was pumped through the canister at the rate of 13 cm$^3$/min. The water content was reduced from 16.17% to 0.23% as compared to 0.44% for the 8" canister packed with 32 magnets.

Lastly, a twelve (12") inch canister was packed with 16 magnets in the first 4 inch length, 16 magnets in the second 4 inches of its length, and 32 magnets in the last four inches of its length. The canister contained 64 magnets. The reference emulsion was pumped through the canister at a flow rate of 13 cm$^3$/min. The water content was reduced from 16.17% to 0.20% as compared to 0.35% for the 12 inch canister with 48 magnets.

Next a series of experiments were carried to compare separation obtained with multiple pass operation with wires magnetized by an electromagnet and permanent magnet rods.

In the first experiment a reference emulsion containing 80.12% mineral oil, 16.18% water, 3.21% FML, 0.16% emulsifier K, 0.33% MERPOL® A was used. It had a magnetic susceptibility of $371*10^{-6}$ cm$^3$/gm.

Figure 2A:
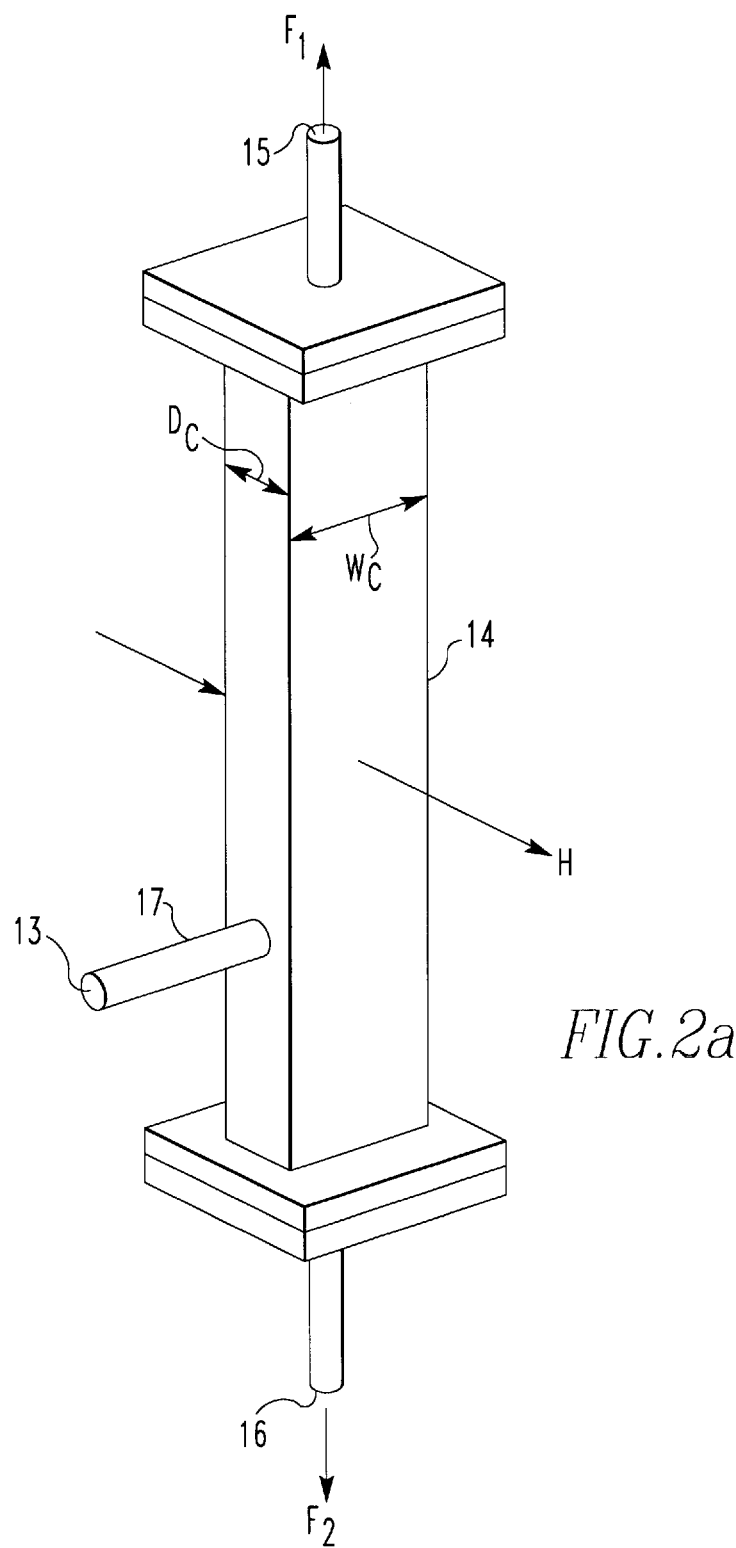
FIG. 2a illustrates a vertical magnetic coalescence column for continuous operation according to the present invention.
Figure 2B:
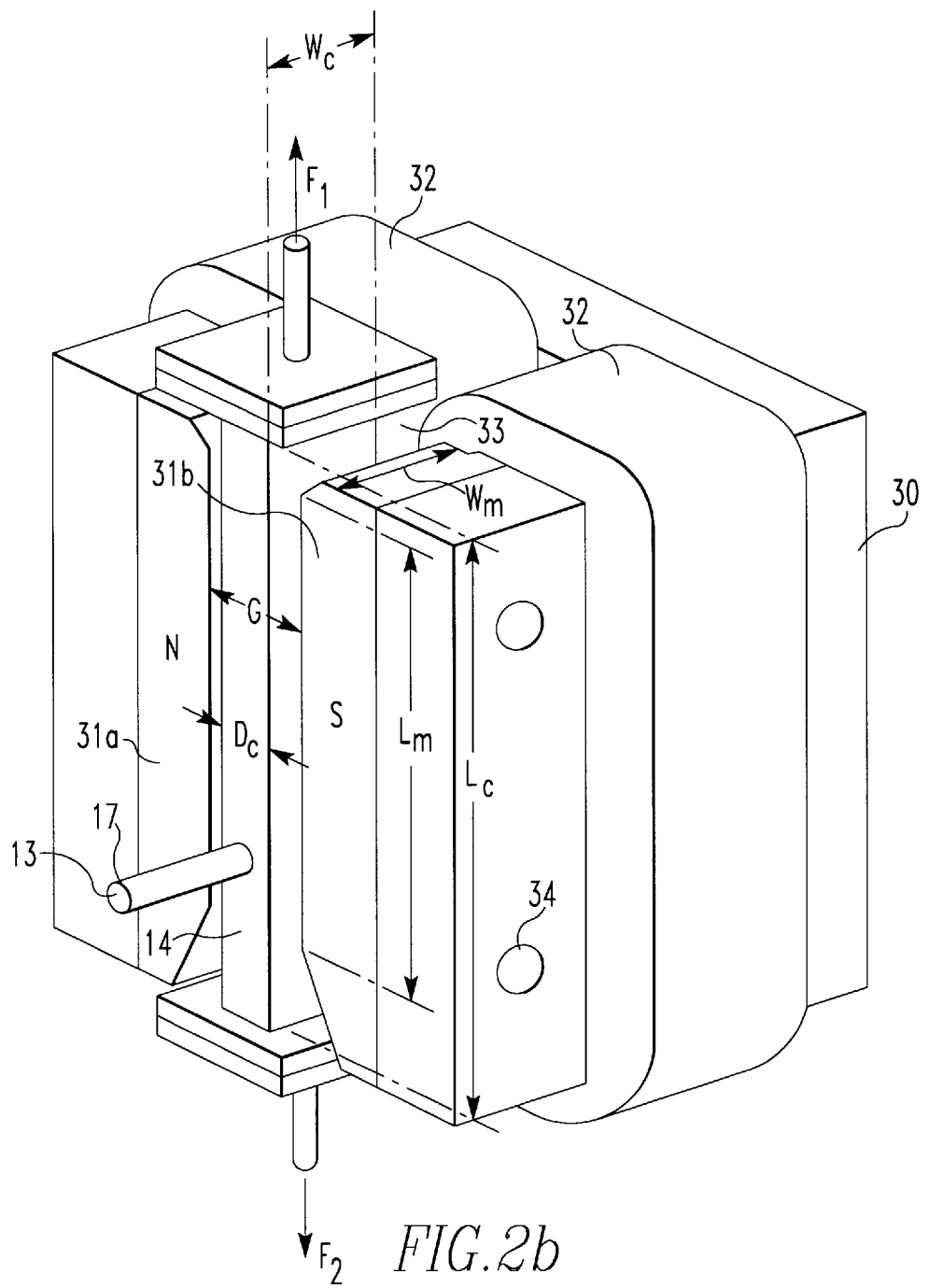
FIG. 2b is an isometric view of the vertical magnetic coalescence column of the invention in place between the poles of a magnet.
Figure 3D:
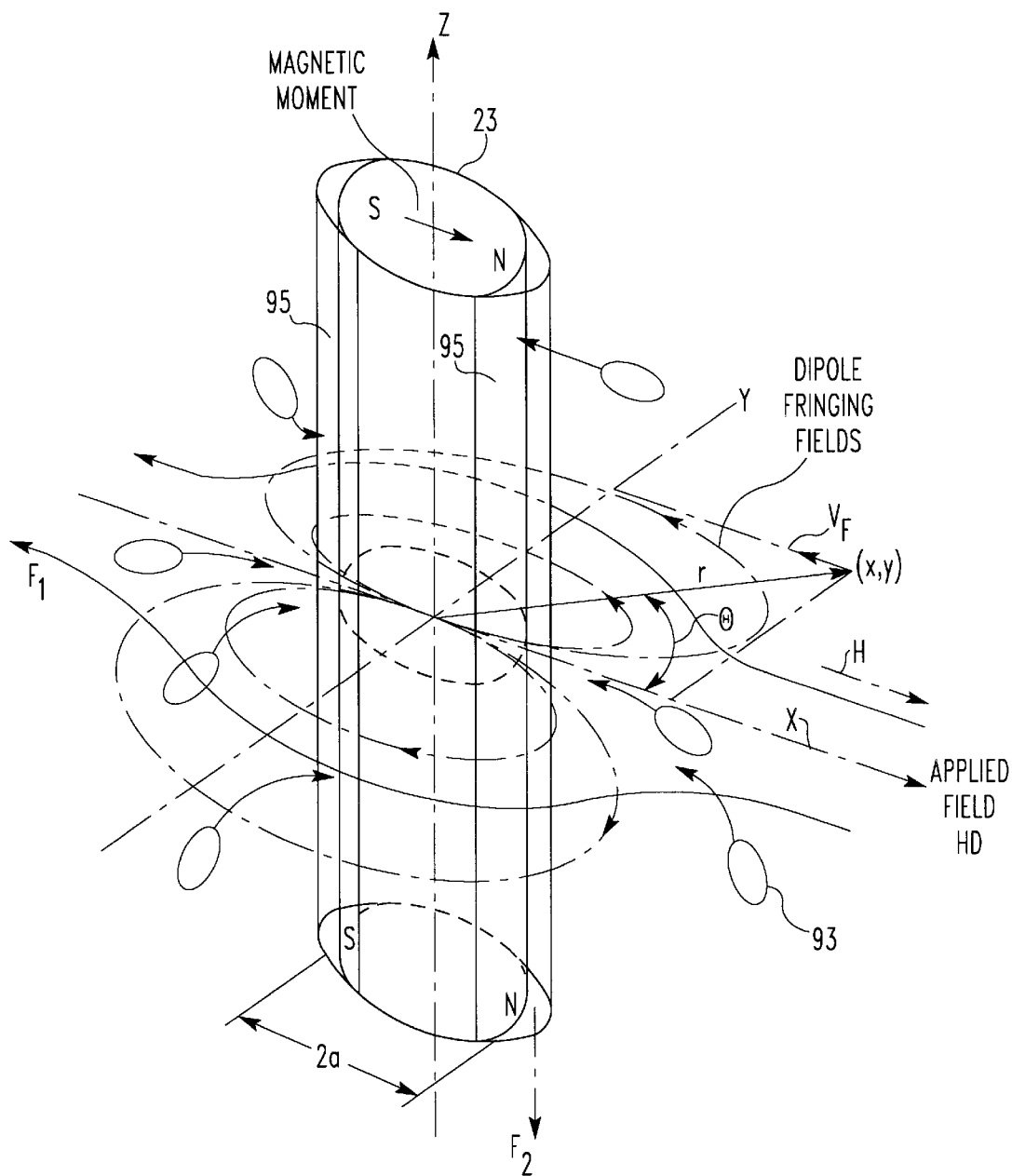
FIG. 3d is a schematic illustration of the attraction of the dispersed (aqueous) phase droplets to the surface of a magnetic rod in an external magnetic field. The dispersed phase is in flow around the rod.
Figure 3C:
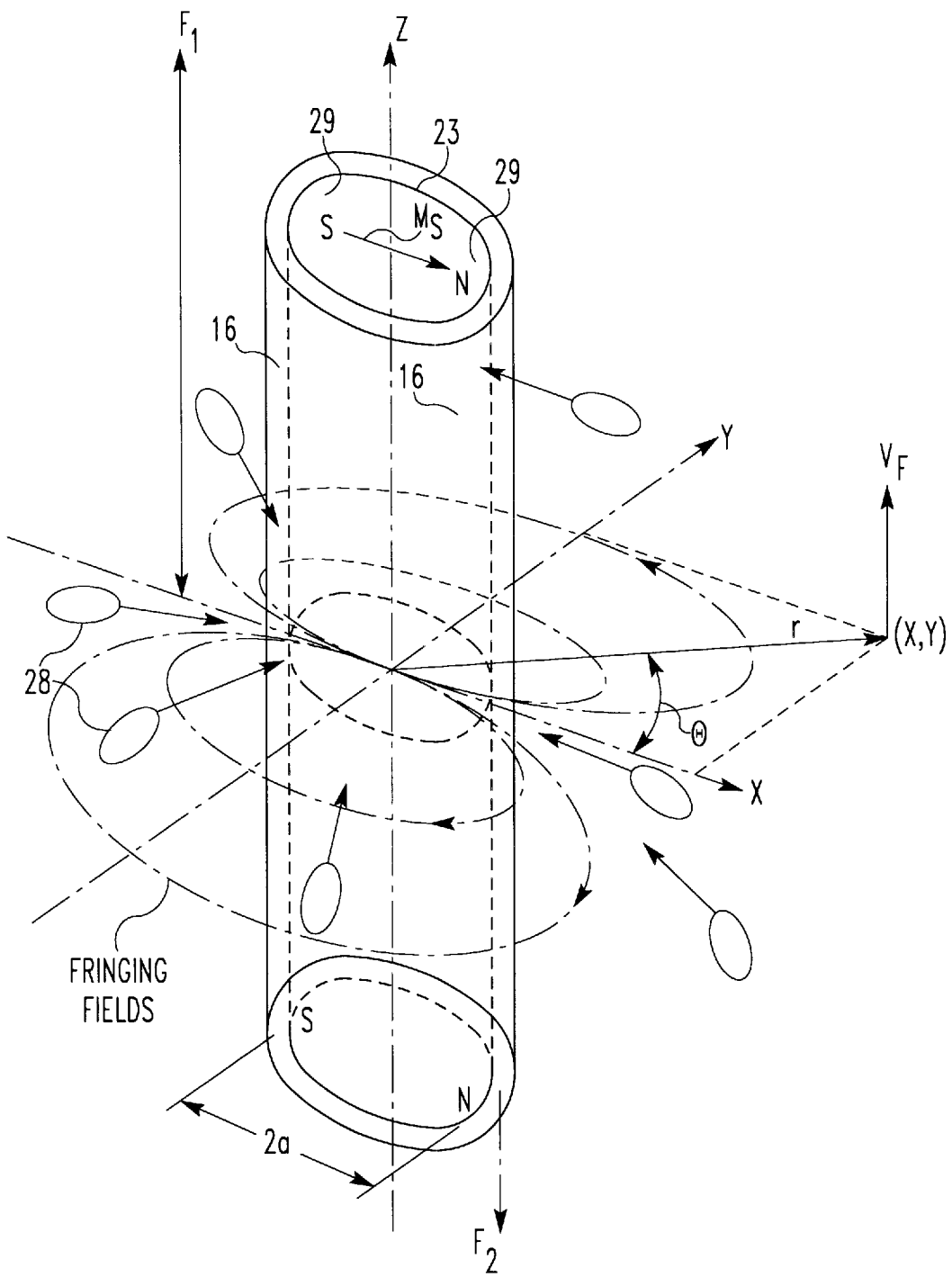
FIG. 3c is a schematic illustration of the attraction of the dispersed (aqueous) phase droplets to the surface of a permanent magnet rod magnetized transverse to its length. The dispersed phase is in flow along the length of the rod.
Figure 4A:
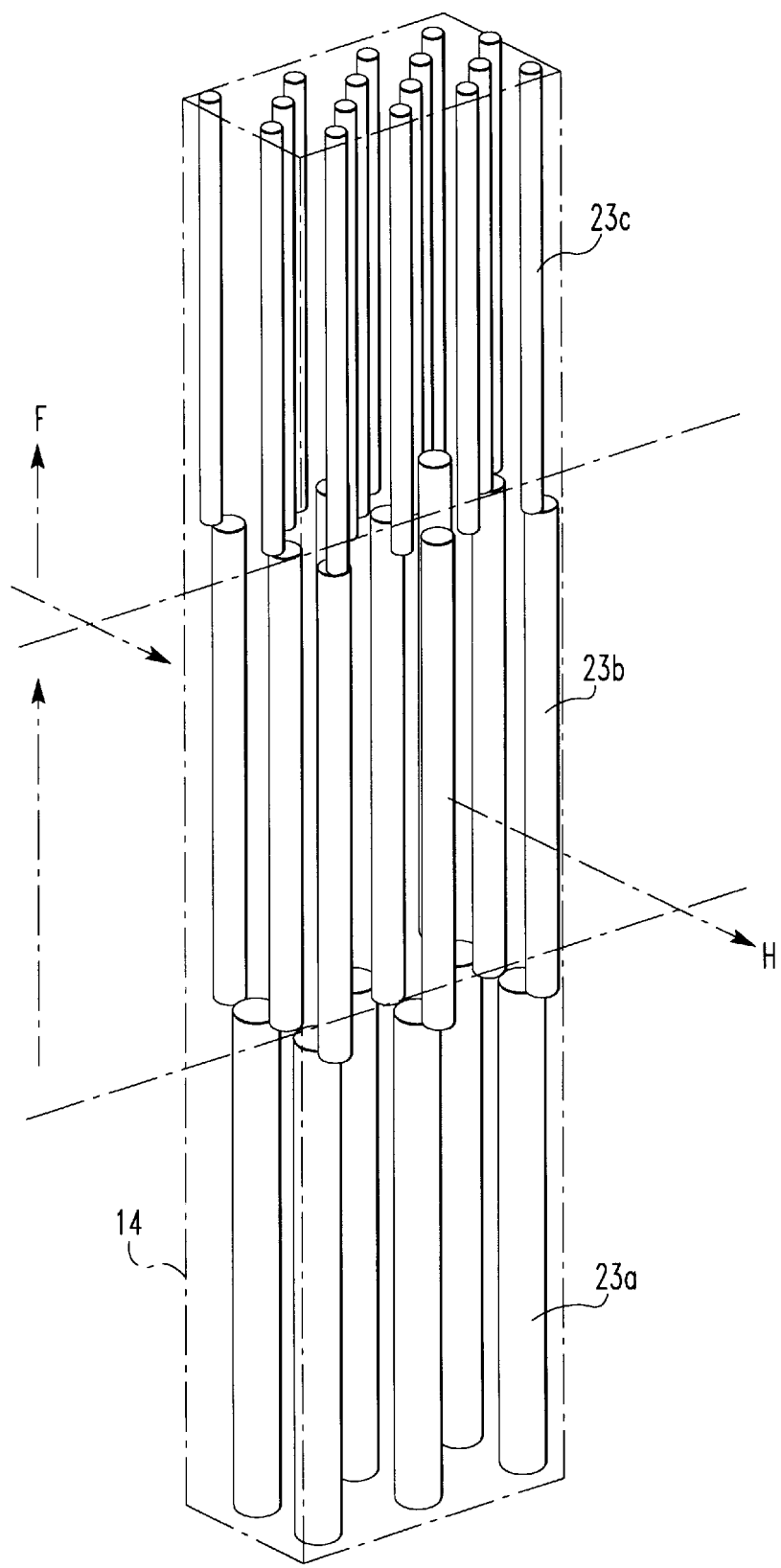
FIG. 4a is a schematic illustration of another preferred packing arrangement for the column of FIG. 2.
Figure 4B:
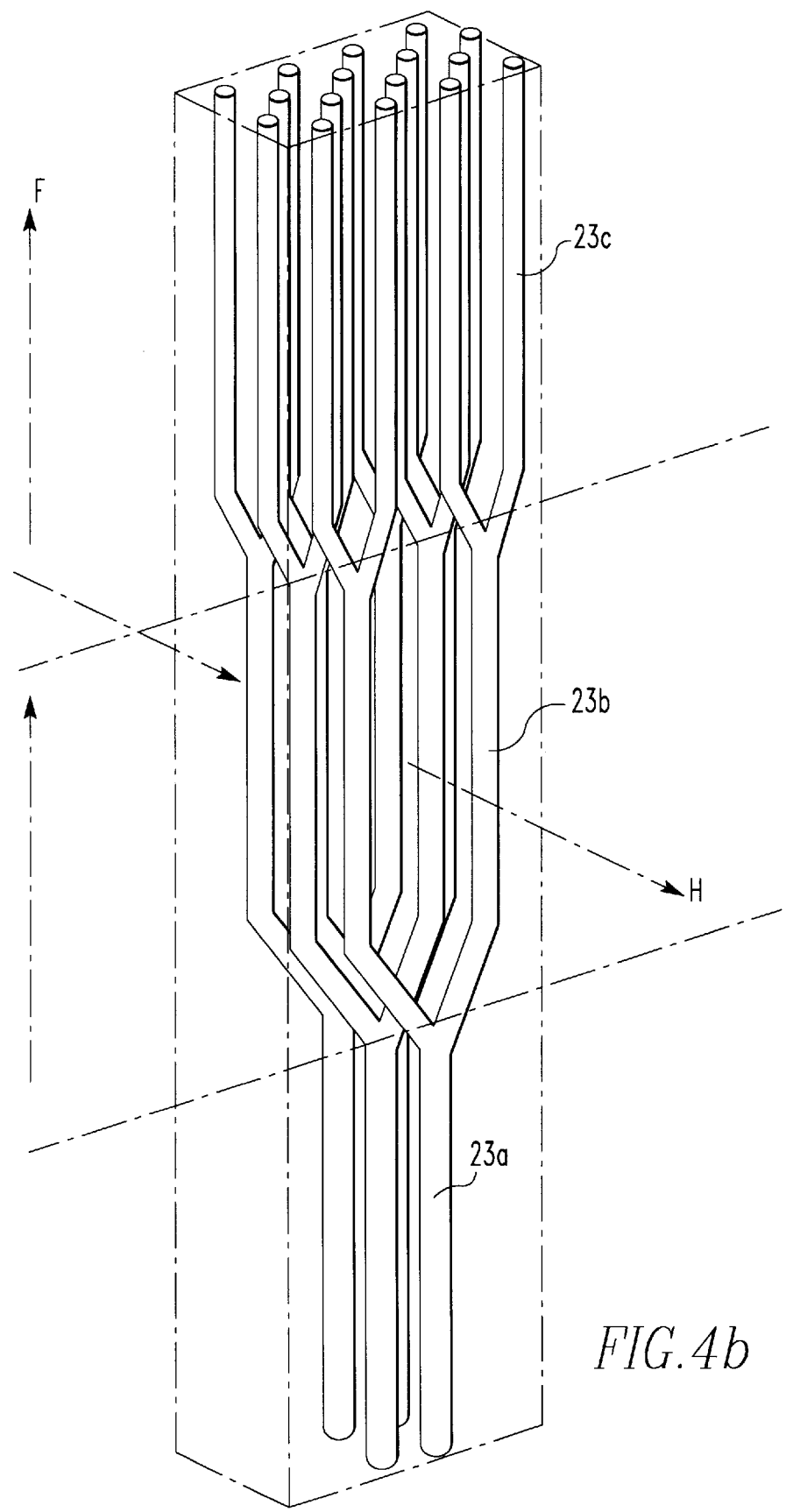
FIG. 4b is a schematic illustration of yet another preferred packing arrangement for the column of FIG. 2.

To illustrate multiple pass operation with an electromagnet the emulsion was pumped through a coalescer of the type shown in FIGS. 2a and 2b in three separate passes. The coalescer contained 70 steel rods, each of 0.0442 inches diameter. The packing density of 12%. The emulsion was pumped at a rate of 30 cm$^3$/min. The retention time for a single pass was 4–5 minutes. The applied magnetic field strength was 800 Gauss. After the first pass the water content was reduced from 16.18% to 1.37%. After the second pass the water content was reduced further to 0.72%, and after a third pass the water content was reduced to 0.51%.

Next the reference emulsion was pumped through an eight (8") long canister containing 16 permanent magnets in the first four (4") inches and 32 magnets in the second. The packing density of the permanent magnets was approximately 5.6% in the first four inches of the coalescer and 11% in the second. The pump rate was 80 cm$^3$/min and the water was reduced from 16.18% to 0.45% which is lower than that achieved in three passes in the electromagnet at the same magnetic field strength.

Next a split of the product from the treatment with the permanent magnet coalescer was passed through the electromagnet separator containing a 6% packing of 0.014" steel wires. The applied magnetic field was 800 Gauss. The water content was reduced further to 0.42%. The water reduction was small because of the short range of the fringing fields produced by the very fine size wire.

Lastly, the magnetic field strength of the electromagnet was increased to 1680 Gauss and a split of the product from the permanent magnet coalescer was passed through the electromagnet containing a 6% packing of the 0.014" steel wires. Now the final water content was reduced to 0.18%.

(v) Effects of MERPOL® A

A series of experiments were carried out to demonstrate the effects of the destabilizing surfactant on continuous operation in the first stage coalescer. For these tests seventy (70) magnetic rods were suspended in the coalescer volume. The diameter of each rod was 0.044 inch and the total weight was 138 grams. Magnetic emulsions were prepared with average values of 80.28% mineral oil, 16.47% water, 3.01% dry FML, 0.16% emulsifier K, and $183.3*10^{-6}$ cm$^3$/gm magnetic susceptibility. MERPOL® A was used as the destabilizing surfactant. Its concentration ranged from 0.0% to 0.33%. These emulsions were pumped through the cell which was energized at different levels of the magnetic field strength. The retention time for all of the measurements was 8 minutes. In all cases, the cell was operated until a dehydrated product of 200 cc was collected. The cell contents were emptied at the end of the run. Their appearance was noted and in some cases the viscosity of the sludge was measured. The results of the tests are given in Table VI.

It is apparent that even with no MERPOL® A present, the cell as configured can achieve significant water removal. This is accomplished, however, at the expense of FML retention in the cell and oil loss through discharge of floccs containing FML, water, and oil at the bottom of the cell. Indeed, the viscosity of the sludge separated from the coalescer at the end of the run increases with increasing magnetic field strength indicating increased retention of FML.

In a separate series of experiments, the magnetic field was kept at zero and the MERPOL® A content was increased from zero to 0.33% based on the whole emulsion. The water reductions observed are not as great as achieved with accompanying use of the magnetic field. Oil was discharged with the FML/water underflow for MERPOL® A levels up to 0.16%. At higher levels, oil was not noticed in the discharge but capture in the wire matrix bed was observed for the case of 0.33 MERPOL® A. A viscous sludge was separated.

A single run was carried out at 0.16% MERPOL® A in a magnetic field of 800 gauss. This achieved the best water removal of all the runs, including the run at 6000 Gauss with no MERPOL® A, and exhibited no mineral oil in the FML/water discharge. The contents of the cell after coalescence had the same general appearance of the feed emulsion and no evidence was found for hold up of FML in the wire matrix bed.

(vi) Magnetic Field Assisted Settling

Experiments were carried out to demonstrate the effects of long range and non-symmetric gradient magnetic fields on dewatering of magnetic emulsions. In the first, an electromagnet is used and in the second, permanent magnets are used.

a. Field Assisted Dewatering Using an Electromagnet

The effect of externally applied magnetic field gradients were investigated using batch testing in a coalescence cell of the type shown in FIG. 2a with no internal gradient producing rods present. A cell and an electromagnet with a vertical configuration of the type shown in FIG. 2b was used except that three different sets of poles (curved, vee and flat) were used to provide magnetic fields of differing spacial dependencies. A horizontal electromagnet with flat and vee-shaped pole pieces installed is shown in FIG. 6. The curved pole piece has a surface shape which is intermediate between that of the flat and the vee poles. Results obtained with five different pole face combinations are given in Table VII. No MERPOL® A was used.

Coalescence of an emulsion containing 77.6% mineral oil, 12.9% water, 8.6% dry FML and 0.9% emulsifier K was investigated for each of the pole combinations. The emulsion had a magnetic susceptibility of $329.9*10^{-6}$ cm$^3$/gm. Using each set of poles, the emulsion was kept inside the magnetic field for 5 minutes. After 5 minutes, samples were removed and the values of the magnetic susceptibility and water content in the upper 10% of the cell were compared with the initial values.

The results indicate that all of the pole combinations are suitable for emulsion breaking, but vee/flat and vee/curved give the best results.

Only the vee/flat and the vee/curved pole combinations produce non-symmetrical force fields in the working volume. Virtually all of the combinations tried here produce non-uniform fields, but the two that showed the best performance produced the largest force of attraction of the magnetic component to one side of the coalescer cell.

b. Field Assisted Settling Using Permanent Magnets

For this work, a magnetic emulsion containing MERPOL® A was prepared using mineral oil. It contained 0.41% water and had a magnetic susceptibility of $4.64*10^{-6}$ cm$^3$/gm. The droplet particle size of the internal phase of the dehydrated emulsion was finer than 2 microns.

Six representative splits were prepared from the emulsion for use in the tests. Approximately 25 cc of each of the splits was placed in a beaker and allowed to settle for various amounts of time. One emulsion was left to stand for three hours with no applied magnetic field and one was left to stand for 24 hours with no field. The remaining four beakers were each placed on top of a permanent magnet which produced a magnetic field of nominally 1500 Gauss and a magnetic field gradient of about 1000 Gauss/cm at the magnet face. After the prescribed settling times, the contents of the beakers were decanted and the magnetic susceptibility and the water content was measured for the decantate. The results of these measurements are given in Table VIII.

It is apparent from the table that the magnetic treatment was significantly more effective in dewatering the emulsion containing very small amounts of micron sized magnetic water droplets than was settling of the magnetic droplets without use of magnetic fields. In one hour's time, the water content of the magnetic field assisted settler product was less than that prepared in non-field assisted settling in a period of 24 hours.

(vii) Continuous CO-HGMC Versus Batch-Operated HGMS

The examples of Section (iv), Field Gradient Production Elements, show that the continuous first stage coalescer employing gradient producing rods can achieve the same level of water separation as with a combination of mesh wire and fine grade stainless steel wool. The continuous coalescer, however, avoids the problems of batch operation and oil loss inherent to the use of mesh wire and stainless steel wool.

A test was undertaken to show that batch processing with conventional HGMS is not practical as applied to emulsions of the type treatable with the continuous coalescer. An emulsion containing 80.22% mineral oil, 16.12% water, 3.19% FML, 0.16% emulsifier K, and 0.31% MERPOL® A, which had a magnetic susceptibility of $346.8*10^{-6}$ cm$^3$/gm, was processed by HGMS at 800 Gauss and 4.5 minutes retention time. The results of those tests are shown in Table IX. In the table the column labeled "Run Time" is the time of sample collection after the initial spill over.

It is apparent that the HGMS filter becomes fully loaded in a run time which is less than one retention time where retention time is the time that the emulsion spends in the HGMS canister. This is unpractical, even for reciprocating or carousel type separators. The results of Section (i-a), Demulsification with Surfactant, show that the continuous coalescer described and tested herein operated with similar emulsions for periods up to three hours or 40 canister volumes without exhibiting signs of FML retention in the coalescer.

(viii) Demulsification of High Water Content Crude Oil Using CO-HGMC

Tests were carried to demonstrate the capability of CO-HGMC to dewater a high water content California light crude oil collected at the well head. The crude oil contained 75.37% water; magnetic susceptibility was $-0.83*10^{-6}$ cm$^3$/gm.

The crude oil was treated with 305 ppm SILWET® L7602. Water containing a small amount of impurities (particulates and a hydrocarbon fraction) was immediately separated from the oil without exposure to a magnetic field. The resulting oil contained 17.13% water; the magnetic susceptibility was $-0.84*10^{-6}$ cm$^3$/gm. The water separated in this operation had a magnetic susceptibility of $-0.78*10^{-6}$ cm$^3$/gm and a specific gravity of 1.03.

LIGNOSITE® FML was mixed with this oil to produce an emulsion containing 73.44% dry crude oil, 23.54% water, 3.01% dry LIGNOSITE® FML and 0.008% SILWET® L7602. This emulsion was processed at ambient temperature of 25° C. through a CO-HGMC unit containing seventy (70) 0.044-inch diameter magnetic rods as shown in FIGS. 2a and 2b. A retention time of 4.5 minutes was employed. The magnetic field strength was 800 Gauss. The water content and magnetic susceptibility of overflow samples collected at various times after initial spill over are shown in Table X.

Magnetostatic coalescence of crude oil using the CO-HGMC unit and SILWET® L7602 as the destabilizing surfactant can prepare dehydrated crude oil which has the same levels of water content as do emulsions prepared from light mineral oil which are processed using MERPOL® A as the destabilizing surfactant. It is important to note that the magnetic demulsification was carried out at ambient temperature, 25° C. No elevated temperature was employed, as is common electrostatic demulsification.

(ix) Demulsification of Low Water Content Crude Oil Using HGMS

A product of the CO-HGMC treatment described in the section above which contained SILWET® L7602 was further processed in a field assisted settler to prepare a low water content emulsion to be treated by HGMS. The emulsion contained nominally 99.42% California crude oil, 0.54% water, and 0.046% dry FML. This emulsion was processed through an HGMS unit operating at 1680 Gauss. The retention time was 8 minutes. The water content levels and magnetic susceptibilities of samples collected at various times after the initial spill over are given in Table XI.

This example illustrates that magnetostatic coalescence can prepare refinery quality feedstocks from high water content California crude oil.

(x) Separation of Paramagnetic Impurities from Crude Oil By Magnetostatic Coalescence In the above example, the very low water content product of magnetostatic coalescence was more diamagnetic than was the raw crude oil or the 17.13% water product prepared from it by chemical demulsification with SILWET® L7602 without magnetic treatment. Further, the water separated by chemical demulsification was more strongly diamagnetic than is pure water, indicating the presence of diamagnetic impurities. The magnetic susceptibilities of the various fractions are shown in Table XII.

It is apparent from the table that a paramagnetic component, which is not separated by chemical demulsification, is being separated from the crude oil by the magnetic treatment. The large volume of water which is separated by chemical demulsification is diamagnetic; therefore the separation of paramagnetic material, which accounts for the difference in magnetic susceptibilities of the raw crude and the HGMS dehydrated product, is accomplished in the magnetostatic processing. A variety of harmful paramagnetic materials ranging from metal sulfides and oxides to chemically complexed trace elements (e.g., iron, cobalt, nickel, and vanadium) occur in crude oil. These trace elements have an adverse effect on hydrogen consumption and catalytic activity and must be removed from the crude for efficient oil refining. The paramagnetic impurities which can be separated from the crude oil by magnetostatic coalescence cannot be separated by chemical demulsification alone.

(xi) OL/W Test Results

Emulsions of the OL/W type made from both heptane and light mineral oil were broken in a batch coalescer cell. Approximately 30 cc of emulsion was used for each study.

The OL/W emulsions used are significantly different from W/OL emulsions containing FML in several ways. First, the oleophilic magnetic additive, NUODEX® Naphthenate Iron 6%, is at least two orders of magnitude less magnetic than hydrophilic additive, FML. Secondly, mixtures of several emulsifiers (Tween® 95, T-DET® N40, and SPAN® 80) were employed to create stable magnetic emulsions. As was the case with W/OL emulsions, after an emulsion is broken, the water moves to the bottom of the cell because of its higher density. Unlike the W/OL emulsions, however, the magnetic susceptibility is observed to increase in the organic liquid phase after coalescence because the magnetic additive is organic liquid soluble.

An emulsion was prepared containing water, heptane, NUODEX®, and oleophilic additives Tween® 95, T-DET® N40, and SPAN® 80. The emulsion contained 61% water and had a magnetic susceptibility of $0.19*10^{-6}$ $cm^3/gm$. The emulsion was placed in a field of 10,000 Gauss for 80 minutes using the horizontal vee/flat pole combination shown in FIG. 6.

Upon removal from the magnetic field, a water/heptane interface was observed. The top and bottom layers were removed separately and analyzed. The water content of the top layer had decreased to 53.9% and the magnetic susceptibility had increased to $0.28*10^{-6}$ $cm^3/gm$, while the water content and the magnetic susceptibility of the bottom layer were measured as 83.5% and $-0.5*10^{-6}$ $cm^3/gm$, respectively.

The effect of magnetic field strength was measured for an emulsion prepared from mineral oil, water, NUODEX®, and oleophilic additives Tween® 95, T-DET® N40, and SPAN® 80. The initial emulsion contained 76% water and had a magnetic susceptibility of $0.19*10^{-6}$ $cm^3/gm$. The emulsions were exposed to magnetic fields of 3,000, 5,000, and 10,000 Gauss using the horizontal vee/flat pole combination for 20 minutes and allowed to settle for 20 minutes, whereupon the top ⅓ of the coalescer cell was removed and analyzed. The results, given in Table XIII, show an increase in the magnetic susceptibility of the top portion of the emulsion and a decrease in water content as expected. The data indicate that the emulsion is being broken by a magnetic field and show that the degree of breaking increases with the magnetic field strength.

(xii) Microcell

The practicality of the magnetostatic coalescence method will be improved by proper choice of a film destabilizing additive which enables coalescence at low levels of the magnetic field strength. Surfactants are used to destabilize the film and lower interfacial film viscosity. Generally, these surfactants lower interfacial tension as well.

The effects of the magnetic additive and of the film destabilizing surfactant have been observed using a novel microcell mounted on the stage of a microscope which is installed between the poles of an electromagnet. In addition to observing the effects of surfactants on destabilizing the interfacial film separating internal phase droplets, the method has also been used to make quantitative measurements of the size and shapes of the droplets coalescing in a magnetic field. This information can be interpreted to yield the interfacial tension. The microscope provides a quick, simple, and inexpensive method for surveying the effects of many additives on the liquid system of interest.

Magnetized droplets of the internal phase are attracted to one another in a magnetic field. Once they come together, the magnetic force of attraction compresses the interfacial film separating the particles. If the field strength is sufficient, then rupture will occur and the droplets will coalesce. If the field is not sufficiently strong because of weak magnetism of the droplets, because of repulsive interactions between droplets, or because of a tenacious interfacial film, then the particles will chain or flocculate in the field and rupture will not occur.

Many surfactants such as emulsifiers, demulsifiers, wetting agents, detergents, etc. are available for use in emulsions applications; only qualitative guidelines exist for distinguishing among their many functions. Further, there is no previous experience in observing the effects of surfactants or other chemical additives on coalescence in a magnetic field and no guidelines or methods exist for choosing the best additive. Conventional practice would suggest determining the effects of candidate surfactants upon demulsification using a coalescence cell. Since many concentration levels may have to be tested, this can be time consuming and costly. The microscope provides a simple, rapid, and direct method for observing these effects using small samples. The microscope can provide a useful adjunct for guiding testing and operation with a coalescence cell.

To make observations of magnetostatic coalescence, a modified Olympus Model CH trinocular microscope was mounted between the poles of a bench-scale electromagnet of the type shown in FIG. 2b. The electromagnet, with a pole width of 5 cm, and a pole opening of 6 cm, could produce a uniform field of 2200 Gauss over the region of the slide containing the test emulsion. The microscope stage normally used to support and move the test slide in an X-Y plane was removed and replaced with a 5 cm deep by 6 cm wide flat stage made from non-magnetic aluminum. The base of the microscope, which normally contains the power source for the illuminating light, was removed. Illumination was provided by a projector lamp bulb and condensing lens mounted underneath the slide in order to maximize the amount of light available for viewing relatively opaque emulsions. A 600 Hz sinusoidal power source, up to 30 watts AC, was applied to the filament of a BLC projector lamp using a Dynascan 3017 sweep function generator to drive a Techron 7560 power amplifier which in turn fed the filament through a Triad PR-21-AL plate power transformer. High frequency AC excitation was used to avoid breakage of the filament caused by interaction of the AC filament current with the magnetic field. Alternatively, the source of illumination could be supplied to the underside of the microscope slide using lenses or non-magnetic fiber optics.

A series of experiments were carried out to investigate the effects of various surfactants on coalescence in a magnetic field. In these experiments, stable emulsions were prepared containing light mineral oil, LIGNOSITE® FML, water, emulsifier K, and various destabilizing surfactants. A small amount of each emulsion was placed on a glass slide mounted on the stage of the microcell. The effects of time and magnetic field strength were observed as the internal phase droplets coalesced in the magnetic field. Results of the observations shown in Table XIV were used to guide the choice of surfactant to be used in batch and continuous coalescer cell operation.

Surfactants which have been found to be effective in destabilizing the interfacial film and in lowering film viscosity also lower interfacial surface tension, even though this does not appear to be a primary effect in promoting efficient coalescence in a magnetic field. It has been observed that systems destabilized with use of a surfactant coalesce rapidly to large ellipsoidal droplets. The size and shape of the ellipsoids in a magnetic field are related to interfacial surface tension.

Neglecting the effects of gravity, droplets of magnetic liquid immersed in an immiscible liquid in zero magnetic field assume spherical shapes. The pressure difference, $\Delta p$ (dynes/$cm^2$), between the inside and the outside of the droplet is related to the interfacial surface tension ($\Gamma$ dynes/cm) and the droplet radius, r (cm), as in Eq. (1).

$$\Delta p = 2\Gamma/r \qquad \text{Eq. (1)}$$

Magnetic stress acting at the surface of an isolated magnetized droplet distorts the spherical shape into that of a prolate ellipsoid aligned with the direction of the applied field, H (Gauss). In fields for which the magnetic energy of the droplet, proportional to $H^2$, is not sufficient to rupture the surface of the droplet, the increase in surface area, $\Delta S$ (cm$^2$) is related to the magnetic energy of the droplet by Eq. (2) where A is a constant.

$$\Gamma(\text{dynes/cm}) = A * H^2 / \Delta S \qquad \text{Eq. (2)}$$

There are several methods which could be employed to observe the effects of magnetic fields and destabilizing surfactants on the shapes of liquid particles. For example, a vertically oriented transparent cylinder filled with a non-magnetic liquid of interest could be placed between the poles of an electromagnet which produced a field in the horizontal plane. A droplet of the immiscible liquid containing the magnetic additive and the surfactant could be observed as it fell through the magnetized region inside the cylinder. Measurements of size and shape of the magnetized droplet could be made for the purpose of determining the interfacial tension characteristic of the two liquids and the associated additives. Alternatively, a transparent tube containing the same liquids and sealed at the ends could be held in a horizontal position between the poles of an electromagnet for the purpose of observing the effects of the magnetic field on the size and shape of the droplet.

The method which is employed here consists of placing a drop of an emulsion containing a magnetic internal phase onto a slide mounted on the stage of microscope which is placed between the poles of an electromagnet. The microscope is used to observe the progress of coalescence in the magnetic field. The size and shape of coalescing droplets is analyzed to determine the surface area created by magnetization. The measurements of surface area created in the magnetic field can then be correlated with independent measurements of the interfacial surface tension to calibrate the method. Once calibrated, the microscopic method then can be used to measure effects of surfactants and magnetic additives on interfacial tension in a magnetic field. Prior to the present invention these measurements have never been made before.

The approach of the method of the invention is to photograph the changes of shape of a droplet in the field of view of the microscope as the magnetic field is increased. The change of droplet size with time caused by coalescence is very slow for droplets in the nominal tens to hundreds of microns size range. Because of this, coalescence does not interfere with the observation. The droplets are photographed each time the magnetic field is changed. Analysis of the photographs to obtain the ellipsoid axes allows the determination of interfacial surface area. The first step is to correlate the increase in the surface area with the square of the magnetic field strength for the test sample.

$$\Delta S = B * H^2 \qquad \text{Eq. (3)}$$

This determines a coefficient B which is characteristic of the test sample. The second step is to correlate the measurements of 1/B for a series of samples of known interfacial surface tension. This determines the coefficient A in the relationship, $$\Gamma = A/B. \qquad \text{Eq. (4)}$$

The interfacial surface tension can then be determined from measurements of A and B for any given sample.

Measurements have shown that the change in droplet shape in a magnetic field occurs without change in droplet volume. A sphere of diameter $D_o$ in zero field becomes an ellipsoid of revolution of the same volume as the sphere so long as the magnetic energy is not large enough to cause rupture at the ends of the droplet. The ellipsoid has major axis L and minor axis D as shown in FIG. 7b. The change in surface area under this condition is given by, $$\Delta A = \text{area of ellipsoid} - \text{area of sphere} = \qquad \text{Eq. (5)}$$

$$\pi/2 * D^2 \left[ 1 + L/D * \text{Sin}^{-1} \left\{ \sqrt{1 - (D/L)^2} \right\} / \sqrt{1 - (D/L)^2} \right] - \pi * (D^2 L)^{2/3} \qquad \text{Eq. (6)}$$

where the diameter of the sphere of equal volume, $D_o$, is given by, $D_o = (D^2 L)^{1/3}$.

Experiments were carried out in which the interfacial tension was measured for emulsions of water in mineral oil stabilized by emulsifier K versus water containing 3 Wt. % LIGNOSITE® FML and varying amounts of MERPOL® A. The interfacial tensions were measured using a CSC DuNouy Interfacial Tensiometer manufactured by CSC Scientific Company, Inc., 8315 Lee Highway, Suite 404, Fairfax, Va. 22031. This tensiometer is of the suspended ring type. The instrument had a sensitivity of ±0.05 dynes/cm and was accurate down to nominally 1 dyne/cm. Suspended ring type tensiometers are not used to measure interfacial tension below 1 dyne/cm. The instrument employed could not be used to make measurements in a magnetic field without major modification. Results of measurements with the tensiometer in zero field are given in Table XV.

Emulsions were prepared in which the concentration of MERPOL® A was varied from zero up to 5.58 Wt. % based on the total emulsion. Drops of this emulsion were placed on the microscope slide and viewed in magnetic fields up to 2200 Gauss. The coalescing droplets were photographed and the droplet dimensions were then measured using a calibrated reticle. Summary results of those measurements are given in Table XVI.

Following the procedure outlined above, values of B[(cm/Gauss)$^2$] were first obtained from the surface area created in the magnetic field for each level of MERPOL® A. Next, the values of B so obtained were correlated with measured values of the interfacial tension. This determined the coefficient $A = 6.17 * 10^{-11}$ cm$^3$. The results of the magnetic measurements of interfacial tension are compared with those obtained at zero field with the interfacial tensiometer in Table XVII, where values of B for each concentration are also shown.

The measurements of interfacial tension by the two methods agree where they overlap. Additionally, the magnetic method has been used to measure interfacial tension for very high concentrations of MERPOL® A where the conventional method is not applicable.

Using the relationship $\Gamma = A/B$ of Eq. (4), one can estimate the range of interfacial tensions which can be measured by the method.

The maximum interfacial tension that can be measured corresponds to the least detectable surface created for the maximum magnetic field strength applied. The smallest droplet that is feasible is approximately 10 microns, and the largest magnetic field that can be applied with an electromagnet is 20,000 Gauss. Use of superconducting magnets would allow the maximum field to be extended to nominally 50,000 Gauss for niobium titanium coils, or about 100,000 for niobium tin ribbon conductor. The estimate presented here is based on conventional electromagnets operating at 20,000 Gauss.

Using the relationship of Eq. (6) given above for the difference in areas of spheres and ellipsoids of equal volume, one can show that the area created by changing from sphere to ellipsoid is given by the relationship, $$\Delta S = SF(D/L) \qquad \text{Eq. (7)}$$

where $$F(D/L) = 1/2 * (D/L)^{2/3} * [1 + (L/D)*\sin^{-1}\{\sqrt{1-(D/L)^2}\}/\sqrt{1-(D/L)^2}] - 1 \qquad \text{Eq. (8)}$$

is a function of the ratio of D/L only and S is the area of the sphere of equivalent volume, $$S = \pi*(D^2 L)^{2/3} \qquad \text{Eq. (9)}$$

Assuming the least detectable area is for a 100 micron sphere and that D/L is 0.95, $$S = 3.25*10^{-4} \text{ cm}^2, \qquad \text{Eq. (10)}$$

$$F(0.95) = 0.0005. \qquad \text{Eq. (11)}$$

$$\Gamma = 6.17*10^{-11}*[(20,000)^2/(0.0005*3.25*10^{-4})] = 150,000 \text{ dynes/cm}$$

The magnetic method should not be limited on the high side for measurement of interfacial tension.

The minimum interfacial tension measurable correlates with the maximum increase in the interfacial area caused by the least magnetic field. Assuming the least field to be of the order of 100 Gauss and that the largest droplet that can be worked with practically will be of the order of 600 microns with a magnetized D/L of the order of 0.06, $$F(0.06) = 1 \qquad \text{Eq. (13)}$$

$$S(600 \text{ microns}) = \pi(600*10^{-4})^2(1/0.06)^{2/3} = 7.4*10^{-2} \text{ cm} \qquad \text{Eq. (14)}$$

$$\Gamma = 6.17*10^{-11}*10^4/(7.4*10^{-2}) = 8*10^{-6} \text{ dynes/cm}. \qquad \text{Eq. (15)}$$

Generally, the microscopic method is limited by settling of the droplets in the emulsion, by magnetic rupture of the interfacial film, and by the smallest droplet which is visible in the microscope. Further, the method requires transparent liquids in order to make observations in transmitted light. Alternative methods of measurement such as X-ray and scanning electron microscopy could be used to overcome this limitation.

In the case of detection of very small interfacial tensions, the method is not limited to the use of strongly magnetic additives such as the LIGNOSITE® FML. Paramagnetic liquids such as aqueous salts of Fe, Mn, Co, Gd, Tb, and Dy described by U. Andres in Mineral Science and Engineering 7, No. 2, pp. 99–109 (April, 1975), incorporated in its entirety by reference herein, could be used as well. The method has a very wide dynamic range and is very simple to operate [as opposed to methods such as the rotating bubble method described by Vonnegut, "Rotating Bubble Method for the Determination of Surface and Interfacial Tensions," Rev. Sci. Instr. 13, pp. 6–9 (January, 1942)].

A series of experiments were carried out to test the effects of interfacial tension on water separation in the first stage separator. Two surfactants were tested. The first, MERPOL® A, produced an emulsion which coalesced readily in a magnetic field. The second, FLUORAD™ FC 129, produced an emulsion of low interfacial tension which chained but did not coalesce readily in a magnetic field.

A stable emulsion containing approximately 80% mineral oil, 16% water, 0.16% emulsifier K and 3% FML was used to prepare a series of magnetic emulsions containing either MERPOL® A or FLUORAD™ FC 129. These emulsions were dehydrated in the first stage CO-HGMC magnetized to 800 Gauss. For each test the flow velocity was 18.5 cm³/min corresponding to a retention time of 8 minutes. The results of the tests are compared in Table XVIII.

It can be seen from the table that the degree of dewatering at 800 Gauss achieved when processing an emulsion of 0.6 dynes/cm interfacial tension prepared with FLUORAD™ FC 129 was comparable to that obtained for an emulsion prepared with MERPOL® A but for which the interfacial tension was approximately seven and one-half times higher. Comparable water reduction results can be obtained at much higher interfacial tensions when using MERPOL® A.

TABLE I

Measured Values of Magnetic Susceptibility

| Material | Magnetic Susceptibility ($10^{-6}$ cm³/gm) |
|---|---|
| Crude Oil | −0.89 |
| Mineral Oil | −0.83 |
| Heptane | −0.85 |
| Gasoline | −0.80 |
| Distilled Water | −0.72 |
| Emulsifier K | −0.75 |
| Tween ® 85 | −0.60 |
| T-DET ® N40 | −0.65 |
| SPAN ® 80 | −0.63 |
| Pluronic ® L62 | −0.69 |
| MERPOL ® A | −0.66 |
| NUODEX ® Naphthenate Iron 6% | +4.7 |
| LIGNOSITE ® FML | 1,000–4,200 |
| Dry FML | 4,000–15,000 |

TABLE II

Results of Continuous Magnetostatic Coalescence of a Water in Mineral Oil Emulsion Containing MERPOL ® A

| Time (Min.) | First Stage Coalescer Output | | Field Assisted Settler Output | |
|---|---|---|---|---|
| | Magnetic Suscep. ($10^{-6}$ cm³/gm) | Water (Wt. %) | Magnetic Suscep. ($10^{-6}$ cm³/gm) | Water (Wt. %) |
| INITIAL | 7.31 | 0.58 | 0.30 | 0.12 |
| 15 | 4.79 | 0.43 | | |
| 30 | 13.54 | 1.04 | 0.26 | 0.12 |
| 45 | 8.10 | 0.64 | | |
| 60 | 7.83 | 0.65 | 0.39 | 0.13 |
| 75 | 6.61 | 0.69 | | |
| 90 | 8.45 | 0.68 | 0.39 | 0.12 |
| 105 | 18.06 | 1.14 | | |
| 120 | 16.12 | 1.14 | 0.32 | 0.10 |
| 135 | 13.38 | 0.93 | | |
| 150 | 12.15 | 0.86 | 0.23 | 0.10 |
| 165 | 8.13 | 0.68 | | |
| 180 | 15.29 | 1.04 | 0.35 | 0.11 |

TABLE III

Results of Continuous Magnetostatic Coalescence of a Water in Mineral Oil Emulsion Containing No MERPOL ® A

| | First Stage Coalescer Output | | Field Assisted Settler Output | |
|---|---|---|---|---|
| Time (Min.) | Magnetic Suscep. ($10^{-6}$ cm$^3$/gm) | Water (Wt. %) | Magnetic Suscep. ($10^{-6}$ cm$^3$/gm) | Water (Wt. %) |
| INITIAL | 22.8 | 2.00 | 1.68 | 0.31 |
| 15 | 172.5 | 10.83 | 1.25 | 0.21 |
| 30 | 221.1 | 13.00 | 1.36 | 0.20 |
| 45 | 218.7 | 13.58 | 1.37 | 0.20 |
| 60 | 208.8 | 12.79 | 1.39 | 0.18 |

TABLE IV

HGMS Dewatering of Low Water Content Emulsion

| | | | Product Characteristics | | |
|---|---|---|---|---|---|
| Magnetic Field (Gauss) | Retention Time (Min.) | Processing Time (Min.) | Magnetic Suscep. ($10^{-6}$ cm$^3$/gm) | Water (Wt. %) | Water Reduction (%) |
| 0 | 4.5 | 60 | −0.47 | 0.033 | 75.55 |
| 800 | 4.5 | 1 | −0.83 | 0.008 | 93.87 |
| 800 | 4.5 | 15 | −0.85 | 0.009 | 93.72 |
| 800 | 4.5 | 30 | −0.83 | 0.009 | 93.43 |
| 800 | 4.5 | 45 | −0.82 | 0.009 | 93.43 |
| 800 | 4.5 | 60 | −0.83 | 0.008 | 93.80 |
| 6420 | 37 | 60 | −0.88 | 0.008 | 94.09 |

TABLE V

Effects of Field Gradient Producing Elements on Operation of the First Stage Coalescer

| | Coalescer Output | | | | |
|---|---|---|---|---|---|
| 1st STAGE MATRIX DESCRIPTION | Magnetic Suscep. ($10^{-6}$ cm$^3$/gm) | Water (WT. %) | Cal'c FML (WT. %) | FML Reduct. (%) | Water Reduct. (%) |
| Wire Mesh-Bottom; Steel Wool-Top | 4.00 | 0.32 | 0.051 | 98.29 | 98.04* |
| 138 gm 0.044" Dia. Steel Rods-70 | 4.64 | 0.41 | 0.058 | 98.07 | 97.51 |

*NOTE:
Oil In FML\Water Product

TABLE Va

Effects of Canister Length and Flow Rates on Water Reduction for 5.6% packing of 0.14 Inch Diameter ALNICO Rods with Pole Fields of Nominally 850 Gauss. Initial Emulsion Contained 16.17% Water.

| | Magnet Element Length (inches) | | |
|---|---|---|---|
| | 4 | 8 | 12 |
| Flow Velocity | No. of Magnets | | |
| (cm$^3$/min) | 16 | 32 | 48 |
| 13 | 0.54 | 0.44 | 0.35 |
| 20 | 0.78 | 0.49 | 0.42 |
| 40 | 0.95 | 0.62 | 0.47 |
| 80 | 1.54 | 0.78 | 0.63 |

TABLE VI

Effects of MERPOL ® A on Continuous Operation of First Stage Coalescer Containing Seventy (70) 0.044-inch Diameter Magnetic Rods

| | | Coalescer Output | | | Cell Contents | |
|---|---|---|---|---|---|---|
| MERPOL ® A (Wt. %) | Magnetic Field (Gauss) | Magnetic Suscep. ($10^{-6}$ cm$^3$/gm) | Water (Wt. %) | Reduction (%) | Appearance | Viscosity (CPS) |
| 0.00 | 0 | 243.0 | 15.01 | 9.75* | SAME AS FEED | |
| 0.00 | 200 | 118.6 | 7.19 | 56.14* | SLUDGE-LIKE | 400 |
| 0.00 | 800 | 17.4 | 1.33 | 92.02* | SLUDGE-LIKE | |
| 0.00 | 1680 | 10.7 | 1.00 | 93.93* | SLUDGE-LIKE | |
| 0.00 | 3300 | 7.2 | 0.89 | 94.55* | SLUDGE-LIKE | 680 |
| 0.00 | 6000 | 4.7 | 0.63 | 96.15* | SLUDGE-LIKE | 720 |
| 0.08 | 0 | 201.6 | 12.19 | 25.74* | | 91 |
| 0.16 | 0 | 154.6 | 8.94 | 45.58* | | |
| 0.24 | 0 | 67.3 | 4.21 | 74.47 | | |
| 0.33 | 0 | 90.3 | 6.10 | 62.91 | | 77 |
| 0.16 | 800 | 3.7 | 0.48 | 97.06 | | |

*NOTE:
Oil In FML/Water Product

TABLE VII

Effects of Long Range, Non-Symmetric Gradient Fields on Coalescence in an Electromagnet
The feed emulsion contained 12.9% water and had a magnetic susceptibility of 3299*$10^{-6}$ cm$^3$/gm.

| | Product of Demulsification | |
|---|---|---|
| Pole Faces | Magnetic Susceptibility ($10^{-6}$ cm$^3$/gm) | Water (%) |
| Vee/Flat | 17.3 | 1.2 |
| Vee/Vee | 41.6 | 2.8 |
| Vee/Curved | 16.2 | 1.3 |
| Flat/Curved | 43.2 | 2.8 |
| Flat/Flat | 35.2 | 2.2 |

TABLE VIII

Effects of Long Range Non-Symmetric Gradient Fields Produced by Permanent Magnets

| | Field Assisted Settler, H = 1000 Gauss | | Non-Assisted Settler, H = 0 Gauss | |
|---|---|---|---|---|
| Time (Hrs.) | Magnetic Suscep. ($10^{-6}$ cm$^3$/gm) | Water (Wt. %) | Magnetic Suscep. ($10^{-6}$ cm$^3$/gm) | Water (Wt. %) |
| 1 | 1.80 | 0.24 | | |
| 2 | 0.53 | 0.14 | | |
| 3 | 0.05 | 0.11 | 4.46 | 0.38 |
| 24 | −0.61 | 0.03 | 2.91 | 0.30 |

TABLE IX

Results of HGMS Processing of Emulsions with 16% Water

| Run Time (Min.) | Magnetic Susceptibility ($cm^3/gm$) | Measured Output (Wt. % Water) | Water Reduction (%) |
|---|---|---|---|
| 0 | −0.8 | 0.17 | 98.98 |
| 4.5 | 168.5 | 12.36 | 23.33 |
| 9 | 200.9 | 13.31 | 17.44 |
| 13.5 | 203.4 | 13.59 | 15.70 |

TABLE X

Water Content and Magnetic Susceptibility of California Light Crude Oil Treated by CO-HGMC. H = 800 Gauss, Retention Time = 4.5 Minutes

| Sample Collection Time (Minutes) | Water Content Wt. % | Magnetic Susceptibility ($10^{-6}$ $cm^3/gm$) |
|---|---|---|
| 7 | 0.96 | 10.24 |
| 14 | 1.19 | 12.07 |
| 21 | 1.46 | 18.18 |
| 28 | 1.36 | 15.57 |
| 35 | 1.26 | 13.04 |

TABLE XI

Water Content and Magnetic Susceptibility of Low Water Content California Crude Oil Treated by HGMS at 1680 Gauss with 8 Minute Retention Time

| Sample Collection Time (Minutes) | Water Content Wt. % | Magnetic Susceptibility ($10^{-6}$ $cm^3/gm$) |
|---|---|---|
| 1 | 0.063 | −0.89 |
| 9 | 0.059 | −0.89 |

TABLE XII

Magnetic Susceptibility of Various Fractions Separated from California Crude Oil

| Fraction | Water Content (Wt. %) | Magnetic Susceptibility ($10^{-6}$ $cm^3/gm$) |
|---|---|---|
| Raw Crude | 75.37 | −0.83 |
| Chemically Demulsified Crude Oil | 17.13 | −0.84 |
| Water Product of Chemical Demulsification | | −0.78 |
| HGMS Dehydrated Crude Oil | 0.06 | −0.89 |

TABLE XIII

Effect Of Magnetic Field Strength On Magnetic Susceptibility and Water Content of Mineral Oil Separated from an Emulsion Containing NUODEX ® Naphthenate Iron 6%

| Magnetic Field (Gauss) | Final Water Content (%) | χ Value ($10^{-6}$ $cm^3/gm$) |
|---|---|---|
| 3000 | 72.9 | .27 |
| 5000 | 71.8 | .34 |
| 10000 | 72.6 | .42 |

TABLE XIV

Results of MicroCell Tests

| Demulsifier | Conc. (Wt. %) | Magnetic Field (Gauss) | Observation |
|---|---|---|---|
| MERPOL ® A | .84 | 200 | Very good coalescence |
| ZONYL ® FSD | .90 | 200+ | Chaining, Coagulating, Little coalescence |
| ZONYL ® FSJ | .93 | 200+ | Chaining, Coagulating, No coalescence |
| ZONYL ® FSA | .93 | 200+ | Chaining, Coagulating, Little coalescence |
| ZONYL ® FSP | .94 | 200+ | Chaining, Coagulating, No coalescence |
| SILWET ® L7602 | .93 | 200 | Very good coalescence |
| TIDE ® | 3.7 | 200 | Good coalescence |
| FLUORAD ™ FC 129 | .2 | 200+ | Chaining, Coagulating, No coalescence |
| FLUORAD ™ FC 740 | .27 | 200+ | Chaining, Coagulating, No coalescence |
| | .54 | 200+ | Chaining, Coagulating, No coalescence |
| FLUORAD ™ FC 430 | .85 | 200+ | Chaining, Coagulating, Some coalescence |
| FLUORAD ™ FC 431 | .92 | 200+ | Chaining, Coagulating, No coalescence |
| Adjust pH of water and FML to 9–10 using TIDE ® | | | |
| | | 200 | Rapid coalescence |
| ALCODET ™ HSC | .96 | 200+ | Chaining, Coagulating, No coalescence |
| Adjust pH of water and FML TO 9–10 using TIDE ® | | | |
| | | 200 | Rapid coalescence |
| Adjust pH using sodium hydroxide | | | |
| | | 200+ | Chaining, coagulating, No coalescence |

TABLE XV

Effect of MERPOL ® A Concentration on Interfacial Tension of Water Emulsified in Mineral Oil with Surfactant K

| MERPOL ® A Concentration (Wt. % Total Water) | Interfacial Tension (dynes/cm) |
|---|---|
| 0.0 | 9.5 |
| 0.1 | 5.0 |
| 0.2 | 4.2 |
| 0.3 | 3.0 |
| 0.5 | 2.5 |
| 1.0 | 0.9 |
| 2.0 | 0.4 |

TABLE XVI

Surface Dimensions of Magnetized Droplets

| MERPOL ® A Concent. (Wt. % Tot. (Water) | Magnetic Field (Gauss) | Minor Axis, D (Microns) | Major Axis, L (Microns) | Surface Area Sphere ($10^{-6}$ cm$^2$) | Surface Area Ellipsoid ($10^{-6}$ cm$^2$) | Area Created ($10^{-8}$ cm$^2$) |
|---|---|---|---|---|---|---|
| 0.20 | 200 | 34.1 | 36.2 | 38 | 38 | 2 |
| 1.00 | 200 | 53.3 | 63.9 | 101 | 101 | 58 |
| 1.00 | 400 | 59.6 | 74.6 | 130 | 131 | 111 |
| 1.45 | 2200 | 148.0 | 563.6 | 1669 | 2107 | 43814 |
| 2.76 | 100 | 51.2 | 55.5 | 87 | 87 | 10 |
| 2.76 | 200 | 98.1 | 119.4 | 345 | 347 | 230 |
| 2.76 | 400 | 153.5 | 264.4 | 1064 | 1115 | 5136 |
| 2.76 | 800 | 162.1 | 383.9 | 1466 | 1636 | 16982 |
| 5.58 | 200 | 20.3 | 22.5 | 14 | 14 | 2 |
| 5.58 | 400 | 68.2 | 98.1 | 186 | 190 | 412 |
| 5.58 | 800 | 119.4 | 469.2 | 1115 | 1419 | 30380 |

TABLE XVII

Comparison of Interfacial Tension Measurements

| MERPOL ® A Concentration (Wt. % Tot. Water) | Tensiometer Measurement InterFacial Tension (dynes/cm) | B (cm/Gauss)$^2$ | Magnetic Determination of InterFacial Tension* (dynes/cm) |
|---|---|---|---|
| 0.2 | 4.2 | 1.47*10$^{-11}$ | 4.2 |
| 1.0 | 0.9 | 6.84*10$^{-11}$ | 0.9 |
| 1.45 | 0.7 | 9.05*10$^{-11}$ | 0.7 |
| 2.76 |  | 2.71*10$^{-10}$ | 0.2 |
| 5.58 |  | 5.04*10$^{-10}$ | 0.1 |

*A = 6.17*10$^{-11}$ cm$^3$

TABLE XVIII

Effects of Interfacial Tension on Coalescence in the CO-HGMC Operating at 800 Gauss

| Surfactant (Wt. % on Total Water) | Interfacial Surface Tension (Dynes/cm) | Water Reduction (%) 800 Gauss |
|---|---|---|
| MERPOL ® A | | |
| 0.0 | 9.5 | 18.76 |
| 0.1 | 5.0 | 19.30 |
| 0.2 | 4.2 | 42.35 |
| 0.3 | 3.0 | 79.10 |
| 0.5 | 2.5 | 87.44 |
| 1.0 | 0.9 | 93.97 |
| 2.0 | 0.4 | 96.40 |
| FLUORAD ® FC 129 | | |
| 0.2 | 0.6 | 32.42 |

What is claimed is:

1. A continuous method for breaking an emulsion of immiscible liquids having different densities, said immiscible liquids comprising a continuous phase and a dispersed phase, including the steps of:

a) preparing a mixture comprising a stable emulsion by adding to the emulsion of a first additive comprising a magnetic additive which is soluble or dispersible in the dispersed phase of the emulsion and adding to the emulsion a second additive adapted to promote coalescence of droplets comprising said dispersed phase when said droplets are acted upon by a magnetic field;

b) agitating said mixture;

c) passing said mixture continuously through a magnetic separator means, said magnetic separator means oriented substantially vertically and receiving said mixture at a point below a top of said separator means and above a bottom thereof, while applying to the mixture a magnetic field in a horizontal plane perpendicular to a direction of mixture flow through said magnetic separator, said magnetic field polarizing dispersed phase droplets, thereby inducing forces such that dispersed phase droplets are attracted to the magnetic separator means where they coalesce to form a coalesced phase and flow along the separator means; and d) separately withdrawing said coalesced phase and said continuous phase from said separator means by extracting the less dense of said phases from the top of said magnetic separator means and the denser of said phases from the bottom thereof, said denser of the phases having flowed along the seperator means.

2. The method of claim 1 wherein said second additive comprises a surfactant.

3. The method claim 1 wherein said magnetic additive is selected from the group consisting of water-soluble ferromagnetic compounds, oil-soluble ferromagnetic compounds, and stabilized ferromagnetic fluids dispersible in oil or water.

4. The method of claim 1 wherein said second additive is selected from the group consisting of alkyl phosphate ethoxylate and polyalkeneoxide modified polydimethyl siloxane.

5. The method of claim 1 wherein the continuous phase of the emulsion is an organic liquid and the dispersed phase of the emulsion is a water-miscible liquid.

6. The method of claim 5 wherein the magnetic additive is soluble or dispersible in said water-miscible liquid.

7. The method of claim 1 wherein said continuous phase comprises organic liquid, said dispersed phase comprises aqueous liquid, said magnetic additive comprises a hydrophilic ferromagnetic fluid, and said second additive comprises a destabilizing surfactant.

8. The method of claim 7 wherein said organic liquid comprises crude oil, and said destabilizing surfactant comprises a polyalkylene oxide-modified dimethylpolysiloxane.

9. The method of claim 7 wherein at least one paramagnetic component is separated from said organic liquid.

10. The method of claim 9 wherein said organic liquid comprises crude oil and said paramagnetic component includes one or more impurities selected from the group consisting of metal sulfides, metal oxides, iron, cobalt, nickel, and vanadium.

11. A method as described in claim 1 including before the separating step, there is the step of forming a plug with the coalesced phase to regulate flow of the coalesced phase and the continuous phase through the separator means.

\* \* \* \* \*